US009633559B2

(12) United States Patent
Chambers et al.

(10) Patent No.: US 9,633,559 B2
(45) Date of Patent: Apr. 25, 2017

(54) PROJECTING VEHICLE TRANSPORTATION NETWORK INFORMATION

(71) Applicant: Nissan North America, Inc., Franklin, TN (US)

(72) Inventors: Jeremy Chambers, Casco, MI (US); Roy Goudy, Farmington Hills, MI (US); Neal Probert, Farmington Hills, MI (US); Andrew Christensen, South Lyon, MI (US)

(73) Assignee: Nissan North America, Inc., Franklin, TN (US)

( * ) Notice: Subject to any disclaimer, the term of this patent is extended or adjusted under 35 U.S.C. 154(b) by 15 days.

(21) Appl. No.: 14/816,334

(22) Filed: Aug. 3, 2015

(65) Prior Publication Data

US 2017/0039846 A1 Feb. 9, 2017

(51) Int. Cl.
*G08G 1/01* (2006.01)
*G08G 1/056* (2006.01)
(Continued)

(52) U.S. Cl.
CPC ......... *G08G 1/0112* (2013.01); *G08G 1/0125* (2013.01); *G08G 1/056* (2013.01);
(Continued)

(58) Field of Classification Search
CPC ........ G08G 1/163; G08G 1/091; G08G 1/166; G08G 1/056; G08G 1/0125; G08G 1/0112;
(Continued)

(56) References Cited

U.S. PATENT DOCUMENTS

| 5,939,976 A | 8/1999 | Sasaki et al. |
| 5,940,010 A | 8/1999 | Sasaki et al. |

(Continued)

FOREIGN PATENT DOCUMENTS

| JP | 2001118199 A | 4/2001 |
| JP | 2003051099 A | 2/2003 |

OTHER PUBLICATIONS

Kurt, Arda (dissertation), "Hybrid-state system modelling for control, estimation and prediction in vehicular autonomy", presented in Partial Fulfillment of the Requirements for the Degree Doctor of Philosophy in the Graduate School of the Ohio State University, Mar. 2012, UMI/Proquest Pub. No. 3497707, 136 pages (total).

(Continued)

*Primary Examiner* — Behrang Badii
(74) *Attorney, Agent, or Firm* — Young Basile Hanlon & MacFarlane, P.C.

(57) ABSTRACT

A method and apparatus for generating projected vehicle transportation network information for use in traversing a vehicle transportation network may include receiving a remote vehicle message including remote vehicle information indicating remote vehicle geospatial state information and remote vehicle kinematic state information, identifying host vehicle information including host vehicle geospatial state information and host vehicle kinematic state information, generating projected vehicle transportation network information representing a portion of the vehicle transportation network based on the remote vehicle information and the host vehicle information, and traversing a part of the portion of the vehicle transportation network represented by the projected vehicle transportation network information using the projected vehicle transportation network information.

20 Claims, 23 Drawing Sheets

(51) Int. Cl.
*G08G 1/16* (2006.01)
*G08G 1/09* (2006.01)
G08G 1/052 (2006.01)
H04B 1/3827 (2015.01)
H04M 1/725 (2006.01)
H04W 4/00 (2009.01)
G08G 1/04 (2006.01)

(52) U.S. Cl.
CPC ............ *G08G 1/091* (2013.01); *G08G 1/166* (2013.01); *G08G 1/04* (2013.01); *G08G 1/052* (2013.01); *H04B 1/3827* (2013.01); *H04M 1/725* (2013.01); *H04W 4/00* (2013.01)

(58) Field of Classification Search
CPC . G08G 1/04; G08G 1/052; G08G 1/16; G01C 21/34; B60Q 9/008; B60Q 9/00; H04M 1/725; H04B 1/3827; G04W 4/00; B60K 35/00; G06K 9/00798
See application file for complete search history.

(56) References Cited

U.S. PATENT DOCUMENTS

| | | | |
|---|---|---|---|
| 6,008,741 A | 12/1999 | Shinagawa et al. | |
| 6,615,137 B2 | 9/2003 | Lutter et al. | |
| 6,700,504 B1 | 3/2004 | Aslandogan et al. | |
| 6,720,898 B1 | 4/2004 | Ostrem | |
| 6,791,471 B2 | 9/2004 | Wehner et al. | |
| 6,810,328 B2 | 10/2004 | Yokota et al. | |
| 8,000,897 B2 | 8/2011 | Breed et al. | |
| 8,175,796 B1 | 5/2012 | Blackburn et al. | |
| 8,229,663 B2 | 7/2012 | Zeng et al. | |
| 8,340,894 B2 | 12/2012 | Yester | |
| 8,466,807 B2 | 6/2013 | Mudalige | |
| 8,548,729 B2 | 10/2013 | Mizuguchi | |
| 8,577,550 B2 | 11/2013 | Lu et al. | |
| 8,587,418 B2 | 11/2013 | Mochizuki et al. | |
| 8,639,426 B2 | 1/2014 | Dedes et al. | |
| 8,717,192 B2 | 5/2014 | Durekovic et al. | |
| 2005/0065711 A1* | 3/2005 | Dahlgren ............... | G07C 5/008 701/117 |
| 2007/0109111 A1 | 5/2007 | Breed et al. | |
| 2007/0262881 A1 | 11/2007 | Taylor | |
| 2009/0033540 A1 | 2/2009 | Breed et al. | |
| 2009/0140887 A1 | 6/2009 | Breed et al. | |
| 2009/0198412 A1 | 8/2009 | Shiraki | |
| 2010/0169009 A1 | 7/2010 | Breed et al. | |
| 2011/0320111 A1* | 12/2011 | Sarma ................... | G08G 1/0104 701/118 |
| 2012/0016581 A1 | 1/2012 | Mochizuki et al. | |
| 2012/0065871 A1* | 3/2012 | Deshpande .......... | G08G 1/0133 701/118 |
| 2012/0218093 A1 | 8/2012 | Yoshizawa et al. | |
| 2013/0099911 A1 | 4/2013 | Mudalige et al. | |
| 2013/0116915 A1 | 5/2013 | Ferreira et al. | |
| 2013/0179047 A1 | 7/2013 | Miller et al. | |
| 2013/0278440 A1 | 10/2013 | Rubin et al. | |
| 2016/0286026 A1* | 9/2016 | Lord ....................... | G08G 1/04 |

OTHER PUBLICATIONS

Kurt, Arda et al., "Hybrid-state driver/vehicle modelling, estimation and prediction", 13th International IEEE Annual Conference on Intelligent Transportation Systems, Madeira Island, Portugal, Paper TA3.4, Sep. 19-22, 2010, pp. 806-811.

* cited by examiner

PROJECTING VEHICLE TRANSPORTATION NETWORK INFORMATION

TECHNICAL FIELD

This disclosure relates to generating projected vehicle transportation network information, vehicle navigation, and vehicle routing.

BACKGROUND

A vehicle may traverse a portion of a vehicle transportation network based, at least in part, on vehicle transportation network information representing the vehicle transportation network. However, the vehicle transportation network information may be missing, incomplete, or inaccurate. Accordingly, a method and apparatus for projecting vehicle transportation network information may be advantageous.

SUMMARY

Disclosed herein are aspects, features, elements, implementations, and embodiments of generating projected vehicle transportation network information.

An aspect of the disclosed embodiments is a method of generating projected vehicle transportation network information for use in traversing a vehicle transportation network. Generating projected vehicle transportation network information for use in traversing a vehicle transportation network may include traversing a portion of a vehicle transportation network by a host vehicle, receiving, from a remote vehicle, via a wireless electronic communication link, a remote vehicle message, the remote vehicle message including remote vehicle information, the remote vehicle information indicating remote vehicle geospatial state information for the remote vehicle and remote vehicle kinematic state information for the remote vehicle, identifying host vehicle information for the host vehicle, the host vehicle information including one or more of host vehicle geospatial state information for the host vehicle, or host vehicle kinematic state information for the host vehicle, generating, by a processor in response to instructions stored on a non-transitory computer readable medium, projected vehicle transportation network information representing a portion of the vehicle transportation network based on the remote vehicle information and the host vehicle information, and traversing a part of the portion of the vehicle transportation network represented by the projected vehicle transportation network information using the projected vehicle transportation network information.

Another aspect of the disclosed embodiments is a method of generating projected vehicle transportation network information for use in traversing a vehicle transportation network. Generating projected vehicle transportation network information for use in traversing a vehicle transportation network may include traversing, by a host vehicle, a vehicle transportation network, receiving, at a host vehicle, from a remote vehicle, via a wireless electronic communication link, a remote vehicle message, the remote vehicle message including remote vehicle information, the remote vehicle information indicating remote vehicle geospatial state information for the remote vehicle and remote vehicle kinematic state information for the remote vehicle, the remote vehicle geospatial state information including geospatial coordinates for the remote vehicle, and the remote vehicle kinematic state information including one or more of a remote vehicle velocity for the remote vehicle, a remote vehicle heading for the remote vehicle, a remote vehicle acceleration for the remote vehicle, or a remote vehicle yaw rate for the remote vehicle, identifying host vehicle information for the host vehicle, the host vehicle information including one or more of host vehicle geospatial state information for the host vehicle, or host vehicle kinematic state information for the host vehicle, the host vehicle kinematic state information indicating a host vehicle heading for the host vehicle, generating, by a processor in response to instructions stored on a non-transitory computer readable medium, projected vehicle transportation network information representing a portion of the vehicle transportation network based on the remote vehicle information and the host vehicle information, and traversing a part of the portion of the vehicle transportation network represented by the projected vehicle transportation network information using the projected vehicle transportation network information.

Another aspect of the disclosed embodiments is a method of generating projected vehicle transportation network information for use in traversing a vehicle transportation network. Generating projected vehicle transportation network information for use in traversing a vehicle transportation network may include traversing, by a host vehicle, a vehicle transportation network, receiving, at a host vehicle, from a plurality of remote vehicles, via one or more wireless electronic communication links, a plurality of remote vehicle messages, each remote vehicle message from the plurality of remote vehicle messages including remote vehicle information for a respective remote vehicle, the remote vehicle information indicating remote vehicle geospatial state information for the respective remote vehicle and remote vehicle kinematic state information for the respective remote vehicle, the remote vehicle geospatial state information including geospatial coordinates for the respective remote vehicle, and the remote vehicle kinematic state information including one or more of a remote vehicle velocity for the respective remote vehicle, a remote vehicle heading for the respective remote vehicle, a remote vehicle acceleration for the respective remote vehicle, or a remote vehicle yaw rate for the respective remote vehicle, identifying host vehicle information for the host vehicle, the host vehicle information including one or more of host vehicle geospatial state information for the host vehicle, or host vehicle kinematic state information for the host vehicle, the host vehicle kinematic state information indicating a host vehicle heading for the host vehicle, on a condition that defined vehicle transportation network information is unavailable, generating, by a processor in response to instructions stored on a non-transitory computer readable medium, projected vehicle transportation network information representing a portion of the vehicle transportation network based on the remote vehicle information and the host vehicle information, and traversing a part of the portion of the vehicle transportation network represented by the projected vehicle transportation network information using the projected vehicle transportation network information.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
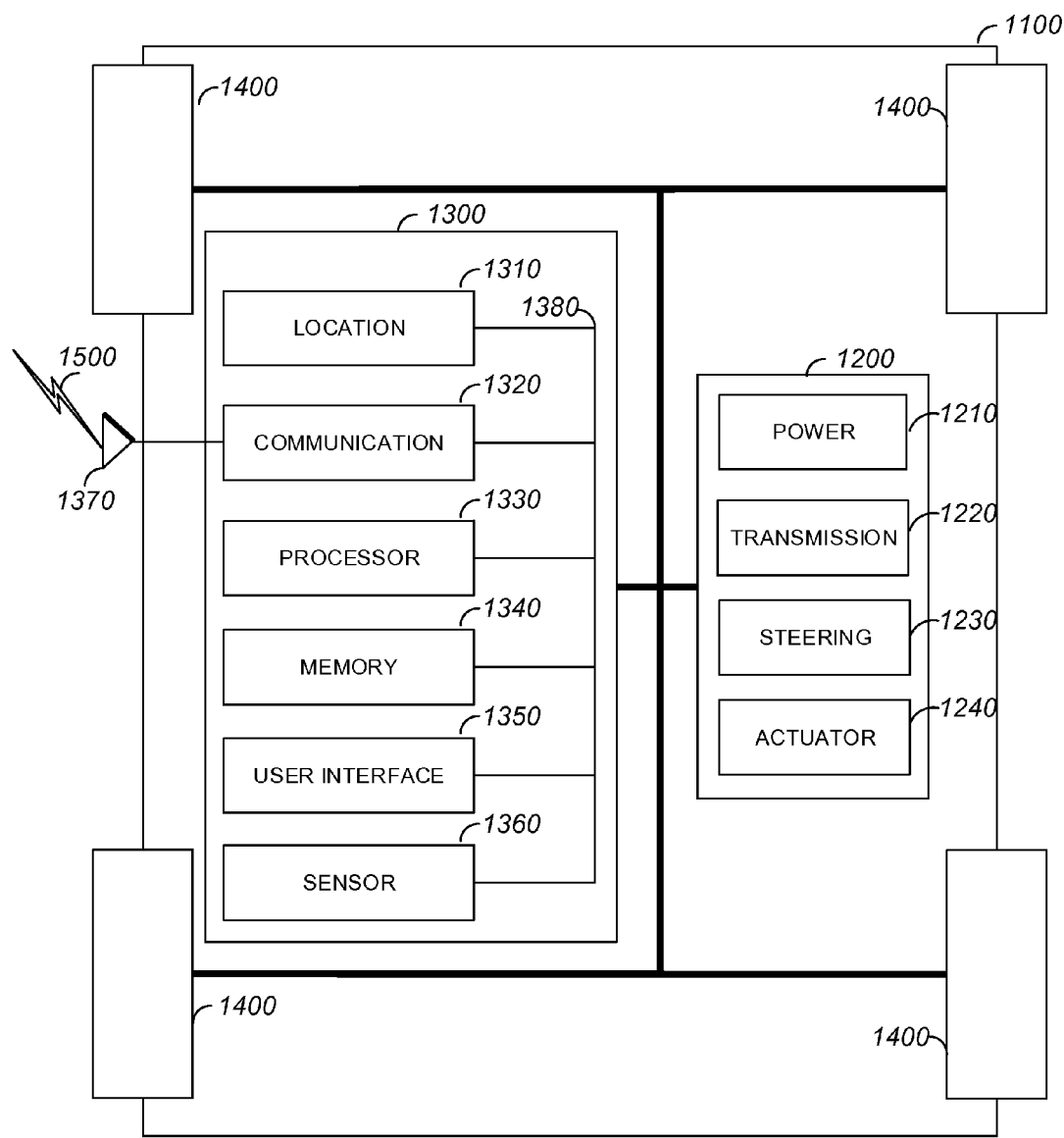
FIG. 1 is a diagram of an example of a vehicle in which the aspects, features, and elements disclosed herein may be implemented.

A vehicle may traverse a portion of a vehicle transportation network using vehicle transportation network information representing the vehicle transportation network for routing and navigation. However, the vehicle transportation network information may be unavailable, inaccurate, or incomplete for a portion of the vehicle transportation network. During traversal of the vehicle transportation network a vehicle may receive messages, such as basic safety messages, from remote vehicles, which may indicate operating information for the remote vehicles, such as geospatial location, heading, and velocity information.

Generating projected vehicle transportation network information may include generating projected vehicle transportation network information representing the vehicle transportation network based on operating information for the current, host, vehicle and operating information received from the remote vehicles. For example, the host vehicle may determine that the portion of the vehicle transportation network the host vehicle is currently traversing includes a vehicle transportation network intersection based on the host and remote vehicle information.

In some embodiments, the host vehicle may provide the projected vehicle transportation network information to a driver, or may control the host vehicle without human intervention based on the projected vehicle transportation network. In some embodiments, the host vehicle may transmit the projected vehicle transportation network information to one or more of the remote vehicles. In some embodiments, generating projected vehicle transportation network may include aggregating information, such as vehicle transportation network congestion information, over time, and generating routing and navigation information based on the aggregated data.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of a vehicle in which the aspects, features, and elements disclosed herein may be implemented. In some embodiments, a vehicle 1000 may include a chassis 1100, a powertrain 1200, a controller 1300, wheels 1400, or any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 may include a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some embodiments, the power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300 the actuator 1240 or both. The steering unit 1230 may be controlled by the controller 1300 the actuator 1240 or both and may control the wheels 1400 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

In some embodiments, the processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless medium 1500, such as via the communication interface 1370. Although not explicitly shown in FIG. 1, the communication unit 1320 may be configured to transmit, receive, or both via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used. In some embodiments, the communication unit 1320 may include a dedicated short range communications (DSRC) unit, an on-board unit (OBU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person, and a touch display for performing visual and touch based communication with the person. In some embodiments, the user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, that is operable to report information regarding some aspect of the current dynamic situation of the vehicle 1000.

In some embodiments, the sensors 1360 may include sensors that are operable to obtain information regarding the physical environment surrounding the vehicle 1000. For example, one or more sensors may detect road geometry and obstacles, such as fixed obstacles, vehicles, and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
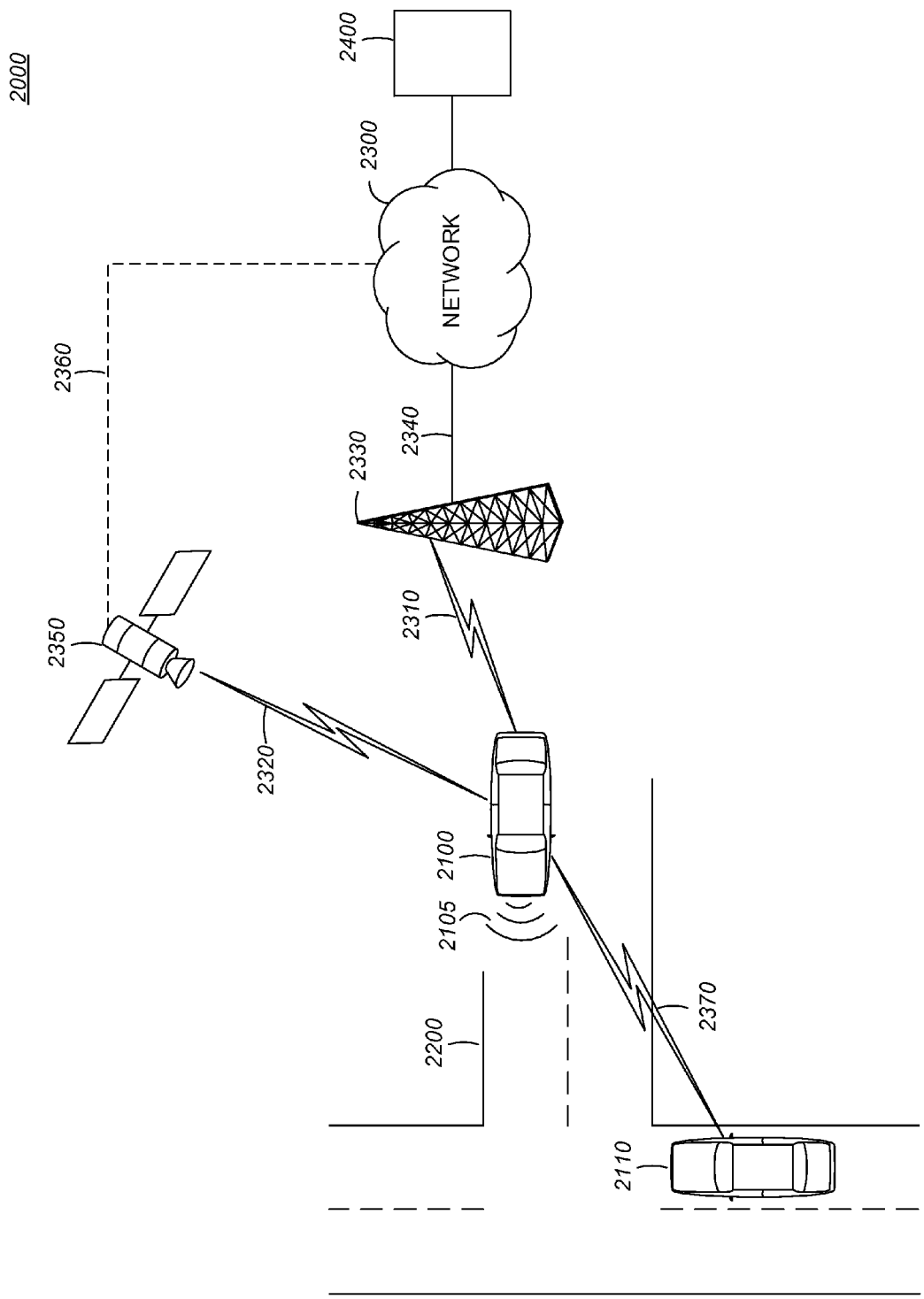
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

In some embodiments, the electronic communication network 2300 may be, for example, a multiple access system and may provide for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

In some embodiments, a vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). In some embodiments, a vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

In some embodiments, the vehicle 2100 may communicate with the communications network 2300 via an access point 2330. An access point 2330, which may include a computing device, may be configured to communicate with a vehicle 2100, with a communication network 2300, with one or more communication devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

In some embodiments, the vehicle 2100 may communicate with the communications network 2300 via a satellite 2350, or other non-terrestrial communication device. A satellite 2350, which may include a computing device, may be configured to communicate with a vehicle 2100, with a communication network 2300, with one or more communication devices 2400, or with a combination thereof via one or more communication links 2320/2360. Although shown as a single unit, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, a vehicle 2100 may identify a portion or condition of the vehicle transportation network 2200. For example, the vehicle may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, a vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows one vehicle 2100, one vehicle transportation network 2200, one electronic communication network 2300, and one communication device 2400, any number of vehicles, networks, or computing devices may be used. In some embodiments, the vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

FIGS. 3-14 show examples of diagrams representing vehicles operating in one or more portions of one or more vehicle transportation networks. For simplicity and clarity a host vehicle is shown with stippling and remote vehicles are shown in white. For simplicity and clarity the diagrams shown in FIGS. 3-14 are oriented with north at the top and east at the right side. In some embodiments, a defined geospatial range is shown as approximately 300 meters; however, other ranges may be used. Although elevation is not expressly shown in FIGS. 3-14, elevation information may be used for generating projected vehicle transportation network information.

Figure 3:
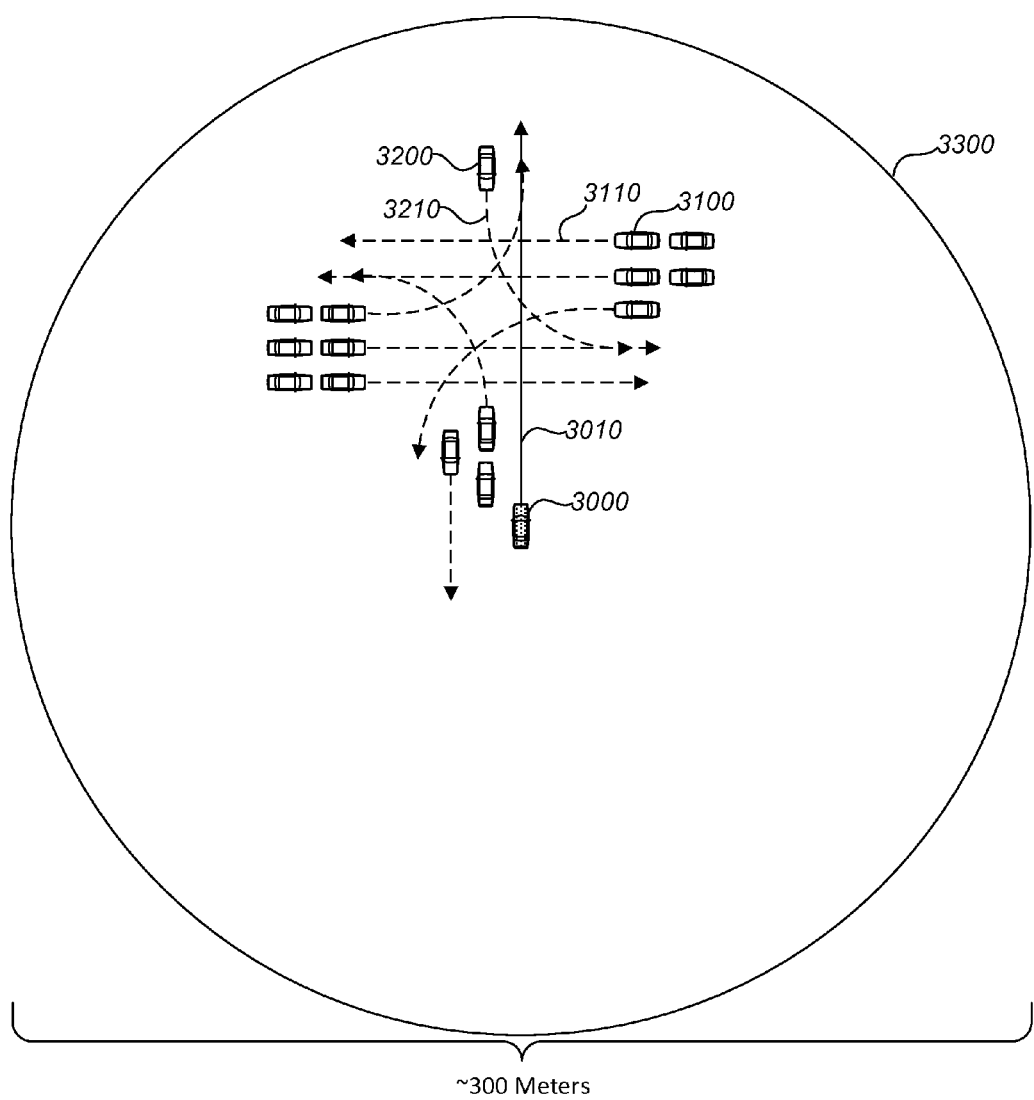
FIG. 3 is a diagram of geospatially locating remote vehicles based on automated inter-vehicle messages for use in generating projected vehicle transportation network information in accordance with this disclosure.

FIG. 3 is a diagram of geospatially locating remote vehicles based on automated inter-vehicle messages for use in generating projected vehicle transportation network information in accordance with this disclosure. Geospatially locating remote vehicles based on automated inter-vehicle messages may be implemented in a vehicle, such as the vehicle 1000 shown in FIG. 1 or the vehicles 2100/2110 shown in FIG. 2. In some embodiments, one or more of the vehicles shown in FIG. 3, including the remote vehicles, the host vehicle, or both, may be stationary or may be in motion.

In some embodiments, a host vehicle 3000 may traverse a portion of a vehicle transportation network (not expressly shown), may receive automated inter-vehicle communications from one or more remote vehicles 3100/3200 within a defined geospatial range 3300, and may transmit automated inter-vehicle communications to one or more remote vehicles 3100/3200 within the defined geospatial range 3300. For simplicity and clarity, an automated inter-vehicle communication received by a host vehicle from a remote vehicle may be referred to herein as a remote vehicle message. For example, the host vehicle 3000 may receive the remote vehicle messages via a wireless electronic communication link, such as the wireless electronic communication link 2370 shown in FIG. 2.

In some embodiments, the automated inter-vehicle messages may indicate information such as geospatial location information and heading information. In some embodiments, the host vehicle 3000 may transmit one or more automated inter-vehicle messages including host vehicle information, such as host vehicle heading information. For example, as shown in FIG. 3, the host vehicle heading information may indicate that the host vehicle 3000 is heading straight ahead. In some embodiments, a remote vehicle 3100 may transmit one or more automated inter-vehicle messages including remote vehicle information, such as remote vehicle heading information. For example, the remote vehicle heading information may indicate that the remote vehicle 3100 is heading straight west. In another example, a remote vehicle 3200 may transmit one or more automated inter-vehicle messages including remote vehicle information that includes remote vehicle heading information, which may indicate that the remote vehicle 3100 is heading south.

In some embodiments, the host vehicle 3000 may identify a host vehicle expected path for the host vehicle 3010 based on host vehicle information, such as host vehicle geospatial state information and host vehicle kinematic state information. In some embodiments, the host vehicle 3000 may identify a remote vehicle expected path for a remote vehicle based on the automated inter-vehicle messages, which may include remote vehicle information, such as remote vehicle geospatial state information and remote vehicle kinematic state information. For example, the remote vehicle messages transmitted by the remote vehicle 3100 in the upper right of FIG. 3 may indicate that the remote vehicle 3100 is heading west and the host vehicle 3000 may identify the remote vehicle expected path 3110 for the remote vehicle 3100. In another example, the remote vehicle messages transmitted by the remote vehicle 3200 in the upper left of FIG. 3 may indicate that the remote vehicle 3200 is heading south, and may include navigation information, such as turn signal information indicating a left turn, and the host vehicle 3000 may identify the remote vehicle expected path 3210 for the remote vehicle 3200.

For simplicity and clarity the heading and expected path of the host vehicle 3000 are shown as a solid directional line and the expected paths of respective remote vehicles are shown as directional broken lines. Expected paths are omitted from FIG. 3 for some vehicles for simplicity and clarity.

Figure 4:
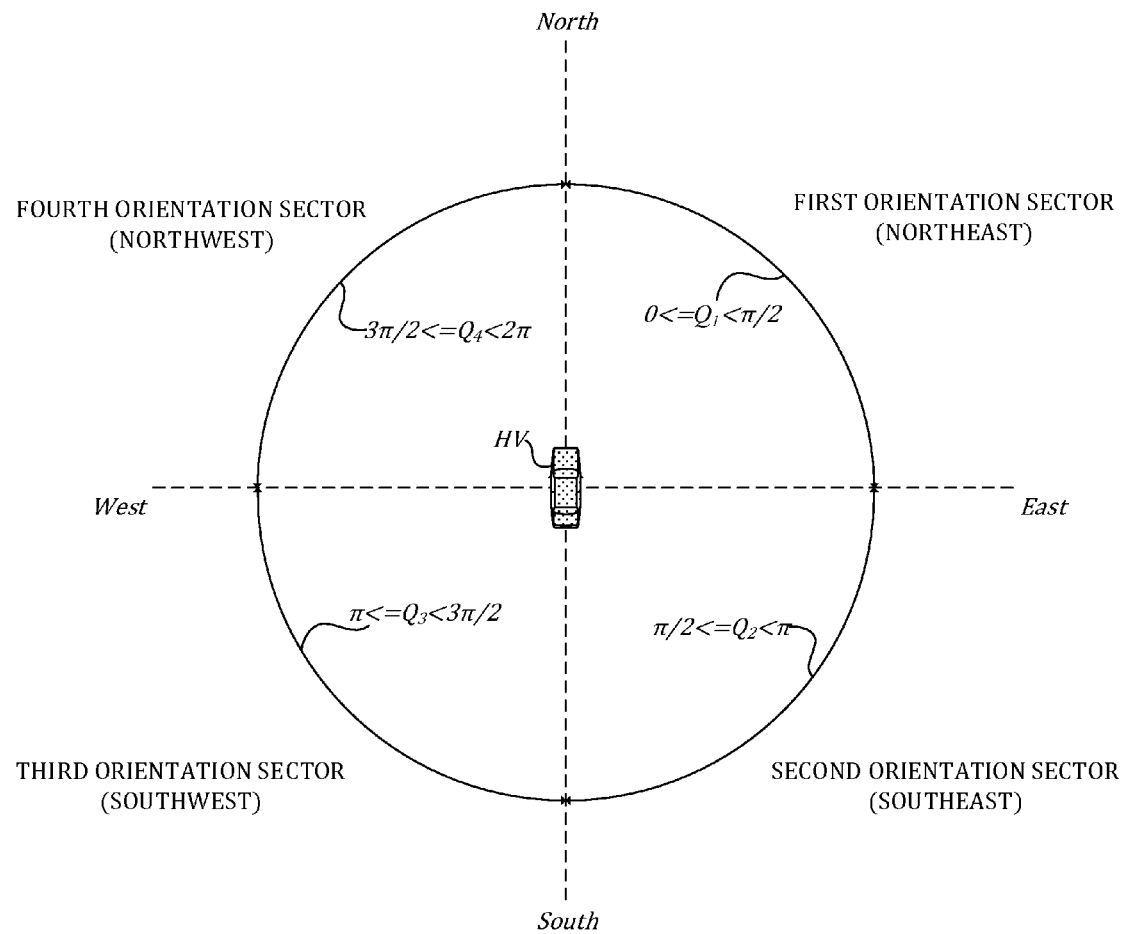
FIG. 4 is a diagram of orientation sectors for generating projected vehicle transportation network information in accordance with this disclosure.

FIG. 4 is a diagram showing orientation sectors for generating projected vehicle transportation network information in accordance with this disclosure. In some embodiments, generating projected vehicle transportation network information may include determining an orientation sector ($Q_n$), which may indicate a quantized geospatial location, or direction, of a remote vehicle, relative to the host vehicle, in the geospatial domain. In some embodiments, locations relative to the host vehicle location may be quantized into a defined number, quantity, count, or cardinality, of orientation sectors (Q). For example, the defined set of orientation sectors (Q) may include four orientation sectors, or quadrants, which may include ninety degrees each. However, any number, size, and direction of orientation sectors may be used. Although the host vehicle is shown in FIG. 4 as heading north, the orientation sector may be identified relative to the host vehicle geospatial location independently of the heading, path, or route of the host vehicle.

In some embodiments, the defined set of orientation sectors may be identified in the geospatial domain relative to the host vehicle and a reference direction, such as north. For example, relative to the host vehicle, the reference direction, north, may correspond with zero degrees (0°, 360°, $2\pi$), east may correspond with ninety degrees (90°, $\pi/2$), south may correspond with 180 degrees (180°, $\pi$), and west may correspond with 270 degrees (270°, $3\pi/2$).

As shown in FIG. 4, in some embodiments, the orientation sectors (Q) may include a first orientation sector $Q_1$ to the northeast of the host vehicle, which may include locations from zero degrees (0°, 360°, 2π, or north) to ninety degrees (90°, π/2, or east), which may be expressed as $0 <= Q_1 < \pi/2$. The orientation sectors (Q) may include a second orientation sector $Q_2$ to the southeast of the host vehicle, which may include locations from ninety degrees (90° or π/2) to 180 degrees (180°, π, or south), which may be expressed as $\pi/2 <= Q_2 < \pi$. The orientation sectors (Q) may include a third orientation sector $Q_3$ to the southwest of the host vehicle, which may include locations from 180 degrees (180° or π) to 270 degrees (270°, 3π/2, or west), which may be expressed as $\pi <= Q_3 < 3\pi/2$. The orientation sectors (Q) may include a fourth orientation sector $Q_4$ to the northwest of the host vehicle, which may include locations from 270 degrees (270°, 3π/2, or west) to 360 degrees (0°, 360°, 2π, or north), which may be expressed as $3\pi/2 <= Q_4 < 360$.

Figure 5:
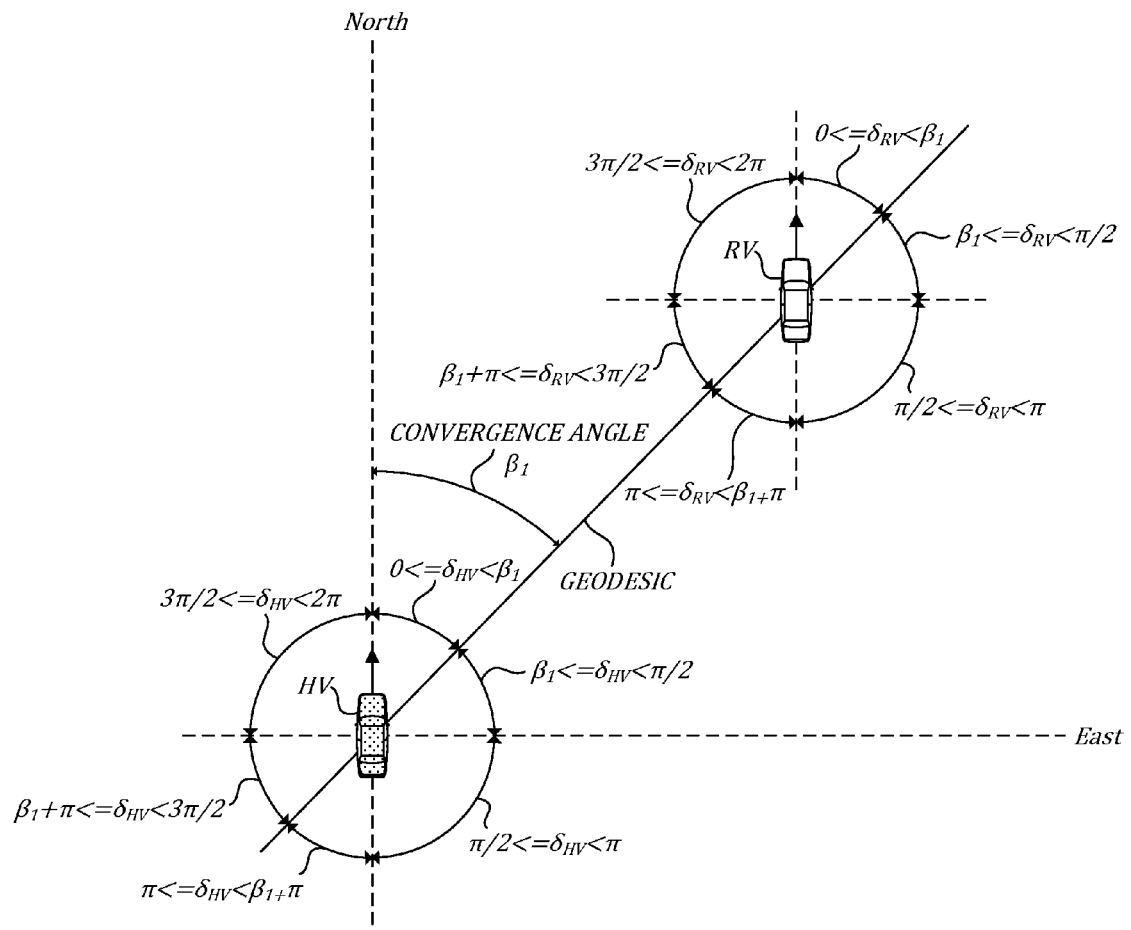
FIG. 5 is a diagram of identifying inter-vehicle state information including a geodesic for a first orientation sector for use in generating projected vehicle transportation network information in accordance with this disclosure.
Figure 6:
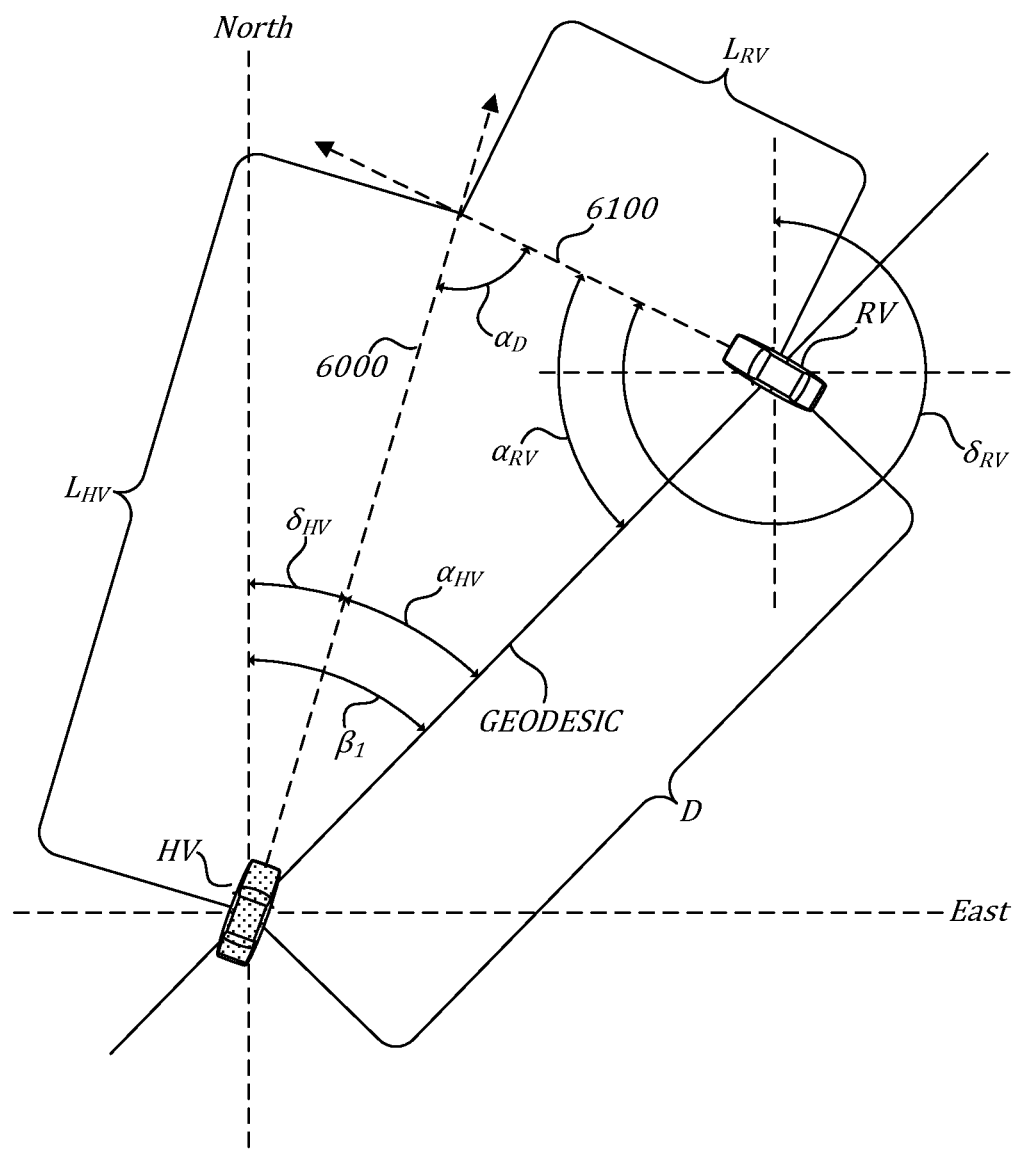
FIG. 6 is a diagram of identifying inter-vehicle state information including convergence information for the first orientation sector for use in generating projected vehicle transportation network information in accordance with this disclosure.
Figure 7:
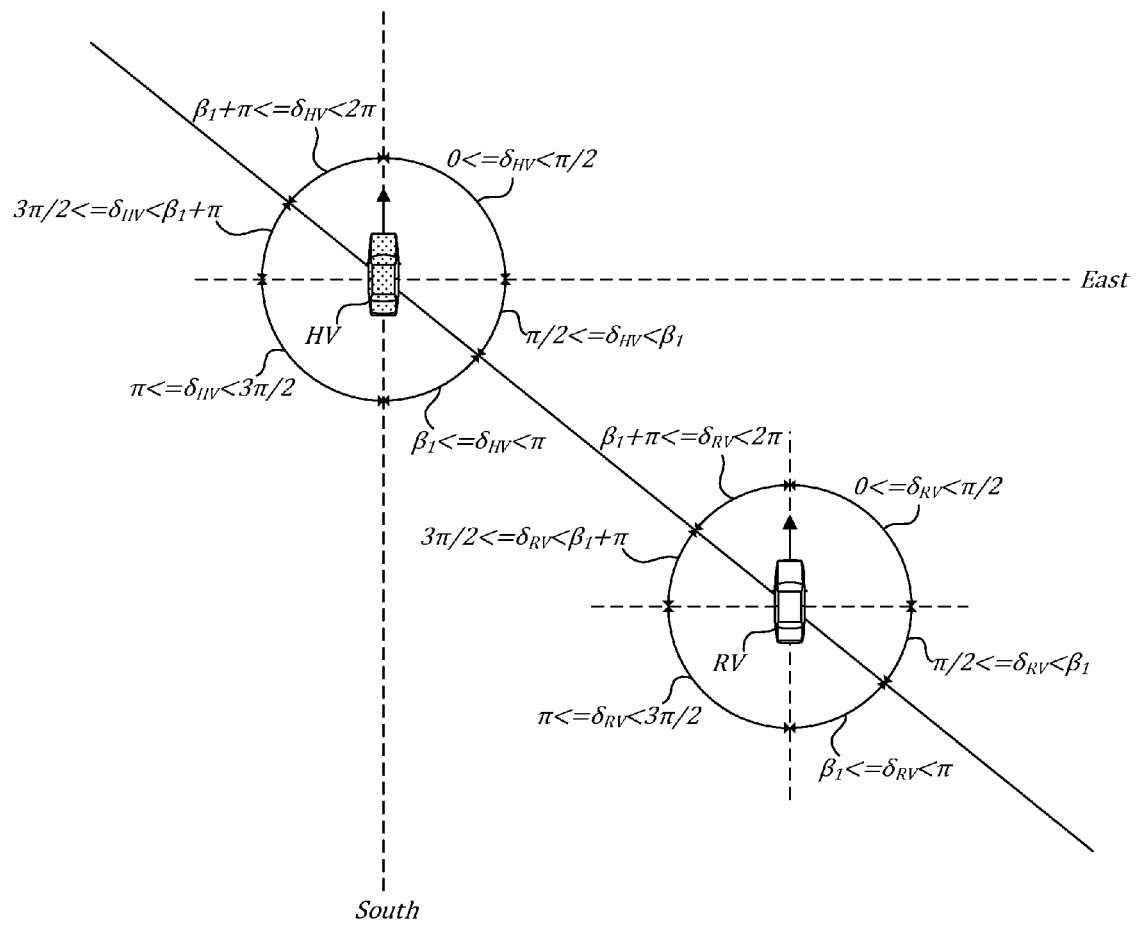
FIG. 7 is a diagram of identifying inter-vehicle state information including a geodesic for a second orientation sector for use in generating projected vehicle transportation network information in accordance with this disclosure.
Figure 8:
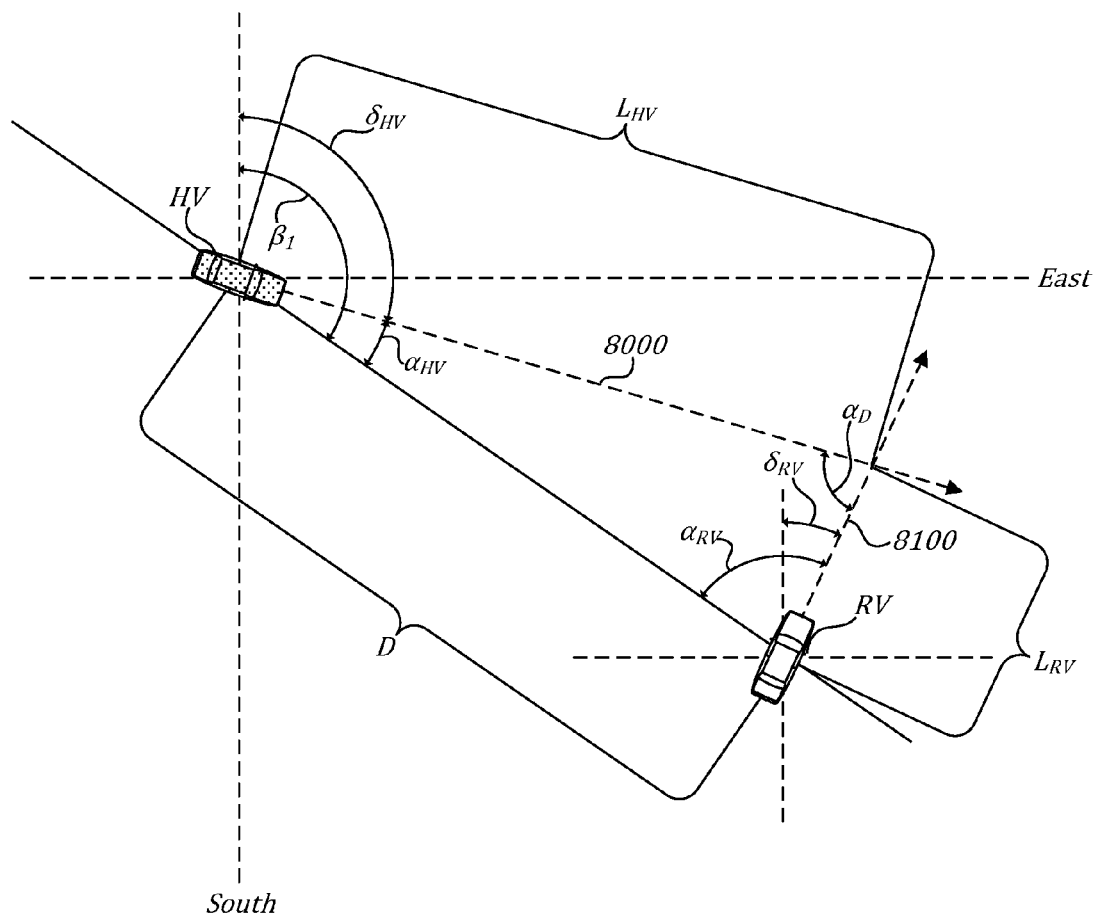
FIG. 8 is a diagram of identifying inter-vehicle state information including convergence information for the second orientation sector for use in generating projected vehicle transportation network information in accordance with this disclosure.
Figure 9:
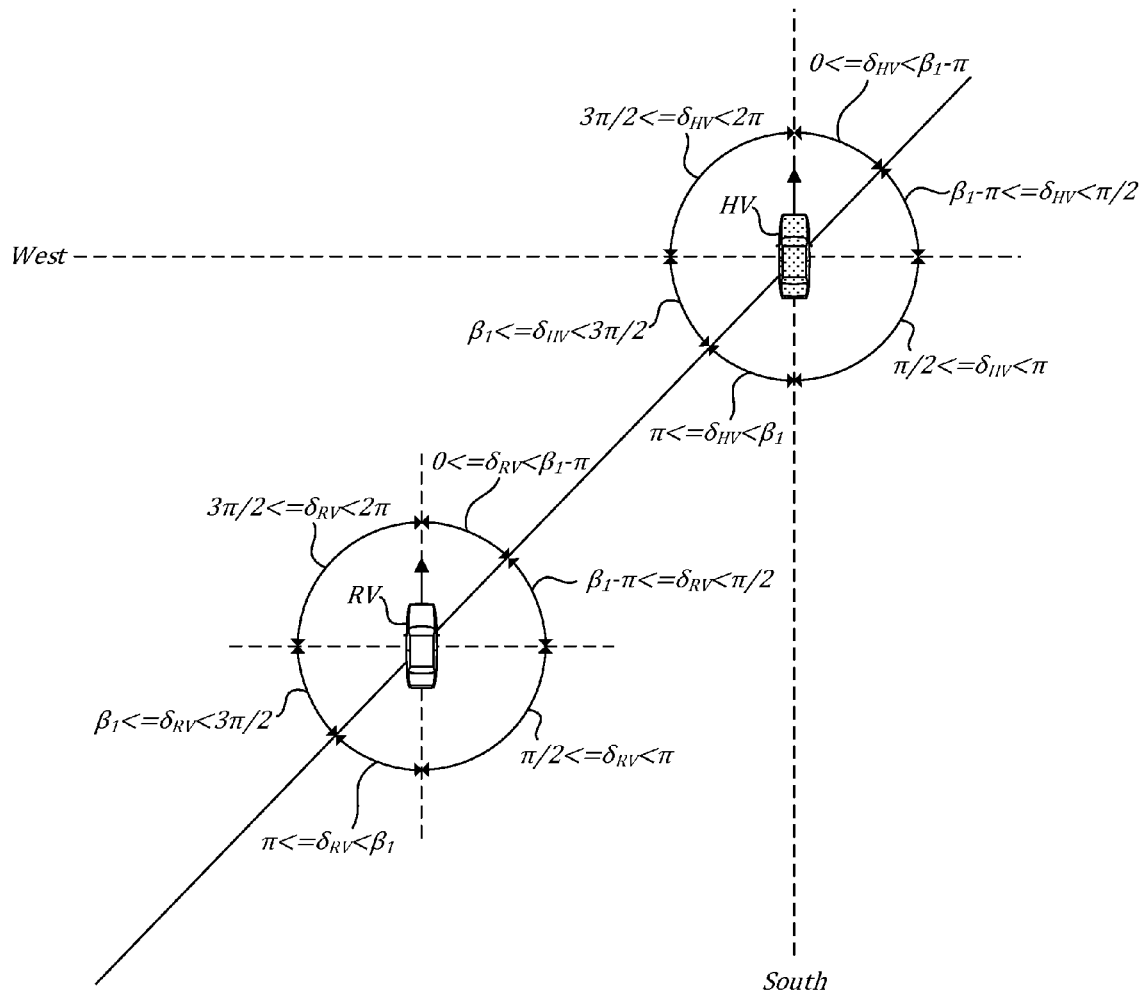
FIG. 9 is a diagram of identifying inter-vehicle state information including a geodesic for a third orientation sector for use in generating projected vehicle transportation network information in accordance with this disclosure.
Figure 10:
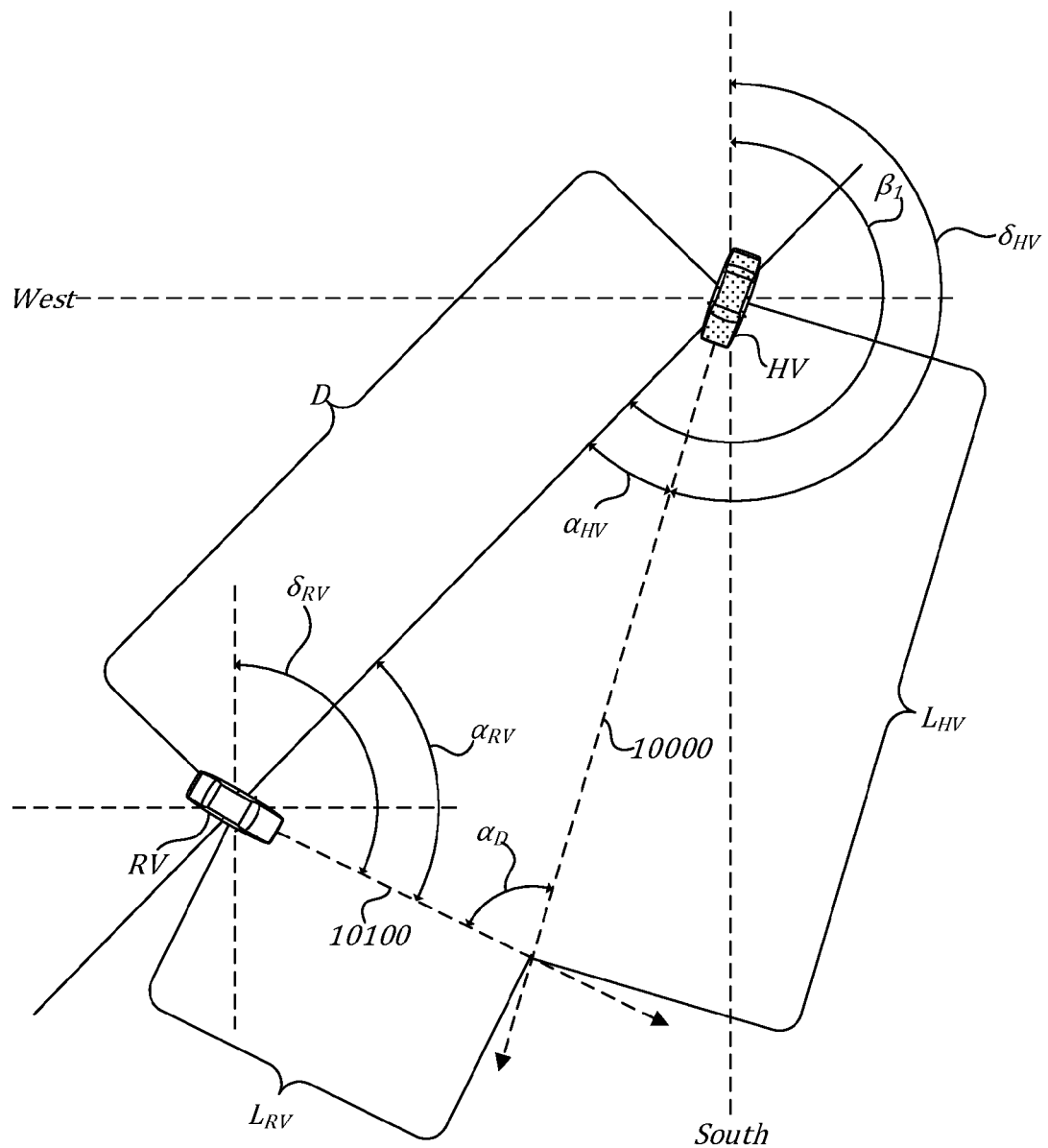
FIG. 10 is a diagram of identifying inter-vehicle state information including convergence information for the third orientation sector for use in generating projected vehicle transportation network information in accordance with this disclosure.
Figure 11:
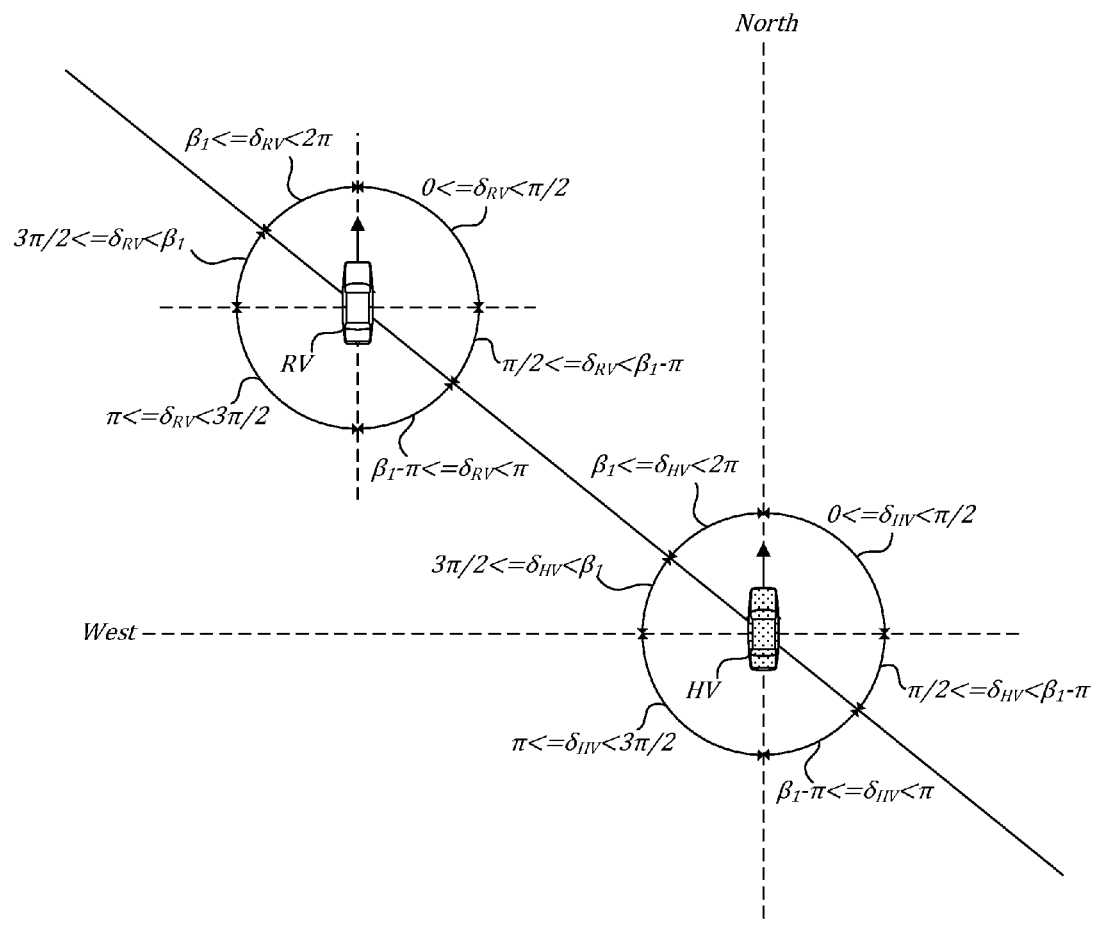
FIG. 11 is a diagram of identifying inter-vehicle state information including a geodesic for a fourth orientation sector for use in generating projected vehicle transportation network information in accordance with this disclosure.
Figure 12:
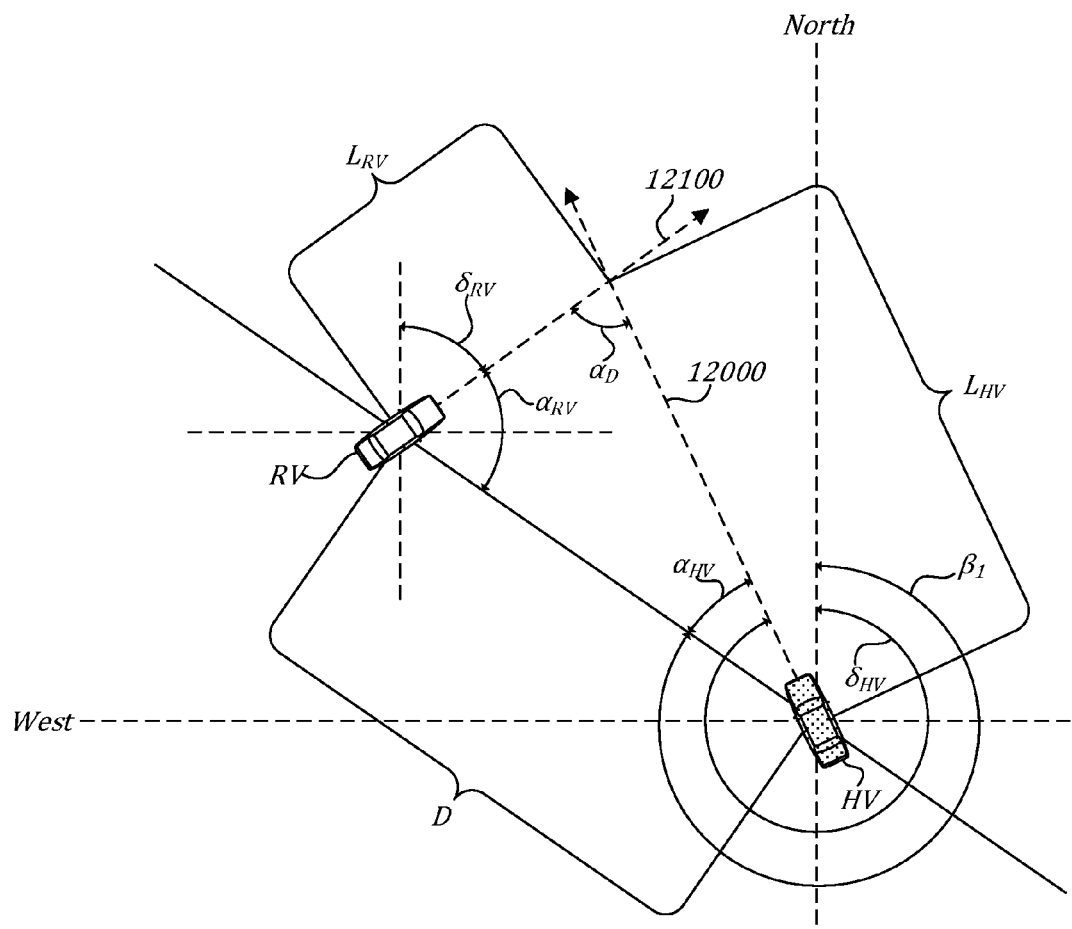
FIG. 12 is a diagram of identifying inter-vehicle state information including convergence information for the fourth orientation sector for use in generating projected vehicle transportation network information in accordance with this disclosure.

In some embodiments, generating projected vehicle transportation network information may include identifying inter-vehicle state information, such as information describing the geospatial position and path of respective remote vehicles relative to the host vehicle location and expected path. Examples of generating projected vehicle transportation network information using the first orientation sector $Q_1$ are shown in FIGS. 5-6. Examples of generating projected vehicle transportation network information using the second orientation sector $Q_2$ are shown in FIGS. 7-8. Examples of generating projected vehicle transportation network information using the third orientation sector $Q_3$ are shown in FIGS. 9-10. Examples of generating projected vehicle transportation network information using the fourth orientation sector $Q_4$ are shown in FIGS. 11-12.

FIG. 5 is a diagram of identifying inter-vehicle state information including a geodesic for a first orientation sector for use in generating projected vehicle transportation network information in accordance with this disclosure. Identifying inter-vehicle state information may be implemented in a vehicle, such as the vehicle 1000 shown in FIG. 1 or the vehicles 2100/2110 shown in FIG. 2.

In some embodiments, generating projected vehicle transportation network information may include determining a convergence angle $\beta_1$ for a geodesic between the host vehicle (HV) and a respective remote vehicle (RV). A geodesic may indicate a geospatially direct line between a host vehicle and a respective remote vehicle, and may be determined relative to the host vehicle in the geospatial domain. The geodesic may be the shortest straight navigable or unnavigable line between the host vehicle and the remote vehicle respective of the curvature of the earth. In FIGS. 5-12 the geodesic is shown as a solid line intersecting with the host vehicle and the remote vehicle. Although the geodesic is shown as extending beyond the vehicle for clarity, the length of the geodesic may correspond with a geospatially direct line distance between the host vehicle and the remote vehicle. In some embodiments, generating projected vehicle transportation network information may include determining a convergence angle $\beta_1$ for the geodesic. The convergence angle $\beta_1$ may indicate an angle between the geodesic and a reference direction relative to the host vehicle in the geospatial domain, such as north. For simplicity, in FIG. 5, the vehicles are shown heading north; however, the geodesic and convergence angle $\beta_1$ may be identified independently of vehicle heading. Although described herein with reference to a reference direction of north, other reference directions may be used. For example, in some embodiments, projected vehicle transportation network information may be generated using the direction of the geodesic as the reference direction and the convergence angle $\beta_1$ may be zero degrees. For simplicity and clarity the angles described herein, such as convergence angle ($\beta_1$), are identified clockwise.

In some embodiments, the geodesic may be determined based on host vehicle information, such as a geospatial location of the host vehicle, remote vehicle information, such as a geospatial location of the remote vehicle, or a combination thereof. For example, the host vehicle information may indicate a longitude ($\theta_{HV}$) for the host vehicle, a latitude ($\phi_{HV}$) for the host vehicle, or both, the remote vehicle information may indicate a longitude ($\theta_{RV}$) for the remote vehicle, a latitude ($\phi_{RV}$) for the remote vehicle, or both, σ may indicate a very small value, such as a value of a magnitude of $10^{-9}$, used to avoid dividing by zero, and determining the convergence angle $\beta_1$ may be expressed as the following:

$$\beta_1 = \pi \left[ \frac{\theta_{HV} - \theta_{RV} - \sigma}{|\theta_{HV} - \theta_{RV}| + \sigma} + 1 \right] - \qquad \text{[Equation 1]}$$

$$\cos^{-1}\left( \frac{(\phi_{RV} - \phi_{HV})}{\sqrt{(\theta_{RV} - \theta_{HV})^2 \cos^2 \phi_{HV} + (\phi_{RV} - \phi_{HV})^2}} \right)$$

$$\left[ \frac{\theta_{HV} - \theta_{RV} - \sigma}{|\theta_{HV} - \theta_{RV}| + \sigma} \right].$$

In some embodiments, a length of the geodesic, which may correspond to a geospatially direct line distance, or instantaneous distance, D between the host vehicle and the remote vehicle, may be determined based on the host vehicle information, the remote vehicle information, or a combination thereof. For example, f may indicate an earth flattening value, such as f=1/298.257223563, $r_e$ may indicate a measure of the earth's equatorial radius, such as $r_e$=6,378,137 meters, and determining the distance D may be expressed as the following:

$$D = (1-f)r_e \sqrt{\frac{(\theta_{RV} - \theta_{HV})^2 \cos^2 \phi_{HV} + (\phi_{RV} - \phi_{HV})^2}{\sin^2 \phi_{HV} + (1-f)^2 \cos^2 \phi_{HV}}}. \qquad \text{[Equation 2]}$$

In some embodiments, generating projected vehicle transportation network information may include determining an orientation sector, as shown in FIG. 4, which may indicate a geospatial location of a remote vehicle relative to the host vehicle, which may correspond with the convergence angle $\beta_1$, which may indicate the location of the geodesic relative to the reference direction and the host vehicle.

In some embodiments, generating projected vehicle transportation network information may include determining a host vehicle region for the host vehicle, as shown in FIG. 5. The host vehicle region may indicate a quantization of a host vehicle heading angle $\delta_{HV}$, which may indicate the host vehicle heading or expected path relative to the host vehicle and the geodesic in the geospatial domain. For example, relative to the orientation sector, directions from the host vehicle may be quantized into a defined cardinality of regions, such as six regions as shown.

For example, for the first orientation sector $Q_1$, the remote vehicle, and the geodesic, is located to the northeast of the host vehicle in the geospatial domain. A first host vehicle region may include host vehicle heading angles $\delta_{HV}$ from the reference direction, which may correspond with north, to the convergence angle $\beta_1$ of the geodesic, which may be expressed as $0<=\delta_{HV}<\beta_1$. A second host vehicle region may include host vehicle heading angles $\delta_{HV}$ from the convergence angle $\beta_1$ of the geodesic to ninety degrees, which may correspond with east, and which may be expressed as $\beta_1<=\delta_{HV}<\pi/2$. A third host vehicle region may include host vehicle heading angles $\delta_{HV}$ from ninety degrees to 180 degrees, which may correspond with south, and which may be expressed as $\pi/2<=\delta_{HV}<\pi$. A fourth host vehicle region may include host vehicle heading angles $\delta_{HV}$ from 180 degrees to the opposite of the convergence angle $\beta_1+\pi$ of the geodesic, which may be expressed as $\pi<=\delta_{HV}<\beta_1+\pi$. A fifth host vehicle region may include host vehicle heading angles $\delta_{HV}$ from the opposite, with respect to the vertical, of the convergence angle $\beta_1+\pi$ of the geodesic, to 270 degrees, which may correspond with west, and which may be expressed as $\beta_1+\pi<=\delta_{HV}<3\pi/2$. A sixth host vehicle region may include host vehicle heading angles $\delta_{HV}$ from 270 degrees to 360 degrees, which may correspond with the reference direction, north, and the sixth host vehicle region may be expressed as $3\pi/2<=\delta_{HV}<2\pi$.

In some embodiments, generating projected vehicle transportation network information may include determining a remote vehicle region for the remote vehicle. The remote vehicle region may indicate a quantization of a remote vehicle heading angle $\delta_{RV}$, which may indicate the remote vehicle heading or expected path, relative to the remote vehicle and the geodesic in the geospatial domain, and which may be determined relative to the orientation sector. For example, relative to the orientation sector, directions from the remote vehicle may be quantized into a defined cardinality of regions, such as six regions as shown, which may correspond with the host vehicle regions.

For example, for the first orientation sector $Q_1$, a first remote vehicle region may include remote vehicle heading angles $\delta_{RV}$ from the reference direction, which may correspond with north, to the convergence angle $\beta_1$ of the geodesic, which may be expressed as $0<=\delta_{RV}<\beta_1$. A second remote vehicle region may include remote vehicle heading angles $\delta_{RV}$ from the convergence angle $\beta_1$ of the geodesic to ninety degrees, which may correspond with east, and which may be expressed as $\beta_1<=\delta_{RV}<\pi/2$. A third remote vehicle region may include remote vehicle heading angles $\delta_{RV}$ from ninety degrees to 180 degrees, which may correspond with south, and which may be expressed as $\pi/2<=\delta_{RV}<\pi$. A fourth remote vehicle region may include remote vehicle heading angles $\delta_{RV}$ from 180 degrees to the opposite of the convergence angle $\beta_1+\pi$ of the geodesic, which may be expressed as $\pi<=\delta_{RV}<\beta_1+\pi$. A fifth remote vehicle region may include remote vehicle heading angles $\delta_{RV}$ from the opposite of the convergence angle $\beta_1+\pi$ of the geodesic, to 270 degrees, which may correspond with west, and which may be expressed as $\beta_1+\pi<=\delta_{RV}<3\pi/2$. A sixth remote vehicle region may include remote vehicle heading angles $\delta_{RV}$ from 270 degrees to 360 degrees, which may correspond with the reference direction, north, and which may be expressed as $3\pi/2<=\delta_{RV}<2\pi$.

FIG. 6 is a diagram of identifying inter-vehicle state information including convergence information for the first orientation sector for use in generating projected vehicle transportation network information in accordance with this disclosure. Identifying inter-vehicle state information may be implemented in a vehicle, such as the vehicle 1000 shown in FIG. 1 or the vehicles 2100/2110 shown in FIG. 2.

In some embodiments, for the first orientation sector $Q_1$, generating projected vehicle transportation network information may include identifying a host vehicle expected path 6000 for the host vehicle (HV), identifying respective remote vehicle expected paths 6100 for one or more of the remote vehicles (RV), or identifying respective expected paths 6000/6100 for the host vehicle and for one or more of the remote vehicles. In some embodiments, the expected paths may be projected, such as in a straight line, from the respective heading information.

In some embodiments, generating projected vehicle transportation network information may include determining whether the remote vehicle expected path 6100 and the host vehicle expected path 6000 are convergent, which may indicate that the host vehicle expected path 6000 and the respective remote vehicle expected path 6100 intersect.

In some embodiments, for the first orientation sector $Q_1$, determining whether the remote vehicle expected path 6100 and the host vehicle expected path 6000 are convergent may include examining defined convergence data, such as Table 1 below. In Table 1 a value of zero (0) indicates that the remote vehicle expected path 6100 and the host vehicle expected path are not convergent and do not cross, a value of one (1) indicates that the remote vehicle expected path 6100 and the host vehicle expected path 6000 are convergent and do cross. A value of $\eta_{HV}$ indicates that the remote vehicle expected path 6100 and the host vehicle expected path 6000 are convergent and do cross if the host vehicle heading angle $\delta_{HV}$ is greater than the remote vehicle heading angle $\delta_{RV}$ and are not convergent and do not cross if the remote vehicle heading angle $\delta_{RV}$ is at least the host vehicle heading angle $\delta_{HV}$. A value of $\eta_{RV}$ indicates that the remote vehicle expected path 6100 and the host vehicle expected path 6000 are convergent and do cross if the host vehicle heading angle $\delta_{HV}$ is less than the remote vehicle heading angle $\delta_{RV}$ and are not convergent and do not cross if the host vehicle heading angle $\delta_{HV}$ is at least the remote vehicle heading angle $\delta_{RV}$. The notation $HV_n$ indicates that the host vehicle region is region n. For example, $HV_1$ indicates that the host vehicle region is the first region and $HV_6$ indicates that the host vehicle region is the sixth region. The notation $RV_n$ indicates that the remote vehicle region is region n. For example, $RV_1$ indicates that the remote vehicle region is the first region and $RV_6$ indicates that the remote vehicle region is the sixth region.

TABLE 1

|  | $RV_1$ | $RV_2$ | $RV_3$ | $RV_4$ | $RV_5$ | $RV_6$ |
|---|---|---|---|---|---|---|
| $HV_1$ | $\eta_{HV}$ | 0 | 0 | 0 | 1 | 1 |
| $HV_2$ | 0 | $\eta_{RV}$ | 1 | 1 | 0 | 0 |
| $HV_3$ | 0 | 0 | $\eta_{RV}$ | 1 | 0 | 0 |
| $HV_4$ | 0 | 0 | 0 | $\eta_{RV}$ | 0 | 0 |
| $HV_5$ | 0 | 0 | 0 | 0 | $\eta_{HV}$ | 0 |
| $HV_6$ | 0 | 0 | 0 | 0 | 1 | $\eta_{HV}$ |

In some embodiments, for the first orientation sector $Q_1$, determining $\eta_{HV}$ may be expressed as the following:

$$\eta_{HV} = \frac{1}{2}\left[\frac{\delta_{HV} - \delta_{RV} - \sigma}{|\delta_{RV} - \delta_{HV}| + \sigma} + 1\right]. \qquad \text{[Equation 3]}$$

In some embodiments, for the first orientation sector $Q_1$, determining $\eta_{RV}$ may be expressed as the following:

$$\eta_{RV} = \frac{1}{2}\left[\frac{\delta_{RV} - \delta_{HV} - \sigma}{|\delta_{RV} - \delta_{HV}| + \sigma} + 1\right]. \qquad \text{[Equation 4]}$$

In some embodiments, for the first orientation sector $Q_1$, a combination ($F_{m,n}$) of the host vehicle heading angle $\delta_{HV}$ and the remote vehicle heading angle $\delta_{RV}$ may be expressed as shown in Tables 2-4.

TABLE 2

| $F_{m,n}$ | $RV_1$ | $RV_2$ | $RV_3$ | $RV_4$ | $RV_5$ | $RV_6$ |
|---|---|---|---|---|---|---|
| $HV_1$ | $H_1 \times R_1$ | $H_1 \times R_2$ | $H_1 \times R_3$ | $H_1 \times R_4$ | $H_1 \times R_5$ | $H_1 \times R_6$ |
| $HV_2$ | $H_2 \times R_1$ | $H_2 \times R_2$ | $H_2 \times R_3$ | $H_2 \times R_4$ | $H_2 \times R_5$ | $H_2 \times R_6$ |
| $HV_3$ | $H_3 \times R_1$ | $H_3 \times R_2$ | $H_3 \times R_3$ | $H_3 \times R_4$ | $H_3 \times R_5$ | $H_3 \times R_6$ |
| $HV_4$ | $H_4 \times R_1$ | $H_4 \times R_2$ | $H_4 \times R_3$ | $H_4 \times R_4$ | $H_4 \times R_5$ | $H_4 \times R_6$ |
| $HV_5$ | $H_5 \times R_1$ | $H_5 \times R_2$ | $H_5 \times R_3$ | $H_5 \times R_4$ | $H_5 \times R_5$ | $H_5 \times R_6$ |
| $HV_6$ | $H_6 \times R_1$ | $H_6 \times R_2$ | $H_6 \times R_3$ | $H_6 \times R_4$ | $H_6 \times R_5$ | $H_6 \times R_6$ |

TABLE 3

| $H_1$ | $\frac{1}{4}\left[\frac{\delta_{HV}-0-\sigma}{|\delta_{HV}-0|+\sigma}+1\right]\times\left[\frac{\beta_1-\delta_{HV}-\sigma}{|\beta_1-\delta_{HV}|+\sigma}+1\right]$ |
|---|---|
| $H_2$ | $\frac{1}{4}\left[\frac{\delta_{HV}-\beta_1-\sigma}{|\delta_{HV}-\beta_1|+\sigma}+1\right]\times\left[\frac{\frac{\pi}{2}-\delta_{HV}-\sigma}{\left|\frac{\pi}{2}-\delta_{HV}\right|+\sigma}+1\right]$ |
| $H_3$ | $\frac{1}{4}\left[\frac{\delta_{HV}-\frac{\pi}{2}-\sigma}{\left|\delta_{HV}-\frac{\pi}{2}\right|+\sigma}+1\right]\times\left[\frac{\pi-\delta_{HV}-\sigma}{|\pi-\delta_{HV}|+\sigma}+1\right]$ |
| $H_4$ | $\frac{1}{4}\left[\frac{\delta_{HV}-\pi-\sigma}{|\delta_{HV}-\pi|+\sigma}+1\right]\times\left[\frac{\beta_1+\pi-\delta_{HV}-\sigma}{|\beta_1+\pi-\delta_{HV}|+\sigma}+1\right]$ |
| $H_5$ | $\frac{1}{4}\left[\frac{\delta_{HV}-(\beta_1+\pi)-\sigma}{|\delta_{HV}-(\beta_1+\pi)|+\sigma}+1\right]\times\left[\frac{\frac{3\pi}{2}-\delta_{HV}-\sigma}{\left|\frac{3\pi}{2}-\delta_{HV}\right|+\sigma}+1\right]$ |

TABLE 3-continued

| $H_6$ | $\frac{1}{4}\left[\frac{\delta_{HV}-\frac{3\pi}{2}-\sigma}{\left|\delta_{HV}-\frac{3\pi}{2}\right|+\sigma}+1\right]\times\left[\frac{2\pi-\delta_{HV}-\sigma}{|2\pi-\delta_{HV}|+\sigma}+1\right]$ |
|---|---|

TABLE 4

| $R_1$ | $\frac{1}{4}\left[\frac{\delta_{RV}-0-\sigma}{|\delta_{RV}-0|+\sigma}+1\right]\times\left[\frac{\beta_1-\delta_{RV}-\sigma}{|\beta_1-\delta_{RV}|+\sigma}+1\right]$ |
|---|---|
| $R_2$ | $\frac{1}{4}\left[\frac{\delta_{RV}-\beta_1-\sigma}{|\delta_{RV}-\beta_1|+\sigma}+1\right]\times\left[\frac{\frac{\pi}{2}-\delta_{RV}-\sigma}{\left|\frac{\pi}{2}-\delta_{RV}\right|+\sigma}+1\right]$ |
| $R_3$ | $\frac{1}{4}\left[\frac{\delta_{RV}-\frac{\pi}{2}-\sigma}{\left|\delta_{RV}-\frac{\pi}{2}\right|+\sigma}+1\right]\times\left[\frac{\pi-\delta_{RV}-\sigma}{|\pi-\delta_{RV}|+\sigma}+1\right]$ |
| $R_4$ | $\frac{1}{4}\left[\frac{\delta_{RV}-\pi-\sigma}{|\delta_{RV}-\pi|+\sigma}+1\right]\times\left[\frac{\beta_1+\pi-\delta_{RV}-\sigma}{|\beta_1+\pi-\delta_{RV}|+\sigma}+1\right]$ |
| $R_5$ | $\frac{1}{4}\left[\frac{\delta_{RV}-(\beta_1+\pi)-\sigma}{|\delta_{RV}-(\beta_1+\pi)|+\sigma}+1\right]\times\left[\frac{\frac{3\pi}{2}-\delta_{RV}-\sigma}{\left|\frac{3\pi}{2}-\delta_{RV}\right|+\sigma}+1\right]$ |
| $R_6$ | $\frac{1}{4}\left[\frac{\delta_{RV}-\frac{3\pi}{2}-\sigma}{\left|\delta_{RV}-\frac{3\pi}{2}\right|+\sigma}+1\right]\times\left[\frac{2\pi-\delta_{RV}-\sigma}{|2\pi-\delta_{RV}|+\sigma}+1\right]$ |

In some embodiments, for the first orientation sector $Q_1$, generating projected vehicle transportation network information may include determining a host vehicle approach angle $\alpha_{HV}$ for the host vehicle based on the host vehicle region $HV_n$, the remote vehicle region $RV_n$ the host vehicle heading angle $\delta_{HV}$, and the convergence angle $\beta_1$, as expressed in Table 5.

TABLE 5

| $\alpha_{HV}=$ | $RV_1$ | $RV_2$ | $RV_3$ | $RV_4$ | $RV_5$ | $RV_6$ |
|---|---|---|---|---|---|---|
| $HV_1$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ |
| $HV_2$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_3$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_4$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_5$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ |
| $HV_6$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ |

In some embodiments, for the first orientation sector $Q_1$, generating projected vehicle transportation network information may include determining a remote vehicle approach angle $\alpha_{HV}$ for the remote vehicle based on the host vehicle region $HV_n$, the remote vehicle region $RV_n$, the remote vehicle heading angle $\delta_{HV}$, and the convergence angle $\beta_1$, as expressed in Table 6.

TABLE 6

| $\alpha_{RV}=$ | $RV_1$ | $RV_2$ | $RV_3$ | $RV_4$ | $RV_5$ | $RV_6$ |
|---|---|---|---|---|---|---|
| $HV_1$ | $\delta_{RV} - \beta_1 + \pi$ | 0 | 0 | 0 | $\delta_{RV} - \beta_1 - \pi$ | $\delta_{RV} - \beta_1 - \pi$ |
| $HV_2$ | 0 | $-(\delta_{RV} - \beta_1 - \pi)$ | $-(\delta_{RV} - \beta_1 - \pi)$ | $-(\delta_{RV} - \beta_1 - \pi)$ | 0 | 0 |
| $HV_3$ | 0 | 0 | $-(\delta_{RV} - \beta_1 - \pi)$ | $-(\delta_{RV} - \beta_1 - \pi)$ | 0 | 0 |
| $HV_4$ | 0 | 0 | 0 | $-(\delta_{RV} - \beta_1 - \pi)$ | 0 | 0 |
| $HV_5$ | 0 | 0 | 0 | 0 | $\delta_{RV} - \beta_1 - \pi$ | 0 |
| $HV_6$ | 0 | 0 | 0 | 0 | $\delta_{RV} - \beta_1 - \pi$ | $\delta_{RV} - \beta_1 - \pi$ |

In some embodiments, for the first orientation sector $Q_1$, generating projected vehicle transportation network information may include determining an intersection angle $\alpha_D$ based on the host vehicle region $HV_n$, the remote vehicle region $RV_n$, the host vehicle heading angle $\delta_{HV}$, and the remote vehicle heading angle $\delta_{RV}$, as expressed in Table 7.

TABLE 7

| $\alpha_D=$ | $RV_1$ | $RV_2$ | $RV_3$ | $RV_4$ | $RV_5$ | $RV_6$ |
|---|---|---|---|---|---|---|
| $HV_1$ | $\delta_{HV} - \delta_{RV}$ | 0 | 0 | 0 | $2\pi - \delta_{HV} - \delta_{RV}$ | $2\pi - \delta_{HV} - \delta_{RV}$ |
| $HV_2$ | 0 | $-(\delta_{HV} - \delta_{RV})$ | $-(\delta_{HV} - \delta_{RV})$ | $-(\delta_{HV} - \delta_{RV})$ | 0 | 0 |
| $HV_3$ | 0 | 0 | $-(\delta_{HV} - \delta_{RV})$ | $-(\delta_{HV} - \delta_{RV})$ | 0 | 0 |
| $HV_4$ | 0 | 0 | 0 | $-(\delta_{HV} - \delta_{RV})$ | 0 | 0 |
| $HV_5$ | 0 | 0 | 0 | 0 | $\delta_{RV} - \beta_1 - \pi$ | 0 |
| $HV_6$ | 0 | 0 | 0 | 0 | $\delta_{HV} - \delta_{RV}$ | $\delta_{HV} - \delta_{RV}$ |

In FIG. 6, $L_{HV}$ indicates a distance from the host vehicle to the projected point of convergence with the remote vehicle expected path 6100, and $L_{RV}$ indicates a distance from the remote vehicle to the projected point of convergence with the host vehicle expected path 6000.

FIG. 7 is a diagram of identifying inter-vehicle state information including a geodesic for a second orientation sector for use in generating projected vehicle transportation network information in accordance with this disclosure. Identifying inter-vehicle state information including the geodesic for the second orientation sector for use in generating projected vehicle transportation network information may be similar to the identification shown in FIG. 5, except as described herein. In the second orientation sector $Q_2$ the remote vehicle, and the geodesic, is located to the southeast of the host vehicle in the geospatial domain.

In some embodiments, as shown in FIG. 7, for the second orientation sector $Q_2$, generating projected vehicle transportation network information may include determining a host vehicle region for the host vehicle. A first host vehicle region may include host vehicle heading angles $\delta_{HV}$ from the reference direction, which may correspond with north, to ninety degrees, which may correspond with east, and which may be expressed as $0<=\delta_{HV}<\pi/2$. A second host vehicle region may include host vehicle heading angles $\delta_{HV}$ from ninety degrees to the convergence angle $\beta_1$ of the geodesic, and which may be expressed as $\pi/2<=\delta_{HV}<\beta_1$. A third host vehicle region may include host vehicle heading angles $\delta_{HV}$ from the convergence angle $\beta_1$ of the geodesic to 180 degrees, which may correspond with south, and which may be expressed as $\beta_1<=\delta_{HV}<\pi$. A fourth host vehicle region may include host vehicle heading angles $\delta_{HV}$ from 180 degrees to 270 degrees, which may correspond with west, and which may be expressed as $\pi<=\delta_{HV}<3\pi/2$. A fifth host vehicle region may include host vehicle heading angles $\delta_{HV}$ from 270 degrees to a sum of the convergence angle $\beta_1$ of the geodesic and 180 degrees $\pi$, which may be expressed as $3\pi/2<=\delta_{HV}<\beta_1+\pi$. A sixth host vehicle region may include host vehicle heading angles $\delta_{HV}$ from the sum of the convergence angle $\beta_1$ of the geodesic and 180 degrees $\pi$ to 360 degrees, which may correspond with the reference direction, north, and which may be expressed as $\beta_1+\pi<=\delta_{HV}<2\pi$.

In some embodiments, as shown in FIG. 7, for the second orientation sector, generating projected vehicle transportation network information may include determining a remote vehicle region for the remote vehicle. A first remote vehicle region may include remote vehicle heading angles $\delta_{RV}$ from the reference direction, which may correspond with north, to ninety degrees, which may correspond with east, and which may be expressed as $0<=\delta_{RV}<\pi/2$. A second remote vehicle region may include remote vehicle heading angles $\delta_{RV}$ from ninety degrees to the convergence angle $\beta_1$ of the geodesic, and which may be expressed as $\pi/2<=\delta_{RV}<\beta_1$. A third remote vehicle region may include remote vehicle heading angles $\delta_{RV}$ from the convergence angle $\beta_1$ of the geodesic to 180 degrees, which may correspond with south, and which may be expressed as $\beta_1<=\delta_{RV}<\pi$. A fourth remote vehicle region may include remote vehicle heading angles $\delta_{RV}$ from 180 degrees to 270 degrees, which may correspond with west, and which may be expressed as $\pi<=\delta_{RV}<3\pi/2$. A fifth remote vehicle region may include remote vehicle heading angles $\delta_{RV}$ from 270 degrees to a sum of the convergence angle $\beta_1$ of the geodesic and 180 degrees $\pi$, which may be expressed as $3\pi/2<=\delta_{RV}<\beta_1+\pi$. A sixth remote vehicle region may include remote vehicle heading angles $\delta_{RV}$ from the sum of the convergence angle $\beta_1$ of the geodesic and 180 degrees $\pi$ to 360 degrees, which may correspond with the reference direction, north, and which may be expressed as $\beta_1+\pi<=\delta_{RV}<2\pi$.

FIG. 8 is a diagram of identifying inter-vehicle state information including convergence information for the second orientation sector for use in generating projected vehicle transportation network information in accordance with this disclosure. Identifying inter-vehicle state information including a geodesic for the second orientation sector for use in generating projected vehicle transportation network information may be similar to the identification shown in FIG. 6, except as described herein.

In some embodiments, for the second orientation sector $Q_2$, generating projected vehicle transportation network information may include identifying a host vehicle expected path 8000 for the host vehicle (HV), identifying respective remote vehicle expected paths 8100 for one or more of the remote vehicles (RV), or identifying respective expected paths 8000/8100 for the host vehicle and for one or more of the remote vehicles. In some embodiments, the expected paths may be projected, such as in a straight line, from the respective heading information.

In some embodiments, generating projected vehicle transportation network information may include determining whether the remote vehicle expected path 8100 and the host vehicle expected path 8000 are convergent, which may indicate that the host vehicle expected path 8000 and the respective remote vehicle expected path 8100 intersect.

In some embodiments, for the second orientation sector $Q_2$, determining whether the remote vehicle expected path 8100 and the host vehicle expected path 8000 are convergent may include examining defined convergence data, such as the defined convergence data shown in Table 8.

TABLE 8

|     | $RV_1$ | $RV_2$ | $RV_3$ | $RV_4$ | $RV_5$ | $RV_6$ |
|-----|--------|--------|--------|--------|--------|--------|
| $HV_1$ | $\eta_{HV}$ | 0 | 0 | 0 | 0 | 1 |
| $HV_2$ | 1 | $\eta_{HV}$ | 0 | 0 | 0 | 1 |
| $HV_3$ | 0 | 1 | $\eta_{RV}$ | 1 | 1 | 0 |
| $HV_4$ | 0 | 1 | 1 | $\eta_{RV}$ | 1 | 0 |
| $HV_5$ | 0 | 0 | 0 | 0 | $\eta_{RV}$ | 0 |
| $HV_6$ | 0 | 0 | 0 | 0 | 0 | $\eta_{HV}$ |

In some embodiments, for the second orientation sector, determining $\eta_{HV}$ may be expressed as shown in Equation 3. In some embodiments, determining $\eta_{RV}$ may be expressed as shown in Equation 4.

In some embodiments, for the second orientation sector $Q_2$, a combination ($F_{m,n}$) of the host vehicle heading angle $\delta_{HV}$ and the remote vehicle heading angle $\delta_{RV}$ may be expressed as shown in Tables 9-11.

TABLE 9

| $F_{m,n}$ | $RV_1$ | $RV_2$ | $RV_3$ | $RV_4$ | $RV_5$ | $RV_6$ |
|-----------|--------|--------|--------|--------|--------|--------|
| $HV_1$ | $H_1 \times R_1$ | $H_1 \times R_2$ | $H_1 \times R_3$ | $H_1 \times R_4$ | $H_1 \times R_5$ | $H_1 \times R_6$ |
| $HV_2$ | $H_2 \times R_1$ | $H_2 \times R_2$ | $H_2 \times R_3$ | $H_2 \times R_4$ | $H_2 \times R_5$ | $H_2 \times R_6$ |
| $HV_3$ | $H_3 \times R_1$ | $H_3 \times R_2$ | $H_3 \times R_3$ | $H_3 \times R_4$ | $H_3 \times R_5$ | $H_3 \times R_6$ |
| $HV_4$ | $H_4 \times R_1$ | $H_4 \times R_2$ | $H_4 \times R_3$ | $H_4 \times R_4$ | $H_4 \times R_5$ | $H_4 \times R_6$ |
| $HV_5$ | $H_5 \times R_1$ | $H_5 \times R_2$ | $H_5 \times R_3$ | $H_5 \times R_4$ | $H_5 \times R_5$ | $H_5 \times R_6$ |
| $HV_6$ | $H_6 \times R_1$ | $H_6 \times R_2$ | $H_6 \times R_3$ | $H_6 \times R_4$ | $H_6 \times R_5$ | $H_6 \times R_6$ |

TABLE 10

| $H_1$ | $\frac{1}{4}\left[\frac{\delta_{HV}-0-\sigma}{|\delta_{HV}-0|+\sigma}+1\right] \times \left[\frac{\frac{\pi}{2}-\delta_{HV}-\sigma}{\left|\frac{\pi}{2}-\delta_{HV}\right|+\sigma}+1\right]$ |
|---|---|

TABLE 10-continued

| $H_2$ | $\frac{1}{4}\left[\frac{\delta_{HV}-\frac{\pi}{2}-\sigma}{\left|\delta_{HV}-\frac{\pi}{2}\right|+\sigma}+1\right] \times \left[\frac{\beta_1-\delta_{HV}-\sigma}{|\beta_1-\delta_{HV}|+\sigma}+1\right]$ |
|---|---|
| $H_3$ | $\frac{1}{4}\left[\frac{\delta_{HV}-\beta_1-\sigma}{|\delta_{HV}-\beta_1|+\sigma}+1\right] \times \left[\frac{\pi-\delta_{HV}-\sigma}{|\pi-\delta_{HV}|+\sigma}+1\right]$ |
| $H_4$ | $\frac{1}{4}\left[\frac{\delta_{HV}-\pi-\sigma}{|\delta_{HV}-\pi|+\sigma}+1\right] \times \left[\frac{\frac{3\pi}{2}-\delta_{HV}-\sigma}{\left|\frac{3\pi}{2}-\delta_{HV}\right|+\sigma}+1\right]$ |
| $H_5$ | $\frac{1}{4}\left[\frac{\delta_{HV}-\frac{3\pi}{2}-\sigma}{\left|\delta_{HV}-\frac{3\pi}{2}\right|+\sigma}+1\right] \times \left[\frac{\beta_1+\pi-\delta_{HV}-\sigma}{|\beta_1+\pi-\delta_{HV}|+\sigma}+1\right]$ |
| $H_6$ | $\frac{1}{4}\left[\frac{\delta_{HV}-(\beta_1+\pi)-\sigma}{|\delta_{HV}-(\beta_1+\pi)|+\sigma}+1\right] \times \left[\frac{2\pi-\delta_{HV}-\sigma}{|2\pi-\delta_{HV}|+\sigma}+1\right]$ |

TABLE 11

| $R_1$ | $\frac{1}{4}\left[\frac{\delta_{RV}-0-\sigma}{|\delta_{RV}-0|+\sigma}+1\right] \times \left[\frac{\frac{\pi}{2}-\delta_{RV}-\sigma}{\left|\frac{\pi}{2}-\delta_{RV}\right|+\sigma}+1\right]$ |
|---|---|
| $R_2$ | $\frac{1}{4}\left[\frac{\delta_{RV}-\frac{\pi}{2}-\sigma}{\left|\delta_{RV}-\frac{\pi}{2}\right|+\sigma}+1\right] \times \left[\frac{\beta_1-\delta_{RV}-\sigma}{|\beta_1-\delta_{RV}|+\sigma}+1\right]$ |
| $R_3$ | $\frac{1}{4}\left[\frac{\delta_{RV}-\beta_1-\sigma}{|\delta_{RV}-\beta_1|+\sigma}+1\right] \times \left[\frac{\pi-\delta_{RV}-\sigma}{|\pi-\delta_{RV}|+\sigma}+1\right]$ |
| $R_4$ | $\frac{1}{4}\left[\frac{\delta_{RV}-\pi-\sigma}{|\delta_{RV}-\pi|+\sigma}+1\right] \times \left[\frac{\frac{3\pi}{2}-\delta_{RV}-\sigma}{\left|\frac{3\pi}{2}-\delta_{RV}\right|+\sigma}+1\right]$ |
| $R_5$ | $\frac{1}{4}\left[\frac{\delta_{RV}-\frac{3\pi}{2}-\sigma}{\left|\delta_{RV}-\frac{3\pi}{2}\right|+\sigma}+1\right] \times \left[\frac{(\beta_1+\pi)-\delta_{RV}-\sigma}{|(\beta_1+\pi)-\delta_{RV}|+\sigma}+1\right]$ |
| $R_6$ | $\frac{1}{4}\left[\frac{\delta_{RV}-(\beta_1+\pi)-\sigma}{|\delta_{RV}-(\beta_1+\pi)|+\sigma}+1\right] \times \left[\frac{2\pi-\delta_{RV}-\sigma}{|2\pi-\delta_{RV}|+\sigma}+1\right]$ |

In some embodiments, for the second orientation sector $Q_2$, generating projected vehicle transportation network information may include determining a host vehicle approach angle $\alpha_{HV}$ for the host vehicle based on the host vehicle region $HV_n$, the remote vehicle region $RV_n$, the host vehicle heading angle $\delta_{HV}$, and the convergence angle $\beta_1$, as expressed in Table 12.

TABLE 12

| $\alpha_{HV}=$ | $RV_1$ | $RV_2$ | $RV_3$ | $RV_4$ | $RV_5$ | $RV_6$ |
|---|---|---|---|---|---|---|
| $HV_1$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ |
| $HV_2$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ |
| $HV_3$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_4$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_5$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |
| $HV_6$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ | $2\pi-(\delta_{HV}-\beta_1)$ |

In some embodiments, for the second orientation sector $Q_2$, generating projected vehicle transportation network information may include determining a remote vehicle approach angle $\alpha_{RV}$ for the remote vehicle based on the host vehicle region $HV_n$, the remote vehicle region $RV_n$, the remote vehicle heading angle $\delta_{RV}$, and the convergence angle $\beta_1$, as expressed in Table 13.

TABLE 13

| $\alpha_{RV} =$ | $RV_1$ | $RV_2$ | $RV_3$ | $RV_4$ | $RV_5$ | $RV_6$ |
|---|---|---|---|---|---|---|
| $HV_1$ | $\delta_{RV} - \beta_1 + \pi$ | 0 | 0 | 0 | 0 | $\delta_{RV} - \beta_1 - \pi$ |
| $HV_2$ | $\delta_{RV} - \beta_1 + \pi$ | $\delta_{RV} - \beta_1 + \pi$ | 0 | 0 | 0 | $\delta_{RV} - \beta_1 - \pi$ |
| $HV_3$ | 0 | 0 | $-(\delta_{RV} - \beta_1 - \pi)$ | $-(\delta_{RV} - \beta_1 - \pi)$ | $-(\delta_{RV} - \beta_1 - \pi)$ | 0 |
| $HV_4$ | 0 | 0 | 0 | $-(\delta_{RV} - \beta_1 - \pi)$ | $-(\delta_{RV} - \beta_1 - \pi)$ | 0 |
| $HV_5$ | 0 | 0 | 0 | 0 | $-(\delta_{RV} - \beta_1 - \pi)$ | 0 |
| $HV_6$ | 0 | 0 | 0 | 0 | 0 | $\delta_{RV} - \beta_1 - \pi$ |

In some embodiments, for the second orientation sector, generating projected vehicle transportation network information may include determining an intersection angle $\alpha_D$ based on the host vehicle region $HV_n$, the remote vehicle region $RV_n$, the host vehicle heading angle $\delta_{HV}$, and the remote vehicle heading angle $\delta_{RV}$, as expressed in Table 14.

TABLE 14

| $\alpha_D =$ | $RV_1$ | $RV_2$ | $RV_3$ | $RV_4$ | $RV_5$ | $RV_6$ |
|---|---|---|---|---|---|---|
| $HV_1$ | $\delta_{HV} - \delta_{RV}$ | 0 | 0 | 0 | 0 | $\delta_{HV} - \delta_{RV} + 2\pi$ |
| $HV_2$ | $\delta_{HV} - \delta_{RV}$ | $\delta_{HV} - \delta_{RV}$ | 0 | 0 | 0 | $\delta_{HV} - \delta_{RV} + 2\pi$ |
| $HV_3$ | 0 | 0 | $-(\delta_{HV} - \delta_{RV})$ | $-(\delta_{HV} - \delta_{RV})$ | $-(\delta_{HV} - \delta_{RV})$ | 0 |
| $HV_4$ | 0 | 0 | 0 | $-(\delta_{HV} - \delta_{RV})$ | $-(\delta_{HV} - \delta_{RV})$ | 0 |
| $HV_5$ | 0 | 0 | 0 | 0 | $-(\delta_{HV} - \delta_{RV})$ | 0 |
| $HV_6$ | 0 | 0 | 0 | 0 | 0 | $\delta_{HV} - \delta_{RV}$ |

In FIG. 8, $L_{HV}$ indicates a distance from the host vehicle to the projected point of convergence with the remote vehicle expected path 8100, and $L_{RV}$ indicates a distance from the remote vehicle to the projected point of convergence with the host vehicle expected path 8000.

FIG. 9 is a diagram of identifying inter-vehicle state information including a geodesic for a third orientation sector for use in generating projected vehicle transportation network information in accordance with this disclosure. Identifying inter-vehicle state information including a geodesic for a third orientation sector for use in generating projected vehicle transportation network information may be similar to the identification shown in FIG. 5, except as described herein. In the third orientation sector $Q_3$ the remote vehicle, and the geodesic, is located to the southwest of the host vehicle in the geospatial domain.

In some embodiments, as shown in FIG. 9, for the third orientation sector, generating projected vehicle transportation network information may include determining a host vehicle region for the host vehicle. A first host vehicle region may include host vehicle heading angles $\delta_{HV}$ from the reference direction, which may correspond with north, to a difference of the convergence angle $\beta_1$ of the geodesic and 180 degrees $\pi$, which may be expressed as $0 <= \delta_{HV} < \beta_1 - \pi$. A second host vehicle region may include host vehicle heading angles $\delta_{HV}$ from the difference of the convergence angle $\beta_1$ of the geodesic and 180 degrees to ninety degrees, which may correspond with east, and which may be expressed as $\beta_1 - \pi <= \delta_{HV} < \pi/2$. A third host vehicle region may include host vehicle heading angles $\delta_{HV}$ from ninety degrees to 180 degrees, which may correspond with south, and which may be expressed as $\pi/2 <= \delta_{HV} < \pi$. A fourth host vehicle region may include host vehicle heading angles $\delta_{HV}$ from 180 degrees to the convergence angle $\beta_1$ of the geodesic, which may be expressed as $\pi <= \delta_{HV} < \beta_1$. A fifth host vehicle region may include host vehicle heading angles $\delta_{HV}$ from the convergence angle $\beta_1$ of the geodesic, to 270 degrees, which may correspond with west, and which may be expressed as $\beta_1 <= \delta_{HV} < 3\pi/2$. A sixth host vehicle region may include host vehicle heading angles $\delta_{HV}$ from 270 degrees to 360 degrees, which may correspond with the reference direction, north, and which may be expressed as $3\pi/2 <= \delta_{HV} < 2\pi$.

In some embodiments, as shown in FIG. 9, for the third orientation sector, generating projected vehicle transportation network information may include determining a remote vehicle region for the remote vehicle. A first remote vehicle region may include remote vehicle heading angles $\delta_{RV}$ from the reference direction, which may correspond with north, to a difference of the convergence angle $\beta_1$ of the geodesic and 180 degrees $\pi$, which may be expressed as $0 <= \delta_{RV} < \beta_1 - \pi$. A second remote vehicle region may include remote vehicle heading angles $\delta_{RV}$ from the difference of the convergence angle $\beta_1$ of the geodesic and 180 degrees $\pi$ to ninety degrees, which may correspond with east, and which may be expressed as $\beta_1 - \pi <= \delta_{RV} < \pi/2$. A third remote vehicle region may include remote vehicle heading angles $\delta_{RV}$ from ninety degrees to 180 degrees, which may correspond with south, and which may be expressed as $\pi/2 <= \delta_{RV} < \pi$. A fourth remote vehicle region may include remote vehicle heading angles $\delta_{RV}$ from 180 degrees to the convergence angle $\beta_1$ of the geodesic, which may be expressed as $\pi <= \delta_{RV} < \beta_1$. A fifth remote vehicle region may include remote vehicle heading angles $\delta_{RV}$ from the convergence angle $\beta_1$ of the geodesic, to 270 degrees, which may correspond with west, and which may be expressed as $\beta_1 <= \delta_{RV} < 3\pi/2$. A sixth remote vehicle region may include remote vehicle heading angles $\delta_{RV}$ from 270 degrees to 360 degrees, which may correspond with the reference direction, north, and which may be expressed as $3\pi/2 <= \delta_{RV} < 2\pi$.

FIG. 10 is a diagram of identifying inter-vehicle state information including convergence information for the third orientation sector for use in generating projected vehicle transportation network information in accordance with this disclosure. Identifying inter-vehicle state information including a geodesic for the third orientation sector for use in generating projected vehicle transportation network information may be similar to the identification shown in FIG. 6, except as described herein.

In some embodiments, for the third orientation sector $Q_3$, generating projected vehicle transportation network information may include identifying a host vehicle expected path 10000 for the host vehicle (HV), identifying respective remote vehicle expected paths 10100 for one or more of the remote vehicles (RV), or identifying respective expected paths 10000/10100 for the host vehicle and for one or more of the remote vehicles. In some embodiments, the expected paths may be projected, such as in a straight line, from the respective heading information.

In some embodiments, generating projected vehicle transportation network information may include determining whether the remote vehicle expected path 10100 and the host vehicle expected path 10000 are convergent, which may indicate that the host vehicle expected path 10000 and the respective remote vehicle expected path 10100 intersect.

In some embodiments, for the third orientation sector $Q_3$, determining whether the remote vehicle expected path 10100 and the host vehicle expected path 10000 are convergent may include examining defined convergence data, such as the defined convergence data shown in Table 15.

TABLE 15

|  | $RV_1$ | $RV_2$ | $RV_3$ | $RV_4$ | $RV_5$ | $RV_6$ |
|---|---|---|---|---|---|---|
| $HV_1$ | $\eta_{RV}$ | 0 | 0 | 0 | 0 | 0 |
| $HV_2$ | 0 | $\eta_{HV}$ | 0 | 0 | 0 | 0 |
| $HV_3$ | 0 | 1 | $\eta_{HV}$ | 0 | 0 | 0 |
| $HV_4$ | 0 | 1 | 1 | $\eta_{HV}$ | 0 | 0 |
| $HV_5$ | 1 | 0 | 0 | 0 | $\eta_{RV}$ | 1 |
| $HV_6$ | 1 | 0 | 0 | 0 | 0 | $\eta_{RV}$ |

In some embodiments, for the third orientation sector $Q_3$, determining $\eta_{HV}$ may be expressed as shown in Equation 3. In some embodiments, determining $\eta_{HV}$ may be expressed as shown in Equation 4.

In some embodiments, for the third orientation sector $Q_3$, a combination ($F_{m,n}$) of the host vehicle heading angle $\delta_{HV}$ and the remote vehicle heading angle $\delta_{RV}$ may be expressed as shown in Tables 16-18.

TABLE 16

| $F_{m,n}$ | $RV_1$ | $RV_2$ | $RV_3$ | $RV_4$ | $RV_5$ | $RV_6$ |
|---|---|---|---|---|---|---|
| $HV_1$ | $H_1 \times R_1$ | $H_1 \times R_2$ | $H_1 \times R_3$ | $H_1 \times R_4$ | $H_1 \times R_5$ | $H_1 \times R_6$ |
| $HV_2$ | $H_2 \times R_1$ | $H_2 \times R_2$ | $H_2 \times R_3$ | $H_2 \times R_4$ | $H_2 \times R_5$ | $H_2 \times R_6$ |
| $HV_3$ | $H_3 \times R_1$ | $H_3 \times R_2$ | $H_3 \times R_3$ | $H_3 \times R_4$ | $H_3 \times R_5$ | $H_3 \times R_6$ |
| $HV_4$ | $H_4 \times R_1$ | $H_4 \times R_2$ | $H_4 \times R_3$ | $H_4 \times R_4$ | $H_4 \times R_5$ | $H_4 \times R_6$ |
| $HV_5$ | $H_5 \times R_1$ | $H_5 \times R_2$ | $H_5 \times R_3$ | $H_5 \times R_4$ | $H_5 \times R_5$ | $H_5 \times R_6$ |
| $HV_6$ | $H_6 \times R_1$ | $H_6 \times R_2$ | $H_6 \times R_3$ | $H_6 \times R_4$ | $H_6 \times R_5$ | $H_6 \times R_6$ |

TABLE 17

| $H_1$ | $\frac{1}{4}\left[\frac{\delta_{HV} - 0 - \sigma}{|\delta_{HV} - 0| + \sigma} + 1\right] \times \left[\frac{\beta_1 - \pi - \delta_{HV} - \sigma}{|\beta_1 - \pi - \delta_{HV}| + \sigma} + 1\right]$ |
|---|---|

TABLE 17-continued

| $H_2$ | $\frac{1}{4}\left[\frac{\delta_{HV} - (\beta_1 - \pi) - \sigma}{|\delta_{HV} - (\beta_1 - \pi)| + \sigma} + 1\right] \times \left[\frac{\frac{\pi}{2} - \delta_{HV} - \sigma}{\left|\frac{\pi}{2} - \delta_{HV}\right| + \sigma} + 1\right]$ |
|---|---|
| $H_3$ | $\frac{1}{4}\left[\frac{\delta_{HV} - \frac{\pi}{2} - \sigma}{\left|\delta_{HV} - \frac{\pi}{2}\right| + \sigma} + 1\right] \times \left[\frac{\pi - \delta_{HV} - \sigma}{|\pi - \delta_{HV}| + \sigma} + 1\right]$ |
| $H_4$ | $\frac{1}{4}\left[\frac{\delta_{HV} - \pi - \sigma}{|\delta_{HV} - \pi| + \sigma} + 1\right] \times \left[\frac{\beta_1 - \delta_{HV} - \sigma}{|\beta_1 - \delta_{HV}| + \sigma} + 1\right]$ |
| $H_5$ | $\frac{1}{4}\left[\frac{\delta_{HV} - \beta_1 - \sigma}{|\delta_{HV} - \beta_1| + \sigma} + 1\right] \times \left[\frac{\frac{3\pi}{2} - \delta_{HV} - \sigma}{\left|\frac{3\pi}{2} - \delta_{HV}\right| + \sigma} + 1\right]$ |
| $H_6$ | $\frac{1}{4}\left[\frac{\delta_{HV} - \frac{3\pi}{2} - \sigma}{\left|\delta_{HV} - \frac{3\pi}{2}\right| + \sigma} + 1\right] \times \left[\frac{2\pi - \delta_{HV} - \sigma}{|2\pi - \delta_{HV}| + \sigma} + 1\right]$ |

TABLE 18

| $R_1$ | $\frac{1}{4}\left[\frac{\delta_{RV} - 0 - \sigma}{|\delta_{RV} - 0| + \sigma} + 1\right] \times \left[\frac{\beta_1 - \pi - \delta_{RV} - \sigma}{|\beta_1 - \pi - \delta_{RV}| + \sigma} + 1\right]$ |
|---|---|
| $R_2$ | $\frac{1}{4}\left[\frac{\delta_{RV} - (\beta_1 - \pi) - \sigma}{|\delta_{RV} - (\beta_1 - \pi)| + \sigma} + 1\right] \times \left[\frac{\frac{\pi}{2} - \delta_{RV} - \sigma}{\left|\frac{\pi}{2} - \delta_{RV}\right| + \sigma} + 1\right]$ |
| $R_3$ | $\frac{1}{4}\left[\frac{\delta_{RV} - \frac{\pi}{2} - \sigma}{\left|\delta_{RV} - \frac{\pi}{2}\right| + \sigma} + 1\right] \times \left[\frac{\pi - \delta_{RV} - \sigma}{|\pi - \delta_{RV}| + \sigma} + 1\right]$ |
| $R_4$ | $\frac{1}{4}\left[\frac{\delta_{RV} - \pi - \sigma}{|\delta_{RV} - \pi| + \sigma} + 1\right] \times \left[\frac{\beta_1 - \delta_{RV} - \sigma}{|\beta_1 - \delta_{RV}| + \sigma} + 1\right]$ |
| $R_5$ | $\frac{1}{4}\left[\frac{\delta_{RV} - \beta_1 - \sigma}{|\delta_{RV} - \beta_1| + \sigma} + 1\right] \times \left[\frac{\frac{3\pi}{2} - \delta_{RV} - \sigma}{\left|\frac{3\pi}{2} - \delta_{RV}\right| + \sigma} + 1\right]$ |
| $R_6$ | $\frac{1}{4}\left[\frac{\delta_{RV} - \frac{3\pi}{2} - \sigma}{\left|\delta_{RV} - \frac{3\pi}{2}\right| + \sigma} + 1\right] \times \left[\frac{2\pi - \delta_{RV} - \sigma}{|2\pi - \delta_{RV}| + \sigma} + 1\right]$ |

In some embodiments, for the third orientation sector $Q_3$, generating projected vehicle transportation network information may include determining a host vehicle approach angle $\alpha_{HV}$ for the host vehicle based on the host vehicle region $HV_n$, the remote vehicle region $RV_n$, the host vehicle heading angle $\delta_{HV}$, and the convergence angle $\beta_1$, as expressed in Table 19.

TABLE 19

| $\alpha_{HV}=$ | $RV_1$ | $RV_2$ | $RV_3$ | $RV_4$ | $RV_5$ | $RV_6$ |
|---|---|---|---|---|---|---|
| $HV_1$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ |
| $HV_2$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_3$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_4$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |
| $HV_5$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ |
| $HV_6$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ | $\delta_{HV} - \beta_1$ |

In some embodiments, for the third orientation sector $Q_3$, generating projected vehicle transportation network information may include determining a remote vehicle approach angle $\alpha_{HV}$ for the remote vehicle based on the host vehicle region $HV_n$, the remote vehicle region $RV_n$, the remote vehicle heading angle $\delta_{HV}$, and the convergence angle $\beta_1$, as expressed in Table 20.

TABLE 20

| $\alpha_{RV}=$ | $RV_1$ | $RV_2$ | $RV_3$ | $RV_4$ | $RV_5$ | $RV_6$ |
|---|---|---|---|---|---|---|
| $HV_1$ | $-(\delta_{RV} - \beta_1 + \pi)$ | 0 | 0 | 0 | 0 | 0 |
| $HV_2$ | 0 | $\delta_{RV} - \beta_1 + \pi$ | 0 | 0 | 0 | 0 |
| $HV_3$ | 0 | $\delta_{RV} - \beta_1 + \pi$ | $\delta_{RV} - \beta_1 + \pi$ | 0 | 0 | 0 |
| $HV_4$ | 0 | $\delta_{RV} - \beta_1 + \pi$ | $\delta_{RV} - \beta_1 + \pi$ | $\delta_{RV} - \beta_1 + \pi$ | 0 | 0 |
| $HV_5$ | $-(\delta_{RV} - \beta_1 + \pi)$ | 0 | 0 | 0 | $-(\delta_{RV} - \beta_1 - \pi)$ | $-(\delta_{RV} - \beta_1 - \pi)$ |
| $HV_6$ | $-(\delta_{RV} - \beta_1 + \pi)$ | 0 | 0 | 0 | 0 | $-(\delta_{RV} - \beta_1 - \pi)$ |

In some embodiments, for the third orientation sector $Q_3$, generating projected vehicle transportation network information may include determining an intersection angle $\alpha_D$ based on the host vehicle region $HV_n$, the remote vehicle region $RV_n$, the host vehicle heading angle $\delta_{HV}$, and the remote vehicle heading angle $\delta_{RV}$, as expressed in Table 21.

TABLE 21

| $\alpha_D=$ | $RV_1$ | $RV_2$ | $RV_3$ | $RV_4$ | $RV_5$ | $RV_6$ |
|---|---|---|---|---|---|---|
| $HV_1$ | $-(\delta_{HV} - \delta_{RV})$ | 0 | 0 | 0 | 0 | 0 |
| $HV_2$ | 0 | $\delta_{HV} - \delta_{RV}$ | 0 | 0 | 0 | 0 |
| $HV_3$ | 0 | $\delta_{HV} - \delta_{RV}$ | $\delta_{HV} - \delta_{RV}$ | 0 | 0 | 0 |
| $HV_4$ | 0 | $\delta_{HV} - \delta_{RV}$ | $\delta_{HV} - \delta_{RV}$ | $\delta_{HV} - \delta_{RV}$ | 0 | 0 |
| $HV_5$ | $2\pi - (\delta_{HV} - \delta_{RV})$ | 0 | 0 | 0 | $-(\delta_{HV} - \delta_{RV})$ | $-(\delta_{HV} - \delta_{RV})$ |
| $HV_6$ | $2\pi - (\delta_{HV} - \delta_{RV})$ | 0 | 0 | 0 | 0 | $-(\delta_{HV} - \delta_{RV})$ |

In FIG. 10, $L_{HV}$ indicates a distance from the host vehicle to the projected point of convergence with the remote vehicle expected path 10100, and $L_{RV}$ indicates a distance from the remote vehicle to the projected point of convergence with the host vehicle expected path 10000.

FIG. 11 is a diagram of identifying inter-vehicle state information including a geodesic for a fourth orientation sector for use in generating projected vehicle transportation network information in accordance with this disclosure. Identifying inter-vehicle state information including a geodesic for a fourth orientation sector for use in generating projected vehicle transportation network information may be similar to the identification shown in FIG. 5, except as described herein. In the fourth orientation sector $Q_4$ the remote vehicle, and the geodesic, is located to the northwest of the host vehicle in the geospatial domain.

In some embodiments, as shown in FIG. 11, for the fourth orientation sector $Q_4$, generating projected vehicle transportation network information may include determining a host vehicle region for the host vehicle. A first host vehicle region may include host vehicle heading angles $\delta_{HV}$ from the reference direction, which may correspond with north, to ninety degrees, which may correspond with east, and which may be expressed as $0<=\delta_{HV}<\pi/2$. A second host vehicle region may include host vehicle heading angles $\delta_{HV}$ from ninety degrees to a difference of the convergence angle $\beta_1$ of the geodesic and 180 degrees $\pi$, which may be expressed as $\pi/2<=\delta_{HV}<\beta_1-\pi$. A third host vehicle region may include host vehicle heading angles $\delta_{HV}$ from the difference of the convergence angle $\beta_1$ of the geodesic and 180 degrees $\pi$ to 180 degrees, which may correspond with south, and which may be expressed as $\beta_1-\pi<=\delta_{HV}<\pi$. A fourth host vehicle region may include host vehicle heading angles $\delta_{HV}$ from 180 degrees to 270 degrees, which may correspond with west, and which may be expressed as $\pi<=\delta_{HV}<3\pi/2$. A fifth host vehicle region may include host vehicle heading angles $\delta_{HV}$ from 270 degrees to the convergence angle $\beta_1$ of the geodesic, which may be expressed as $3\pi/2<=\delta_{HV}<\beta_1$. A sixth host vehicle region may include host vehicle heading angles $\delta_{HV}$ from the convergence angle $\beta_1$ of the geodesic to 360 degrees, which may correspond with the reference direction, north, and which may be expressed as $\beta_1<=\delta_{HV}<2\pi$.

In some embodiments, as shown in FIG. 11, for the fourth orientation sector, generating projected vehicle transportation network information may include determining a remote vehicle region for the remote vehicle. A first remote vehicle region may include remote vehicle heading angles $\delta_{RV}$ from the reference direction, which may correspond with north, to ninety degrees, which may correspond with east, and which may be expressed as $0<=\delta_{RV}<\pi/2$. A second remote vehicle region may include remote vehicle heading angles $\delta_{RV}$ from ninety degrees to a difference of the convergence angle $\beta_1$ of the geodesic and 180 degrees $\pi$, which may be expressed as $\pi/2<=\delta_{RV}<\beta_1-\pi$. A third remote vehicle region may include remote vehicle heading angles $\delta_{RV}$ from the difference of the convergence angle $\beta_1$ of the geodesic and 180 degrees $\pi$ to 180 degrees, which may correspond with south, and which may be expressed as $\beta_1-\pi<=\delta_{RV}<\pi$. A fourth remote vehicle region may include remote vehicle heading angles $\delta_{RV}$ from 180 degrees to 270 degrees, which may correspond with west, and which may be expressed as $\pi<=\delta_{RV}<3\pi/2$. A fifth remote vehicle region may include remote vehicle heading angles $\delta_{RV}$ from 270 degrees to the convergence angle $\beta_1$ of the geodesic, which may be expressed as $3\pi/2<=\delta_{RV}<\beta_1$. A sixth remote vehicle region may include remote vehicle heading angles $\beta_{RV}$ from the convergence angle $\beta_1$ of the geodesic to 360 degrees, which may correspond with the reference direction, north, and which may be expressed as $\beta_1<=\delta_{RV}<2\pi$.

FIG. 12 is a diagram of identifying inter-vehicle state information including convergence information for the fourth orientation sector for use in generating projected vehicle transportation network information in accordance with this disclosure. Identifying inter-vehicle state information including a geodesic for a fourth orientation sector for use in generating projected vehicle transportation network information may be similar to the identification shown in FIG. 6, except as described herein.

In some embodiments, for the fourth orientation sector $Q_4$, generating projected vehicle transportation network information may include identifying a host vehicle expected path 12000 for the host vehicle (HV), identifying respective remote vehicle expected paths 12100 for one or more of the remote vehicles (RV), or identifying respective expected paths 12000/12100 for the host vehicle and for one or more of the remote vehicles. In some embodiments, the expected paths may be projected, such as in a straight line, from the respective heading information.

In some embodiments, generating projected vehicle transportation network information may include determining whether the remote vehicle expected path 12100 and the host vehicle expected path 12000 are convergent, which may indicate that the host vehicle expected path 12000 and the respective remote vehicle expected path 12100 intersect.

In some embodiments, for the fourth orientation sector $Q_4$, determining whether the remote vehicle expected path 12100 and the host vehicle expected path 12000 are convergent may include examining defined convergence data, such as the defined convergence data shown in Table 22.

TABLE 22

|  | $RV_1$ | $RV_2$ | $RV_3$ | $RV_4$ | $RV_5$ | $RV_6$ |
|---|---|---|---|---|---|---|
| $HV_1$ | $\eta_{RV}$ | 1 | 0 | 0 | 0 | 0 |
| $HV_2$ | 0 | $\eta_{RV}$ | 0 | 0 | 0 | 0 |
| $HV_3$ | 0 | 0 | $\eta_{HV}$ | 0 | 0 | 0 |
| $HV_4$ | 0 | 0 | 1 | $\eta_{HV}$ | 0 | 0 |
| $HV_5$ | 0 | 0 | 1 | 1 | $\eta_{HV}$ | 0 |
| $HV_6$ | 1 | 1 | 0 | 0 | 1 | $\eta_{RV}$ |

In some embodiments, determining $\eta_{HV}$ may be expressed as shown in Equation 3. In some embodiments, determining $\eta_{RV}$ may be expressed as shown in Equation 4.

In some embodiments, for the fourth orientation sector $Q_4$, a combination ($F_{m,n}$) of the host vehicle heading angle $\delta_{HV}$ and the remote vehicle heading angle $\delta_{RV}$ may be expressed as shown in Tables 23-25.

TABLE 23

| $F_{m,n}$ | $RV_1$ | $RV_2$ | $RV_3$ | $RV_4$ | $RV_5$ | $RV_6$ |
|---|---|---|---|---|---|---|
| $HV_1$ | $H_1 \times R_1$ | $H_1 \times R_2$ | $H_1 \times R_3$ | $H_1 \times R_4$ | $H_1 \times R_5$ | $H_1 \times R_6$ |
| $HV_2$ | $H_2 \times R_1$ | $H_2 \times R_2$ | $H_2 \times R_3$ | $H_2 \times R_4$ | $H_2 \times R_5$ | $H_2 \times R_6$ |
| $HV_3$ | $H_3 \times R_1$ | $H_3 \times R_2$ | $H_3 \times R_3$ | $H_3 \times R_4$ | $H_3 \times R_5$ | $H_3 \times R_6$ |
| $HV_4$ | $H_4 \times R_1$ | $H_4 \times R_2$ | $H_4 \times R_3$ | $H_4 \times R_4$ | $H_4 \times R_5$ | $H_4 \times R_6$ |
| $HV_5$ | $H_5 \times R_1$ | $H_5 \times R_2$ | $H_5 \times R_3$ | $H_5 \times R_4$ | $H_5 \times R_5$ | $H_5 \times R_6$ |
| $HV_6$ | $H_6 \times R_1$ | $H_6 \times R_2$ | $H_6 \times R_3$ | $H_6 \times R_4$ | $H_6 \times R_5$ | $H_6 \times R_6$ |

TABLE 24

| $H_1$ | $\frac{1}{4}\left[\frac{\delta_{HV} - 0 - \sigma}{|\delta_{HV} - 0| + \sigma} + 1\right] \times \left[\frac{\frac{\pi}{2} - \delta_{HV} - \sigma}{\left|\frac{\pi}{2} - \delta_{HV}\right| + \sigma} + 1\right]$ |
|---|---|
| $H_2$ | $\frac{1}{4}\left[\frac{\delta_{HV} - \frac{\pi}{2} - \sigma}{\left|\delta_{HV} - \frac{\pi}{2}\right| + \sigma} + 1\right] \times \left[\frac{(\beta_1 - \pi) - \delta_{HV} - \sigma}{|(\beta_1 - \pi) - \delta_{HV}| + \sigma} + 1\right]$ |
| $H_3$ | $\frac{1}{4}\left[\frac{\delta_{HV} - (\beta_1 - \pi) - \sigma}{|\delta_{HV} - (\beta_1 - \pi)| + \sigma} + 1\right] \times \left[\frac{\pi - \delta_{HV} - \sigma}{|\pi - \delta_{HV}| + \sigma} + 1\right]$ |
| $H_4$ | $\frac{1}{4}\left[\frac{\delta_{HV} - \pi - \sigma}{|\delta_{HV} - \pi| + \sigma} + 1\right] \times \left[\frac{\frac{3\pi}{2} - \delta_{HV} - \sigma}{\left|\frac{3\pi}{2} - \delta_{HV}\right| + \sigma} + 1\right]$ |
| $H_5$ | $\frac{1}{4}\left[\frac{\delta_{HV} - \frac{3\pi}{2} - \sigma}{\left|\delta_{HV} - \frac{3\pi}{2}\right| + \sigma} + 1\right] \times \left[\frac{\beta_1 - \delta_{HV} - \sigma}{|\beta_1 - \delta_{HV}| + \sigma} + 1\right]$ |
| $H_6$ | $\frac{1}{4}\left[\frac{\delta_{HV} - \beta_1 - \sigma}{|\delta_{HV} - \beta_1| + \sigma} + 1\right] \times \left[\frac{2\pi - \delta_{HV} - \sigma}{|2\pi - \delta_{HV}| + \sigma} + 1\right]$ |

TABLE 25

| $R_1$ | $\frac{1}{4}\left[\frac{\delta_{RV} - 0 - \sigma}{|\delta_{RV} - 0| + \sigma} + 1\right] \times \left[\frac{\frac{\pi}{2} - \delta_{RV} - \sigma}{\left|\frac{\pi}{2} - \delta_{RV}\right| + \sigma} + 1\right]$ |
|---|---|
| $R_2$ | $\frac{1}{4}\left[\frac{\delta_{RV} - \frac{\pi}{2} - \sigma}{\left|\delta_{RV} - \frac{\pi}{2}\right| + \sigma} + 1\right] \times \left[\frac{(\beta_1 - \pi) - \delta_{RV} - \sigma}{|(\beta_1 - \pi) - \delta_{RV}| + \sigma} + 1\right]$ |
| $R_3$ | $\frac{1}{4}\left[\frac{\delta_{RV} - (\beta_1 - \pi) - \sigma}{|\delta_{RV} - (\beta_1 - \pi)| + \sigma} + 1\right] \times \left[\frac{\pi - \delta_{RV} - \sigma}{|\pi - \delta_{RV}| + \sigma} + 1\right]$ |
| $R_4$ | $\frac{1}{4}\left[\frac{\delta_{RV} - \pi - \sigma}{|\delta_{RV} - \pi| + \sigma} + 1\right] \times \left[\frac{\frac{3\pi}{2} - \delta_{RV} - \sigma}{\left|\frac{3\pi}{2} - \delta_{RV}\right| + \sigma} + 1\right]$ |
| $R_5$ | $\frac{1}{4}\left[\frac{\delta_{RV} - \frac{3\pi}{2} - \sigma}{\left|\delta_{RV} - \frac{3\pi}{2}\right| + \sigma} + 1\right] \times \left[\frac{\beta_1 - \delta_{RV} - \sigma}{|\beta_1 - \delta_{RV}| + \sigma} + 1\right]$ |
| $R_6$ | $\frac{1}{4}\left[\frac{\delta_{RV} - \beta_1 - \sigma}{|\delta_{RV} - \beta_1| + \sigma} + 1\right] \times \left[\frac{2\pi - \delta_{RV} - \sigma}{|2\pi - \delta_{RV}| + \sigma} + 1\right]$ |

In some embodiments, for the fourth orientation sector $Q_4$, generating projected vehicle transportation network information may include determining a host vehicle approach angle $\alpha_{HV}$ for the host vehicle based on the host vehicle region $HV_n$, the remote vehicle region $RV_n$, the host vehicle heading angle $\delta_{HV}$, and the convergence angle $\beta_1$, as expressed in Table 26.

TABLE 26

| $\alpha_{HV} =$ | $RV_1$ | $RV_2$ | $RV_3$ | $RV_4$ | $RV_5$ | $RV_6$ |
|---|---|---|---|---|---|---|
| $HV_1$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ |
| $HV_2$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ | $\delta_{HV} - \beta_1 + 2\pi$ |
| $HV_3$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ | $-(\delta_{HV} - \beta_1)$ |

TABLE 26-continued

| $\alpha_{HV}=$ | $RV_1$ | $RV_2$ | $RV_3$ | $RV_4$ | $RV_5$ | $RV_6$ |
|---|---|---|---|---|---|---|
| $HV_4$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ |
| $HV_5$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ | $-(\delta_{HV}-\beta_1)$ |
| $HV_6$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ | $\delta_{HV}-\beta_1$ |

In some embodiments, for the fourth orientation sector $Q_4$, generating projected vehicle transportation network information may include determining a remote vehicle approach angle $\alpha_{RV}$ for the remote vehicle based on the host vehicle region $HV_n$, the remote vehicle region $RV_n$, the remote vehicle heading angle $\delta_{RV}$, and the convergence angle $\beta_1$, as expressed in Table 27.

TABLE 27

| $\alpha_{RV}=$ | $RV_1$ | $RV_2$ | $RV_3$ | $RV_4$ | $RV_5$ | $RV_6$ |
|---|---|---|---|---|---|---|
| $HV_1$ | $-(\delta_{RV}-\beta_1+\pi)$ | $-(\delta_{RV}-\beta_1+\pi)$ | 0 | 0 | 0 | 0 |
| $HV_2$ | 0 | $-(\delta_{RV}-\beta_1+\pi)$ | 0 | 0 | 0 | 0 |
| $HV_3$ | 0 | 0 | $\delta_{RV}-\beta_1+\pi$ | 0 | 0 | 0 |
| $HV_4$ | 0 | 0 | $\delta_{RV}-\beta_1+\pi$ | $\delta_{RV}-\beta_1+\pi$ | 0 | 0 |
| $HV_5$ | 0 | 0 | $\delta_{RV}-\beta_1+\pi$ | $\delta_{RV}-\beta_1+\pi$ | $\delta_{RV}-\beta_1+\pi$ | 0 |
| $HV_6$ | $-(\delta_{RV}-\beta_1+\pi)$ | $-(\delta_{RV}-\beta_1+\pi)$ | 0 | 0 | 0 | $-(\delta_{RV}-\beta_1-\pi)$ |

In some embodiments, for the fourth orientation sector $Q_4$, generating projected vehicle transportation network information may include determining an intersection angle $\alpha_D$ based on the host vehicle region $HV_n$, the remote vehicle region $RV_n$, the host vehicle heading angle $\delta_{HV}$, and the remote vehicle heading angle $\delta_{RV}$, as expressed in Table 28.

TABLE 28

| $\alpha_D=$ | $RV_1$ | $RV_2$ | $RV_3$ | $RV_4$ | $RV_5$ | $RV_6$ |
|---|---|---|---|---|---|---|
| $HV_1$ | $-(\delta_{HV}-\delta_{RV})$ | $-(\delta_{HV}-\delta_{RV})$ | 0 | 0 | 0 | 0 |
| $HV_2$ | 0 | $-(\delta_{HV}-\delta_{RV})$ | 0 | 0 | 0 | 0 |
| $HV_3$ | 0 | 0 | $\delta_{HV}-\delta_{RV}$ | 0 | 0 | 0 |
| $HV_4$ | 0 | 0 | $\delta_{HV}-\delta_{RV}$ | $\delta_{HV}-\delta_{RV}$ | 0 | 0 |
| $HV_5$ | 0 | 0 | $\delta_{HV}-\delta_{RV}$ | $\delta_{HV}-\delta_{RV}$ | $\delta_{HV}-\delta_{RV}$ | 0 |
| $HV_6$ | $2\pi+(\delta_{HV}-\delta_{RV})$ | $2\pi+(\delta_{HV}-\delta_{RV})$ | 0 | 0 | 0 | $-(\delta_{HV}-\delta_{RV})$ |

In FIG. 12, $L_{HV}$ indicates a distance from the host vehicle to the projected point of convergence with the remote vehicle expected path 12100, and $L_{RV}$ indicates a distance from the remote vehicle to the projected point of convergence with the host vehicle expected path 12000.

In some embodiments, determining the host vehicle approach angle $\alpha_{HV}$, the remote vehicle approach angle $\alpha_{HV}$, and the intersection angle $\alpha_D$ for any combination of orientation sector, host vehicle region, and remote vehicle region may be expressed as the in Equations 5-11:

$$Q_1 = \frac{1}{4}\left[\frac{\phi_{RV}-\phi_{HV}-\sigma}{|\phi_{RV}-\phi_{HV}|+\sigma}+1\right] \times \left[\frac{\theta_{RV}-\theta_{HV}-\sigma}{|\theta_{RV}-\theta_{HV}|+\sigma}+1\right].$$ [Equation 5]

$$Q_2 = \frac{1}{4}\left[\frac{\phi_{HV}-\phi_{RV}-\sigma}{|\phi_{RV}-\phi_{HV}|+\sigma}+1\right] \times \left[\frac{\theta_{RV}-\theta_{HV}-\sigma}{|\theta_{RV}-\theta_{HV}|+\sigma}+1\right].$$ [Equation 6]

$$Q_3 = \frac{1}{4}\left[\frac{\phi_{HV}-\phi_{RV}-\sigma}{|\phi_{RV}-\phi_{HV}|+\sigma}+1\right] \times \left[\frac{\theta_{HV}-\theta_{RV}-\sigma}{|\theta_{RV}-\theta_{HV}|+\sigma}+1\right].$$ [Equation 7]

$$Q_4 = \frac{1}{4}\left[\frac{\phi_{RV}-\phi_{HV}-\sigma}{|\phi_{RV}-\phi_{HV}|+\sigma}+1\right] \times \left[\frac{\theta_{HV}-\theta_{RV}-\sigma}{|\theta_{RV}-\theta_{HV}|+\sigma}+1\right].$$ [Equation 8]

$$\alpha_{HV} = Q_1 \sum_{m=1}^{6}\sum_{n=1}^{6} F\eta\alpha_{HV} + Q_2\sum_{m=1}^{6}\sum_{n=1}^{6} F\eta\alpha_{HV} +$$

$$Q_3\sum_{m=1}^{6}\sum_{n=1}^{6} F\eta\alpha_{HV} + Q_4\sum_{m=1}^{6}\sum_{n=1}^{6} F\eta\alpha_{HV}.$$ [Equation 9]

$$\alpha_{RV} = Q_1 \sum_{m=1}^{6}\sum_{n=1}^{6} F\eta\alpha_{RV} + Q_2\sum_{m=1}^{6}\sum_{n=1}^{6} F\eta\alpha_{RV} +$$

$$Q_3\sum_{m=1}^{6}\sum_{n=1}^{6} F\eta\alpha_{RV} + Q_4\sum_{m=1}^{6}\sum_{n=1}^{6} F\eta\alpha_{RV}.$$ [Equation 10]

$$\alpha_D = Q_1 \sum_{m=1}^{6}\sum_{n=1}^{6} F\eta\alpha_D + Q_2\sum_{m=1}^{6}\sum_{n=1}^{6} F\eta\alpha_D +$$

$$Q_3\sum_{m=1}^{6}\sum_{n=1}^{6} F\eta\alpha_D + Q_4\sum_{m=1}^{6}\sum_{n=1}^{6} F\eta\alpha_D.$$ [Equation 11]

For simplicity and clarity, some notation has been omitted from Equations 9-11. For example, the portion $F\eta\alpha_{HV}$ at the right hand side of Equation 9 may be more expansively recited as follows:

$$F_{4_{m,n}}\eta_{4_{m,n}}\alpha_{HV4_{m,n}}.$$

In some embodiments, the distance from the host vehicle to the intersection ($l_{HV}$) may be determined as shown in the following:

$$\frac{D}{\sin\alpha_D} = \frac{l}{\sin\alpha_{RV}} = \frac{l_{RV}}{\sin\alpha_{HV}}; \quad \text{[Equation 12]}$$

$$l_{HV} = D\frac{\sin\alpha_{RV}}{\sin\alpha_D}.$$

Although FIGS. 5-12 show examples of vehicles traveling along straight paths, generating projected vehicle transportation network information may include using heading or expected path information that includes curved or turning paths.

Figure 13:
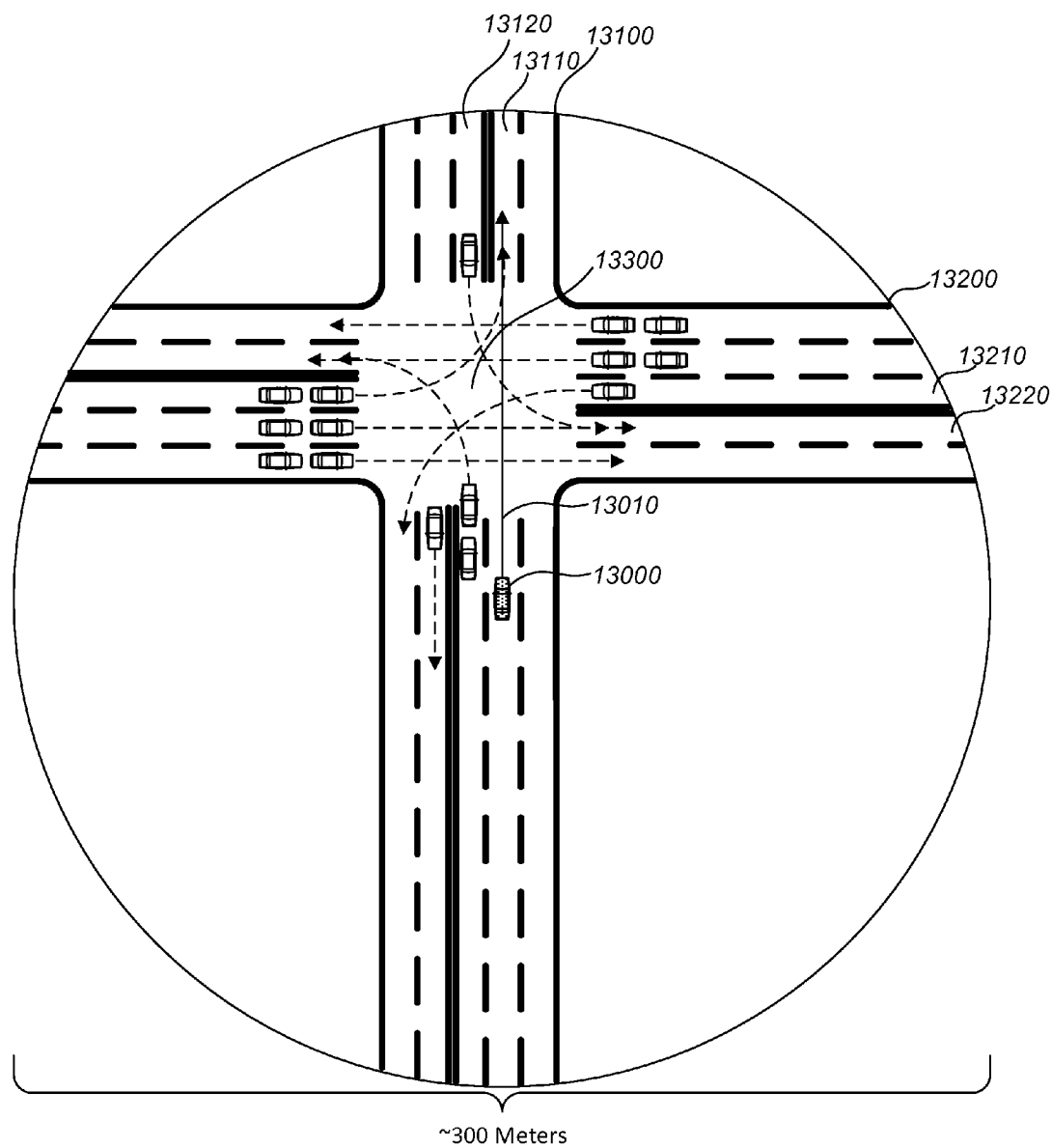
FIG. 13 is a diagram of projected vehicle transportation network information generated in accordance with this disclosure.

FIG. 13 is a diagram of projected vehicle transportation network information generated in accordance with this disclosure. In some embodiments, defined vehicle transportation network information representing the portion of the vehicle transportation network traversed by the host vehicle may be unavailable to the host vehicle, or available defined vehicle transportation network information may be incomplete or inaccurate, and generating projected vehicle transportation network information may include identifying one or more elements of the vehicle transportation network, such as a road, a lane, a vehicle transportation network intersection, or a combination thereof, based, at least in part, on received remote vehicle messages. For example, a host vehicle may receive remote vehicle messages from remote vehicles within a defined geospatial range, as shown in FIG. 3, and may generate projected vehicle transportation network information based on the received remote vehicle messages as shown in FIG. 13.

In some embodiments, generating projected vehicle transportation network information determining that the vehicle transportation network includes one or more roads 13100/13200. For example, generating projected vehicle transportation network information may include identifying, or partially identifying, the road 13100, shown oriented vertically in FIG. 13, based on the geospatial position and expected path 13010 of the host vehicle, the geospatial position and expected path of one or more of the remote vehicles, or a combination thereof. In another example, generating projected vehicle transportation network information may include identifying, or partially identifying, the road 13200 shown oriented horizontally, based on the geospatial position and expected path 13010 of the host vehicle, the geospatial position and expected path of one or more of the remote vehicles, or a combination thereof.

In some embodiments, generating projected vehicle transportation network information may include determining that a road 13100/13200 in the vehicle transportation network includes one or more lanes 13110/13120/13210/13220, and may include determining a direction of travel for the respective lanes. For example, generating projected vehicle transportation network information may include identifying, or partially identifying, the lane 13110 of the road 13100, and a direction of travel for the lane 13110, based on the geospatial position and the geospatial position and expected path 13010 of the host vehicle 13010 of the host vehicle. In another example, generating projected vehicle transportation network information may include identifying, or partially identifying, the lane 13120 of the road 13100, and a direction of travel for the lane 13120, based on the geospatial position and expected path 13010 of the host vehicle 13000 and the geospatial position and expected path of one or more of the remote vehicles.

In some embodiments, generating projected vehicle transportation network information may include determining that the vehicle transportation network includes a vehicle transportation network intersection 13300. For example, generating projected vehicle transportation network information may include identifying, or partially identifying, the roads 13100/13200, based on the geospatial position and expected path 13010 of the host vehicle 13000, the geospatial position and expected path of one or more of the remote vehicles, or a combination thereof, determining that the roads 13100/13200 intersect, and identifying the vehicle transportation network intersection 13300 based on the intersection of the roads 13100/13200. In some embodiments, generating projected vehicle transportation network information may include identifying features of the vehicle transportation network intersection 13300, such as a size of the vehicle transportation network intersection, which may include a vertical size, a horizontal size, or both, one or more approaches for the vehicle transportation network intersection, one or more dedicated turn lanes for the vehicle transportation network intersection, or any other element, or combination of elements, of a vehicle transportation network intersection.

Figure 14:
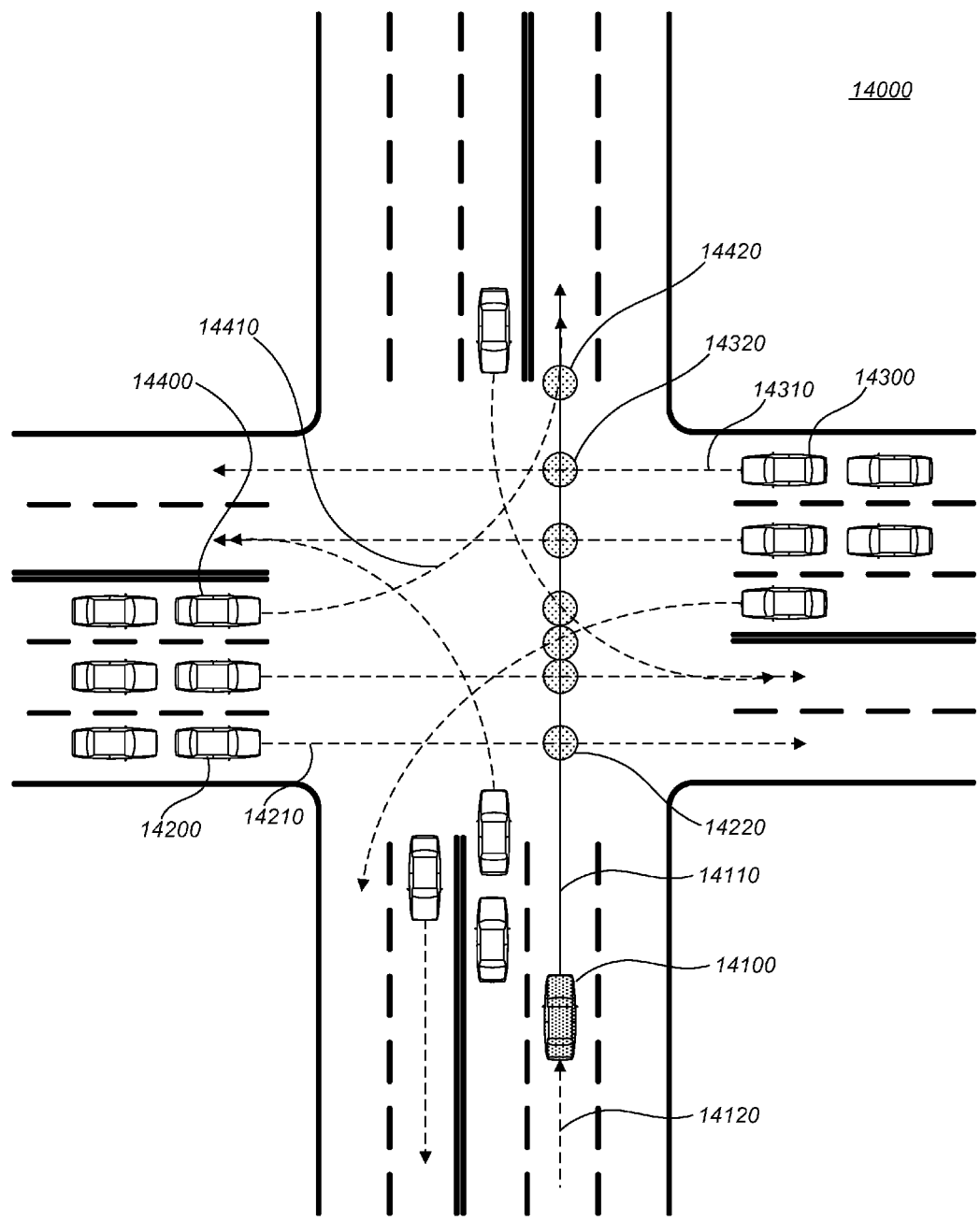
FIG. 14 is a diagram of generating projected vehicle transportation network information including identifying converging paths in accordance with this disclosure.

FIG. 14 is a diagram of generating projected vehicle transportation network information including identifying converging paths in accordance with this disclosure. Generating projected vehicle transportation network information including identifying converging paths may be implemented in a vehicle, such as the vehicle 1000 shown in FIG. 1 or the vehicles 2100/2110 shown in FIG. 2.

In some embodiments, a portion of a vehicle transportation network, such as a vehicle transportation network 14000 as shown, may be traversed by a host vehicle 14100. The host vehicle may receive remote vehicle messages from multiple remote vehicles 14200/14300/14400 within a defined reception range, identify a host vehicle expected path 14110 for the host vehicle, and identify remote vehicle expected paths 14210/14310/14410 the remote vehicles 14200/14300/14400. In some embodiments, the host vehicle 14100 may determine that one or more of the remote vehicle expected paths 14210/14310/14410 are convergent with the host vehicle expected path 14110. In some embodiments, the host vehicle 14100 may identify a respective expected point of convergence 14220/14320/14420, for one or more of the convergent remote vehicle expected paths 14210/14310/14410.

Although the portion of the vehicle transportation network proximate to the host vehicle, including a vehicle transportation network intersection 14000, is shown in FIG. 14, defined vehicle transportation network information representing the portion of the vehicle transportation network proximate to the host vehicle may be unavailable, incomplete, or inaccurate, and projected vehicle transportation network information representing the portion of the vehicle transportation network proximate to the host vehicle may be generated as described herein.

In some embodiments, determining a remote vehicle expected path or a host vehicle expected path may include determining recently traversed path for the respective vehicle. For example, in FIG. 14 the host vehicle recently traversed path 14120 is shown for the host vehicle 14100 using a broken line. In some embodiments, a recently traversed path may be identified based on the current vehicle information, which may include current vehicle heading information, based on previously identified vehicle information, such as previously received remote vehicle information, or based on a combination of current and previously identified vehicle information.

Figure 15:
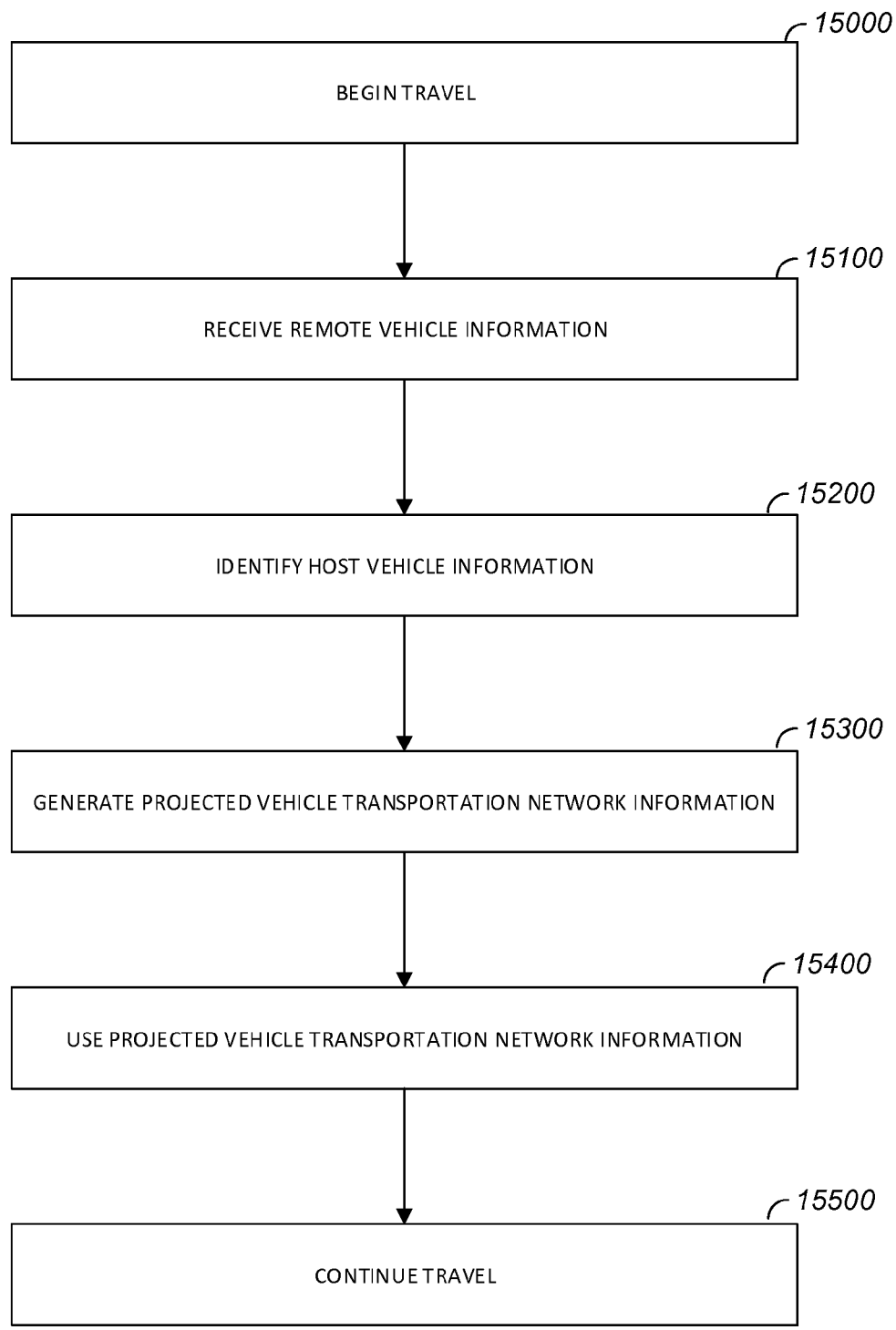
FIG. 15 is a diagram of traversing a vehicle transportation network including generating projected vehicle transportation network information in accordance with this disclosure.

FIG. 15 is a diagram of traversing a vehicle transportation network including generating projected vehicle transportation network information in accordance with this disclosure. In some embodiments, traversing a vehicle transportation network including generating projected vehicle transportation network information may be implemented in a vehicle, such as the vehicle 1000 shown in FIG. 1 or the vehicles 2100/2110 shown in FIG. 2.

In some embodiments, traversing a vehicle transportation network including generating projected vehicle transportation network information may include traversing a first portion of the vehicle transportation network at 15000, receiving remote vehicle information at 15100, identifying host vehicle information at 15200, generating projected vehicle transportation network information at 15300, using the projected vehicle transportation network information at 15400, traversing a second portion of the vehicle transportation network at 15500, or a combination thereof.

In some embodiments, a host vehicle may traverse a first portion of the vehicle transportation network at 15000. For example, a host vehicle, such as the host vehicle 13000 shown in FIG. 13 or the host vehicle 14100 shown in FIG. 14, may approach a vehicle transportation network intersection, such as the vehicle transportation network intersection 13300 as shown in FIG. 13 or the vehicle transportation network intersection 14000 as shown in FIG. 14.

In some embodiments, remote vehicle information may be received at 15100. For example the host vehicle, may receive a remote vehicle message from a remote vehicle, such as from one or more of the remote vehicles 14200/14300/14400 shown in FIG. 14, via a communication link, such as the wireless electronic communication link 2370 shown in FIG. 2. In some embodiments, the host vehicle may store the remote vehicle information. For example, the host vehicle may store the remote vehicle information in a memory of the host vehicle, such as the memory 1340 shown in FIG. 1.

The remote vehicle message may include remote vehicle information, which may indicate remote vehicle geospatial state information for the remote vehicle, remote vehicle kinematic state information for the remote vehicle, or a combination thereof. In some embodiments, remote vehicle geospatial state information may include geospatial coordinates for the remote vehicle, such as longitude and latitude coordinates. In some embodiments, the remote vehicle kinematic state information may include a remote vehicle velocity for the remote vehicle, a remote vehicle heading for the remote vehicle, a remote vehicle acceleration for the remote vehicle, or a remote vehicle yaw rate for the remote vehicle, or any other information, or combination of information, relevant to the operational state of the remote vehicle.

In some embodiments, host vehicle information may be identified at 15200. In some embodiments, the host vehicle information may include host vehicle geospatial state information for the host vehicle, host vehicle kinematic state information for the host vehicle, or a combination thereof. In some embodiments, the host vehicle geospatial state information may include geospatial coordinates for the host vehicle, such as longitude and latitude coordinates. In some embodiments, the host vehicle kinematic state information may include a host vehicle velocity for the host vehicle, a host vehicle heading for the host vehicle, a host vehicle acceleration for the host vehicle, or a host vehicle yaw rate for the host vehicle, or any other information, or combination of information, relevant to the operational state of the host vehicle.

In some embodiments, projected vehicle transportation network information may be generated at 15300. For example, the host vehicle may generate projected vehicle transportation network information representing the portion of the vehicle transportation network proximate to the host vehicle based on the remote vehicle information received at 15100 and the host vehicle information identified at 15200. In some embodiments, generating projected vehicle transportation network information at 15300 may be similar to generating projected vehicle transportation network information as shown at 16000 in FIG. 16.

In some embodiments, defined vehicle transportation network information representing the portion of the vehicle transportation network proximate to the host vehicle may be unavailable, and generating the projected vehicle transportation network information may include generating the projected vehicle transportation network information based on the remote vehicle information received at 15100 and the host vehicle information identified at 15200.

In some embodiments, incomplete or inaccurate defined vehicle transportation network information representing the portion of the vehicle transportation network proximate to the host vehicle may be available, and generating the projected vehicle transportation network information may include generating the projected vehicle transportation network information based in part on the defined vehicle transportation network information. For example, the defined vehicle transportation network information may include information representing a road that the host vehicle is traversing, such as the road 13100 shown in FIG. 13, may omit information representing a vehicle transportation network intersection, such as the vehicle transportation network intersection 13300 as shown in FIG. 13 or the vehicle transportation network intersection 14000 as shown in FIG. 14, and generating the projected vehicle transportation network information may include identifying the vehicle transportation network intersection based on the remote vehicle information received at 15100 and the host vehicle information identified at 15200 and including a combination of the defined road information and the projected vehicle transportation network intersection information in the projected vehicle transportation network information.

In some embodiments, the projected vehicle transportation network information may be used at 15400. In some implementations, a portion of the projected vehicle transportation network information may be output to a driver of the host vehicle for use in traversing the vehicle transportation network. In some embodiments, a portion of the projected vehicle transportation network information may be transmitted to a remote vehicle for use in traversing the vehicle transportation network. In some embodiments, the projected vehicle transportation network information may be used to control the host vehicle to traverse the vehicle transportation network. In some embodiments, the projected vehicle transportation network information may be used to generate or modify a route for traversing the vehicle transportation network.

For example, using the projected vehicle transportation network information at 15400 may include determining an expected host vehicle route for the host vehicle using the projected vehicle transportation network information. For example, the projected vehicle transportation network information may include a vehicle transportation network intersection, and using the projected vehicle transportation network information may include generating a route through the vehicle transportation network intersection.

In some embodiments, the host vehicle may traverse a second portion of the vehicle transportation network at 15500. For example, the second portion may include a vehicle transportation network intersection, such as the vehicle transportation network intersection 13300 as shown in FIG. 13 or the vehicle transportation network intersection 14000 as shown in FIG. 14, and the host vehicle may traverse the vehicle transportation network intersection based, at least in part, on the projected vehicle transportation network information generated at 15300.

Figure 16:
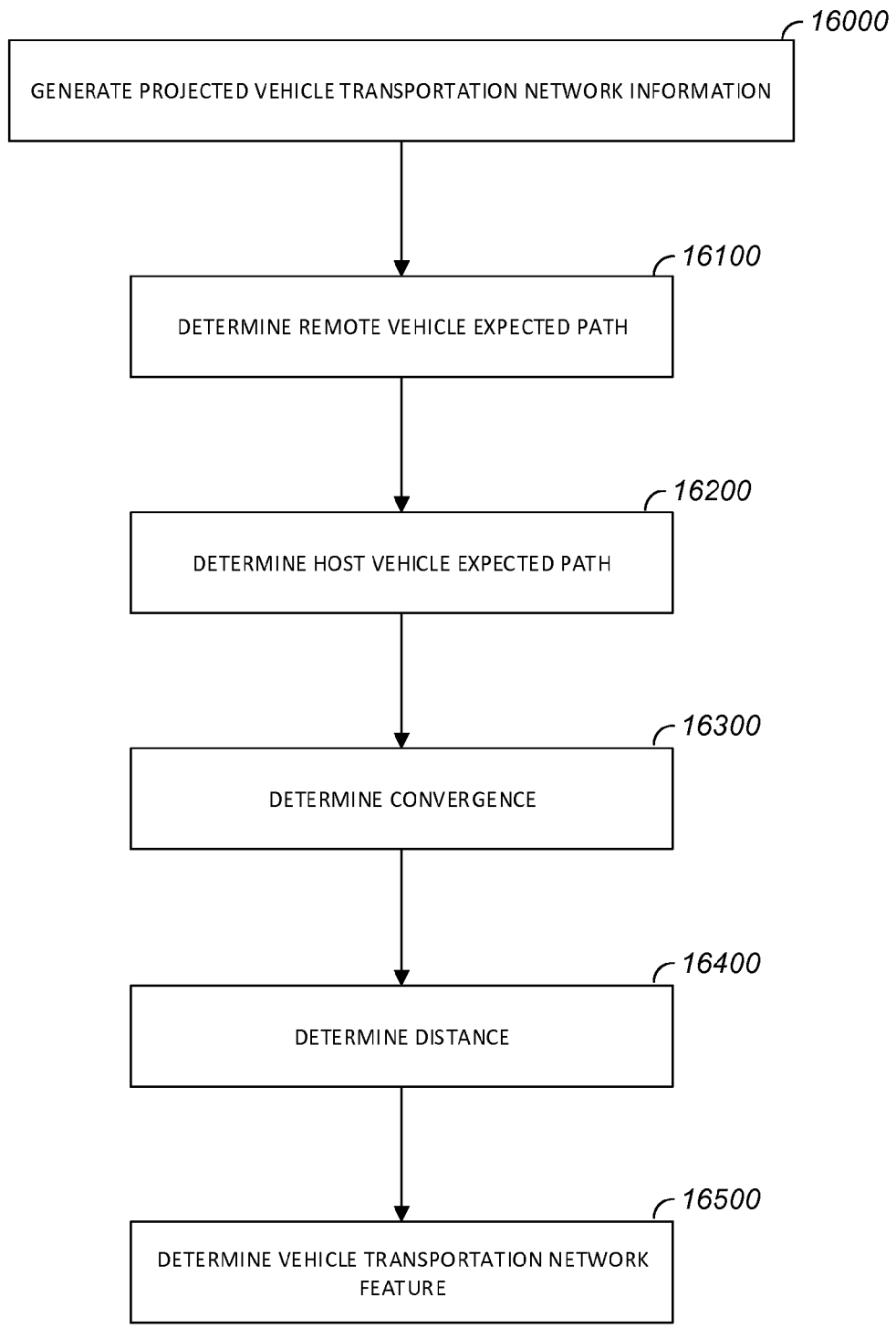
FIG. 16 is a diagram of generating projected vehicle transportation network information in accordance with this disclosure.

FIG. 16 is a diagram of generating projected vehicle transportation network information in accordance with this disclosure. In some embodiments, generating projected vehicle transportation network information may be implemented in a vehicle, such as the vehicle 1000 shown in FIG. 1 or the vehicles 2100/2110 shown in FIG. 2. In some embodiments, generating projected vehicle transportation network information at 16000 may be similar to generating projected vehicle transportation network information as shown at 15300 in FIG. 15.

In some embodiments, generating projected vehicle transportation network information may include determining a remote vehicle expected path at 16100, determining a host vehicle expected path at 16200, determining convergence information at 16300, determining distance information at 16400, determining a vehicle transportation network feature at 16500, or a combination thereof.

In some embodiments, a remote vehicle expected path may be determined at 16100. A remote vehicle expected path may be determined for a remote vehicle based on the remote vehicle information corresponding to the remote vehicle. For example, the remote vehicle information corresponding to the remote vehicle may include geospatial location information, such as longitude $\theta_{RV}$ and latitude information $\phi_{RV}$, and heading information for the remote vehicle, and the remote vehicle expected path may be determined based on the geospatial location information and heading information. In some embodiments, the remote vehicle expected path may correspond with the remote vehicle heading angle $\delta_{RV}$, as shown in FIGS. 4-12. In some embodiments, the remote vehicle information may include information indicating that the remote vehicle may turn, such as active turn signal information, and the remote vehicle expected path may be determined based on the geospatial location information, heading information, and the information indicating that the remote vehicle may turn.

In some embodiments, a host vehicle expected path may be determined at 16200. A host vehicle expected path may be determined for the host vehicle based on the host vehicle information for the host vehicle. For example, the host vehicle information may include geospatial location information, such as longitude $\theta_{HV}$ and latitude information $\phi_{HV}$, route information, heading information for the host vehicle, or a combination thereof, and the host vehicle expected path may be determined based on the geospatial location information and heading information. In some embodiments, the host vehicle expected path may correspond with the host vehicle heading angle $\delta_{HV}$, as shown in FIGS. 4-12. In some embodiments, the host vehicle information may include information indicating that the host vehicle may turn, such as active turn signal information or route information, and the host vehicle expected path may be determined based on the geospatial location information, heading information, and the information indicating that the host vehicle may turn.

In some embodiments, convergence information may be determined at 16300. Determining the convergence information at 16300 may include determining whether the remote vehicle expected path and the host vehicle expected path are convergent. In some embodiments, determining convergence information at 16300 may be similar to determining convergence information as shown at 17000 in FIG. 17.

In some embodiments, determining whether the remote vehicle expected path and the host vehicle expected path are convergent may include determining an orientation sector Q, which may be similar to determining an orientation sector Q as shown in FIG. 4. In some embodiments, determining whether the remote vehicle expected path and the host vehicle expected path are convergent may include determining a geodesic between the host vehicle and the remote vehicle and determining a convergence angle $\beta_1$ for the geodesic, which may be similar to determining a geodesic between the host vehicle and the remote vehicle and determining a convergence angle $\beta_1$ for the geodesic as shown in FIGS. 5, 7, 9, and 11. For example, the convergence angle $\beta_1$ may be determined using Equation 1. In some embodiments, determining whether the remote vehicle expected path and the host vehicle expected path are convergent may include determining a host vehicle region for the host vehicle, determining a remote vehicle region for the remote vehicle, determining a host vehicle approach angle, determining a remote vehicle approach angle determining an intersection angle, or a combination thereof, which may be similar to determining a host vehicle region for the host vehicle, determining a remote vehicle region for the remote vehicle, determining a host vehicle approach angle $\alpha_{HV}$, determining a remote vehicle approach angle $\alpha_{RV}$, and determining an intersection angle $\alpha_D$ as shown in FIGS. 6, 8, 10, and 12.

In some embodiments, distance information may be determined at 16400. In some embodiments, determining distance information at 16400 may include determining an instantaneous distance D of the geodesic as shown in FIGS. 4-12. The instantaneous distance D of the geodesic may indicate a distance between a location of the host vehicle and a location of the remote vehicle in the geospatial domain. For example, instantaneous distance D of the geodesic may be determined using Equation 2. In some embodiments, determining distance information at 16400 may include determining a host vehicle intersection distance $L_{HV}$ for the host vehicle as shown in FIGS. 4-12. The host vehicle intersection distance $L_{HV}$ for the host vehicle may indicate a distance between a location of the host vehicle and a projected point of convergence with the remote vehicle expected path along the host vehicle expected path in the geospatial domain. In some embodiments, determining distance information at 16400 may include determining a remote vehicle intersection distance $L_{RV}$ for the remote vehicle as shown in FIGS. 4-12. The remote vehicle intersection distance $L_{RV}$ for the remote vehicle may indicate a distance between a location of the remote vehicle and a projected point of convergence with the host vehicle expected path along the remote vehicle expected path in the geospatial domain.

The convergence information identified at 16300 and the distance information identified at 16400 may temporally, such as within a fraction of a second, correspond with receiving the remote vehicle information.

In some embodiments, a vehicle transportation network feature may be determined at 16500. For example, a road, a lane, a vehicle transportation network intersection, an approach to a vehicle transportation network, whether a lane is a turn lane, a size of a vehicle transportation network intersection, or any other feature, or combination of features, of a vehicle transportation network may be identified.

In some embodiments, determining the vehicle transportation network feature may include generating a portion of the projected vehicle transportation network information representing a road based on the host vehicle information. For example, the host vehicle location and expected path may be determined to correspond with a road, a lane, or both. In some embodiments, determining the vehicle transportation network feature may include generating a portion of the projected vehicle transportation network information representing a road based on the remote vehicle information. For example, the remote vehicle expected path may be convergent with the host vehicle expected path, and may be determined to correspond with another road, another lane, or both.

In some embodiments, determining the vehicle transportation network feature may include using remote vehicle information from convergent remote vehicles, which may be remote vehicles that are on convergent paths with the host vehicle, and omitting using remote vehicle information for remote vehicles that are on divergent or parallel paths with the host vehicle.

In some embodiments, identifying a vehicle transportation network intersection may include determining whether a remote vehicle is a stationary remote vehicle. For example, the remote vehicle information for a remote vehicle may indicate that a velocity of the remote vehicle is within a maximum stationary velocity threshold and the remote vehicle may be identified as a stationary remote vehicle. In another example, the remote vehicle information for a remote vehicle may indicate that a velocity of the remote vehicle exceeds a maximum stationary velocity threshold and the remote vehicle may be identified as a non-stationary remote vehicle.

In some embodiments, determining the vehicle transportation network feature may include determining whether the expected path for one or more of the remote vehicles proximate to the vehicle transportation network intersection includes turning in the vehicle transportation network intersection, and identifying the vehicle transportation network feature, such as an approach to the intersection, a dedicated turn lane for the intersection, or both. For example, the remote vehicle information for a stationary or non-stationary remote vehicle proximate to the vehicle transportation network intersection may include turn signal information indicating an active turn signal, and determining the vehicle transportation network feature may include identifying a dedicated turn lane corresponding to the geospatial location of the respective remote vehicle. In another example, the remote vehicle information for a stationary or non-stationary remote vehicle proximate to the vehicle transportation network intersection may include turn signal information indicating an inactive turn signal, and determining the vehicle transportation network feature may include identifying an approach for the vehicle transportation network intersection corresponding to the geospatial location of the respective remote vehicle. In some embodiments, the remote vehicle information for a stationary or non-stationary remote vehicle proximate to the vehicle transportation network intersection may omit active turn signal information and an expected path for the respective remote vehicle proximate to the vehicle transportation network intersection may be identified as including turning in the vehicle transportation network intersection based on, for example, kinematic information.

In some embodiments, generating projected vehicle transportation network information may include determining whether to use remote vehicle information corresponding to one or more of the remote vehicles. In some embodiments, the host vehicle information may indicate an elevation for the host vehicle, the remote vehicle information may include an elevation for the remote vehicle, and generating projected vehicle transportation network information may include determining whether to use remote vehicle information corresponding to the remote vehicle based on whether a difference between the host vehicle elevation and the remote vehicle elevation exceeds a defined elevation offset. For example, the defined elevation offset may be fourteen (14) feet, the difference between the host vehicle elevation and the remote vehicle elevation may be 18 feet, and generating projected vehicle transportation network information may omit using remote vehicle information corresponding to the remote vehicle. In another example, the defined elevation offset may be fourteen (14) feet, the difference between the host vehicle elevation and the remote vehicle elevation may be 2 feet, and generating projected vehicle transportation network information may include using the remote vehicle information corresponding to the remote vehicle.

Figure 17:
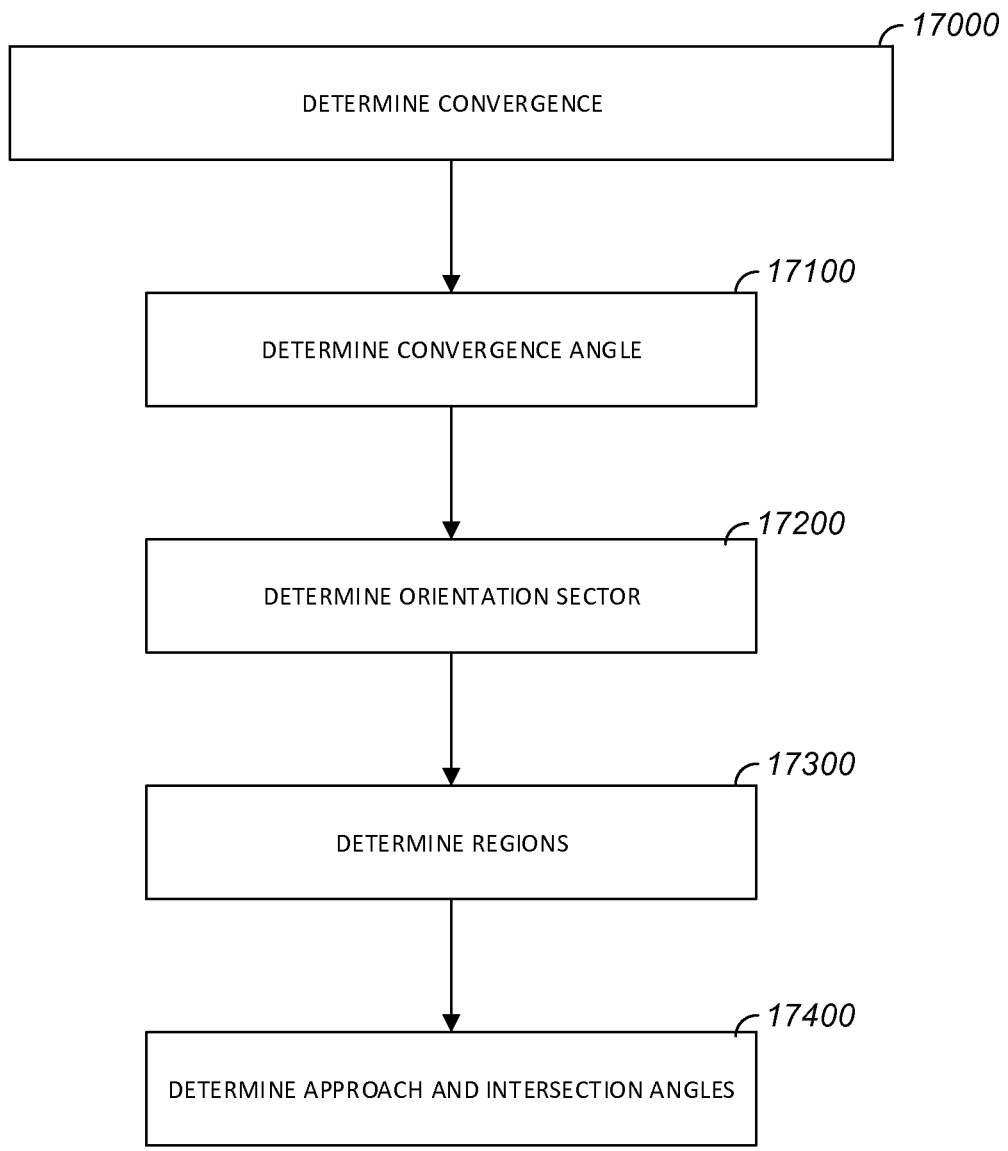
FIG. 17 is a diagram of determining convergence information for generating projected vehicle transportation network information in accordance with this disclosure.

FIG. 17 is a diagram of determining convergence information for generating projected vehicle transportation network information in accordance with this disclosure. In some embodiments, determining convergence information may be implemented in a vehicle, such as the vehicle 1000 shown in FIG. 1 or the vehicles 2100/2110 shown in FIG. 2.

In some embodiments, determining convergence information 17000 may include determining a convergence angle at 17100, determining an orientation sector at 17200, determining regions at 17300, determining approach and intersection angles at 17400, or a combination thereof.

In some embodiments, a convergence angle $\beta_1$ for a geodesic between the host vehicle and the remote vehicle may be determined at 17100. Determining the convergence angle $\beta_1$ at 17100 may be similar to determining the convergence angle $\beta_1$ as shown in FIGS. 5-12. For example, determining the convergence angle $\beta_1$ may include determining the convergence angle $\beta_1$ based on the host vehicle longitude $\theta_{HV}$ and latitude $\theta_{HV}$ and the remote vehicle longitude $\theta_{RV}$ and latitude $\phi_{RV}$ as shown in Equation 1 and determining an instantaneous distance D of the geodesic, which may indicate the straight-line geographic distance between the host vehicle and the remote vehicle, based on the host vehicle longitude $\theta_{HV}$ and latitude $\phi_{HV}$ and the remote vehicle longitude $\theta_{RV}$ and latitude $\phi_{RV}$ as shown in Equation 2.

In some embodiments, an orientation sector $Q_n$ may be determined at 17200. In some embodiments, determining an orientation sector $Q_n$ may be similar to determining an orientation sector $Q_n$ as shown in FIG. 4. For example, a defined plurality of orientation sectors, such as four quadrants, may be identified relative to the host vehicle and a reference direction, and the orientation sector $Q_n$ may be identified as the orientation sector $Q_n$ that includes the location of the remote vehicle and the corresponding geodesic, which may indicate a quantized location of the remote vehicle relative to a location of the host vehicle in the geospatial domain.

In some embodiments, regions may be determined at 17300. In some embodiments, determining regions at 17300 may be similar to determining regions as shown in FIGS. 5, 7, 9, and 11. For example, determining the regions at 17300 may include determining a host vehicle region, a remote vehicle region, or both, based on the convergence angle $\beta_1$ determined at 17100, the orientation sector $Q_n$ identified at 17200, the host vehicle heading angle $\delta_{HV}$, the remote vehicle heading angle $\delta_{RV}$, or a combination thereof. In some embodiments, the host vehicle region may indicate a quantization of the host vehicle heading relative to the host vehicle and the geodesic in the geospatial domain, and the remote vehicle region may indicate a quantization of the remote vehicle heading relative to the remote vehicle and the geodesic in the geospatial domain.

In some embodiments, approach and intersection angles may be determined at 17500. In some embodiments, determining approach and intersection angles at 17400 may be similar to determining approach and intersection angles as shown in FIGS. 6, 8, 10, and 12. For example, determining the approach and intersection angles at 17400 may include determining a host vehicle approach angle $\alpha_{HV}$ for the host vehicle based on the host vehicle region and the remote vehicle region identified at 17300, the host vehicle heading identified from the host vehicle information, and the convergence angle identified at 17100. In another example, determining the approach and intersection angles at 17400 may include determining a remote vehicle approach angle $\alpha_{RV}$ for the remote vehicle based on the host vehicle region and the remote vehicle region identified at 17300, the remote vehicle heading identified from the remote vehicle information, and the convergence angle identified at 17100. In another example, determining the approach and intersection angles at 17400 may include determining an intersection angle $\alpha_D$ which may indicate the angle of convergence between the host vehicle expected path and the remote vehicle expected path, based on the host vehicle region and the remote vehicle region identified at 17300, the host vehicle heading identified from the host vehicle information, and the remote vehicle heading identified from the remote vehicle information.

Although not shown separately in FIG. 17, in some embodiments, determining convergence information for generating projected vehicle transportation network information may include determining whether the host vehicle expected path and the remote vehicle expected path are convergent. In some embodiments, determining whether the host vehicle expected path and the remote vehicle expected path are convergent may be similar to determining whether the host vehicle expected path and the remote vehicle expected path are convergent as shown in FIGS. 6, 8, 10, and 12. For example, determining whether the host vehicle expected path and the remote vehicle expected path are convergent may include evaluating a table, such as Table 1, Table 8, Table 15, or Table 22, which may indicate whether the host vehicle expected path and the remote vehicle expected path are convergent.

In some embodiments, determining convergence information for generating projected vehicle transportation network information may include determining whether to determine approach and intersection angles at 17400. In an example, the host vehicle expected path and the remote vehicle expected path may be parallel or divergent and the determining approach and intersection angles at 17400 may be omitted.

In an example, determining convergence information for generating projected vehicle transportation network information may include determining a convergence angle $\beta_1$ for a geodesic between the host vehicle and the remote vehicle, which may indicate an angular direction of a location of the remote vehicle relative to a location of the host vehicle in a geospatial domain having a defined reference direction, and which may be determined based on Equation 1, determining an orientation sector $Q_n$, which may quantize the direction of the location of the remote vehicle relative to the host vehicle, and which may be identified from a defined set of orientation sectors, such as the set of orientation sectors shown in FIG. 4, determining a set of host vehicle regions based on the orientation sector $Q_n$ and the convergence angle $\beta_1$, such as one of the sets of host vehicle regions shown in FIGS. 5, 7, 9, and 11, determining a set of remote vehicle regions based on the orientation sector $Q_n$ and the convergence angle $\beta_1$, such as one of the sets of remote vehicle regions shown in FIGS. 5, 7, 9, and 11, determining a host vehicle heading angle $\delta_{HV}$ based on the host vehicle information, determining a remote vehicle heading angle $\delta_{RV}$ based on the remote vehicle information, evaluating a table, such as Table 1, Table 8, Table 15, or Table 22, which may indicate whether the host vehicle expected path and the remote vehicle expected path are convergent, and, if convergent, determining a host vehicle approach angle $\alpha_{HV}$, which may include evaluating a table, such as Table 5, Table 12, Table 19, or Table 26, a remote vehicle approach angle $\alpha_{RV}$, which may include evaluating a table, such as Table 6, Table 13, Table 20, or Table 27, and an intersection angle $\alpha_D$, which may include evaluating a table, such as Table 7, Table 14, Table 21, or Table 28.

Figure 18:
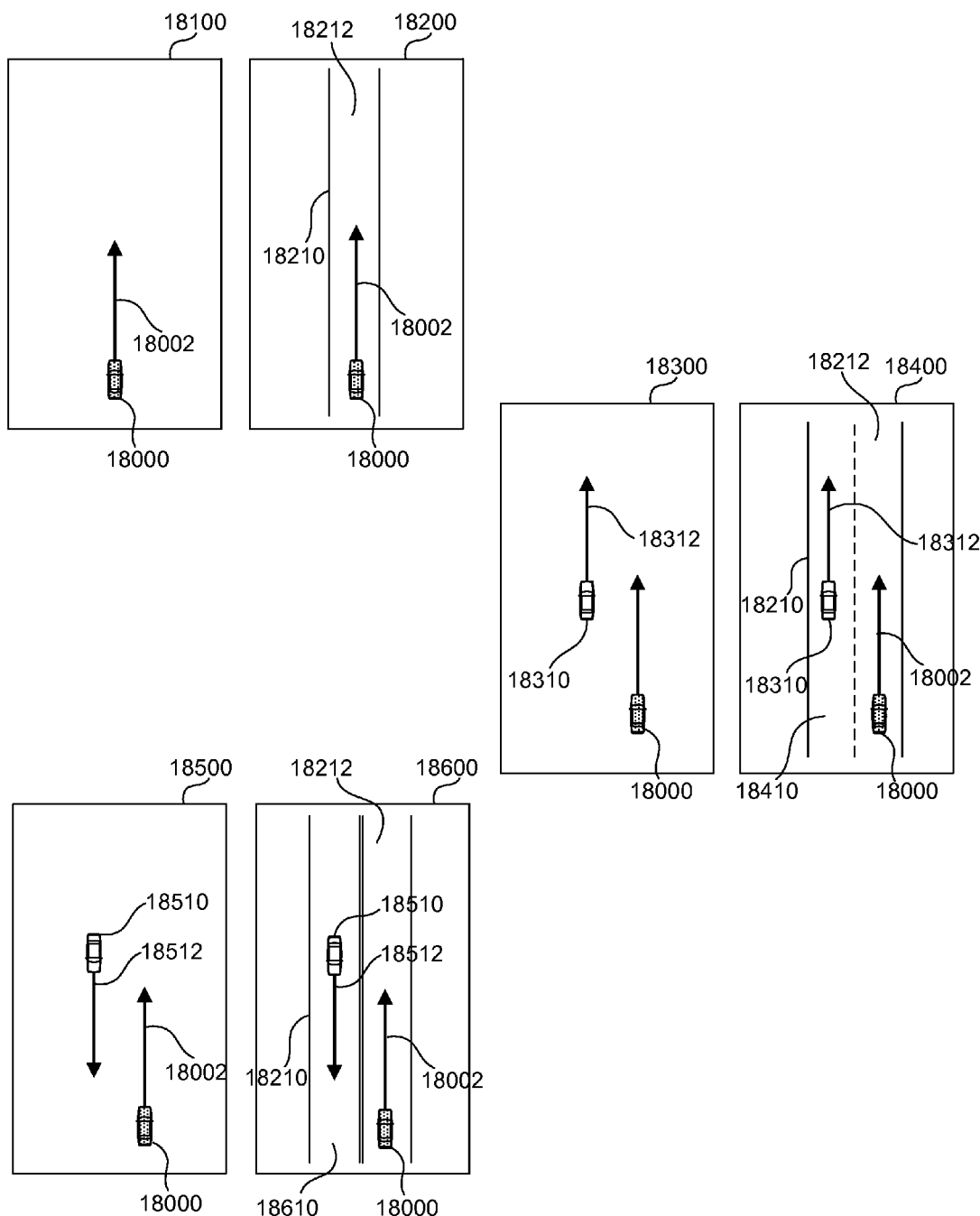
FIG. 18 is a diagram representing identifying projected vehicle transportation network information including vehicle transportation network features in accordance with this disclosure.

FIG. 18 is a diagram representing identifying projected vehicle transportation network information including vehicle transportation network features in accordance with this disclosure. In some embodiments, a host vehicle 18000 may traverse a portion of a vehicle transportation network. The host vehicle 18000 may receive remote vehicle messages from remote vehicles within a defined reception range, such as 300 meters. In some embodiments, defined vehicle transportation network information representing the portion of the vehicle transportation network traversed by the host vehicle 18000 may be unavailable, inaccurate, or incomplete and identifying projected vehicle transportation network information including vehicle transportation network features may include generating projected vehicle transportation network information representing one or more vehicle transportation network features based on host vehicle information, remote vehicle information, or a combination thereof. In the examples shown in FIG. 18, a host vehicle 18000 is shown traversing a current portion of a vehicle transportation network, defined vehicle transportation network information is unavailable, the current portion of the vehicle transportation network may include zero or more remote vehicles, and projected vehicle transportation network information representing the current portion of the vehicle transportation network may be generated based on host vehicle information, remote vehicle information, or a combination thereof.

In some embodiments, as shown at 18100, a host vehicle 18000 may traverse a current portion of a vehicle transportation network for which accurate defined vehicle transportation network information is unavailable. Host vehicle information for the host vehicle 18000 may indicate a current geospatial location, a trajectory 18002, a speed, or a combination thereof, for the host vehicle 18000.

In some embodiments, as shown at 18200, generating projected vehicle transportation network information representing a feature of the current portion of the vehicle transportation network may include identifying a road 18210. In some embodiments, identifying the road 18210 may include projecting the road 18210 along a host vehicle expected path 18002. In some embodiments, identifying the projected road 18210 may include identifying a corresponding lane 18212, a direction of travel, or both. In some embodiments, generating projected vehicle transportation network information representing a feature of the current portion of the vehicle transportation network may include determining a projected vehicle transportation network feature confidence, which may indicate a probability that the projected vehicle transportation network information accurately represents the vehicle transportation network feature. The road 18210 is shown using a solid line to indicate a relatively high projected vehicle transportation network feature confidence for the road 18210.

In some embodiments, as shown at 18300, the host vehicle 18000 may receive remote vehicle information for a remote vehicle 18310 traveling along a similar or parallel path. The remote vehicle information may indicate a current geospatial location, a trajectory 18312, a speed, or a combination thereof, for the remote vehicle 18310, which may be similar, such as parallel, to the current geospatial location and trajectory 18002 for the host vehicle 18000, except that the current geospatial location and trajectory 18312 for the remote vehicle 18310 may indicate a lateral difference from the current geospatial location and trajectory 18002 for the host vehicle 18000.

In some embodiments, as shown at 18400, generating projected vehicle transportation network information representing a feature of the current portion of the vehicle transportation network may include identifying information representing, or updating previously generated projected vehicle transportation network information representing, the road 18210 and the lane 18212, based on the host vehicle information and the remote vehicle information, which may include identifying that the road 18210 includes another lane 18410 having the same direction of travel. In some embodiments, the lateral difference between the current geospatial location for the remote vehicle 18310 and the current geospatial location for the host vehicle 18000 may exceed a defined lane size, and generating projected vehicle transportation network information representing a feature of the current portion of the vehicle transportation network may include determining that the road 18210 includes a second lane 18410 having the same direction of travel as the first lane 18212. In some embodiments, the lateral difference between the host vehicle 18000 and the remote vehicle 18310 may be between a maximum lane size and two times the maximum lane size. In some embodiments, the projected vehicle transportation network feature confidence for the road 18210 may be increased based on identifying a second lane 18410 for the road 18210.

In some embodiments, as shown at 18500, the host vehicle 18000 may receive remote vehicle information for a remote vehicle 18510 traveling along a similar, substantially parallel, opposing path. The remote vehicle information may indicate a current geospatial location, a trajectory 18512, a speed, or a combination thereof, for the remote vehicle 18510, which may be similar, such as parallel, to the current geospatial location and trajectory 18002 for the host vehicle 18000, except that the current geospatial location and trajectory 18512 for the remote vehicle 18510 may indicate a lateral difference from the current geospatial location and trajectory 18002 for the host vehicle 18000 and the trajectory 18512 for the remote vehicle 18510 may indicate that the remote vehicle 18510 is traveling in a direction opposite the trajectory 18002 of the host vehicle 18000.

In some embodiments, as shown at 18600, generating projected vehicle transportation network information representing a feature of the current portion of the vehicle transportation network may include identifying information representing, or updating previously generated projected vehicle transportation network information representing, the road 18210, based on the host vehicle information and the remote vehicle information, which may include identifying that the road 18210 includes the first lane 18212, corresponding to the geospatial location and trajectory of the host vehicle 18000, and a second lane 18610, parallel to the first lane 18212, and having the opposite direction of travel. For example, the lateral difference may exceed a defined lane size, may be within a defined maximum road size, or both, and generating projected vehicle transportation network information representing a feature of the current portion of the vehicle transportation network may include determining that the road 18210 includes a second lane 18610 having the opposite direction of travel. In some embodiments, the projected vehicle transportation network feature confidence for the road 18210 may be increased based on identifying a second lane 18610 for the road 18210.

Figure 19:
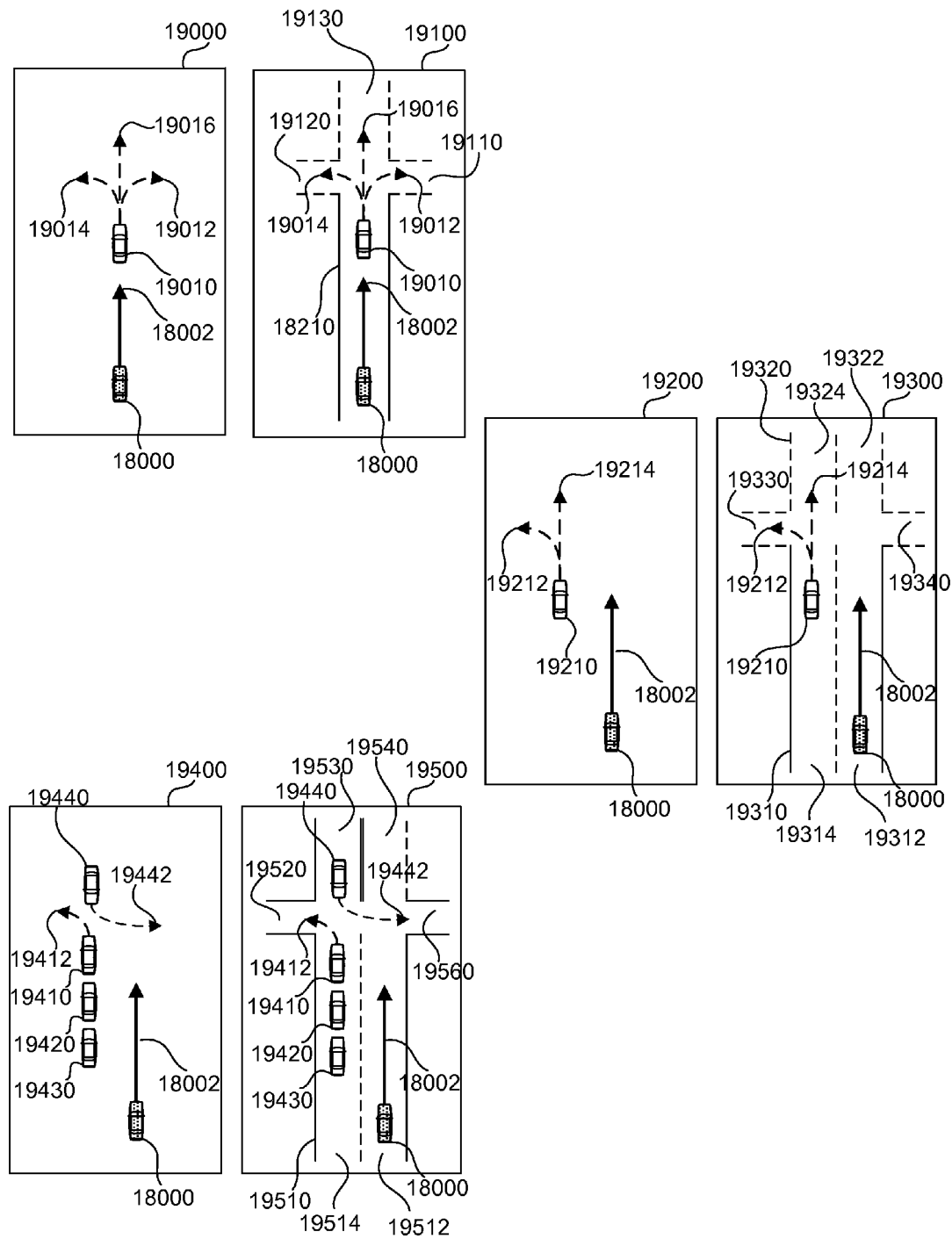
FIG. 19 is another diagram representing identifying projected vehicle transportation network information including vehicle transportation network features in accordance with this disclosure.

FIG. 19 is another diagram representing identifying projected vehicle transportation network information including vehicle transportation network features in accordance with this disclosure. The examples shown in FIG. 19 may be similar to the examples shown in FIG. 18, except as described.

In some embodiments, as shown at 19000, the host vehicle 18000 may receive remote vehicle information for a remote vehicle 19010, which may indicate a current geospatial location for the remote vehicle 19010. In some embodiments, the remote vehicle information for the remote vehicle 19010 may indicate that the remote vehicle 19010 is stationary and the geospatial location and current trajectory (not separately shown) for the remote vehicle 19010 may be similar to the current geospatial location and trajectory 18002 for the host vehicle 18000, except that the current geospatial location for the remote vehicle 19010 may indicate a longitudinal difference from the current geospatial location of the host vehicle 18000.

In some embodiments, vehicle operation assistance information management may include determining one or more remote vehicle expected paths 19012/19014/19016 for the remote vehicle 19010. In some embodiments, the remote vehicle expected paths 19012/19014/19016 for the remote vehicle 19010 may be identified based on remote vehicle kinematic information, remote vehicle turn signal information, remote vehicle routing information, or a combination thereof. For example, the remote vehicle information for the remote vehicle 19010 may include active right turn signal information and the remote vehicle expected path 19012 corresponding to a right turn may be identified as the remote vehicle expected path for the remote vehicle 19010. In another example, kinematic information for the remote vehicle 19010 may indicate that the remote vehicle 19010 is turning right and the remote vehicle expected path 19012 corresponding to a right turn may be identified as the remote vehicle expected path for the remote vehicle 19010. In another example, the remote vehicle information for the remote vehicle 19010 may include active left turn signal information, and the remote vehicle expected path 19014 corresponding to a left turn may be identified as the remote vehicle expected path for the remote vehicle 19010. In another example, kinematic information for the remote vehicle 19010 may indicate that the remote vehicle 19010 is turning left and the remote vehicle expected path 19014 corresponding to a left turn may be identified as the remote vehicle expected path for the remote vehicle 19010. In another example, the remote vehicle may be stationary and the remote vehicle information may omit active turn signal information, and three remote vehicle expected paths 19012/19014/19016 for the remote vehicle 19010 may be identified. In some embodiments, each of the remote vehicle expected paths 19012/19014/19016 may be associated with a remote vehicle expected path confidence. For example, each of the remote vehicle expected paths 19012/19014/19016 may be associated with equal remote vehicle expected path confidences, or the straight remote vehicle expected path 19016 may be associated with a relatively high remote vehicle expected path confidence and the left remote vehicle expected path 19012 and the right remote vehicle expected path 19014 may be associated with equal, relatively low, remote vehicle expected path confidences.

In some embodiments, as shown at 19100, generating projected vehicle transportation network information representing a feature of the current portion of the vehicle transportation network may include identifying one or more features based on the remote vehicle expected path 19012/19014/19016. For example, the right turn remote vehicle expected path 19012 may be identified and the intersecting road portion 19110 on the right side may be identified with relatively high projected vehicle transportation network feature confidence. In some embodiments, the intersecting road portion 19120 on the left side may be identified with lower projected vehicle transportation network feature confidence. In another example, the left turn remote vehicle expected path 19014 may be identified and the intersecting road portion 19120 on the left side may be identified with relatively high projected vehicle transportation network feature confidence. In some embodiments, the intersecting road portion 19110 on the right side may be identified with lower projected vehicle transportation network feature confidence. In another example, the straight remote vehicle expected path 19016 may be identified and the road portion 19130 at the top may be identified with relatively high projected vehicle transportation network feature confidence.

In some embodiments, the projected vehicle transportation network feature confidence may be based on the remote vehicle expected path confidence. For example, multiple remote vehicle expected paths 19012/19014/19016 may be identified for the remote vehicle 19010, each of the remote vehicle expected paths 19012/19014/19016 may be associated with a respective remote vehicle expected path confidence that is within a minimum remote vehicle expected path confidence, and three projected vehicle transportation network features 19110/19120/19130 may be identified with projected vehicle transportation network feature confidence similar to the corresponding remote vehicle expected path confidences.

In some embodiments, the road portion 18210 proximate to the host vehicle 18000 may be identified with relatively high confidence based on the host vehicle information, and the road portion 19130 distal to the host vehicle 18000 may be identified with lower projected vehicle transportation network feature confidence. In some embodiments, the projected vehicle transportation network feature confidence identified for the road portion 19130 distal to the host vehicle 18000 may depend on the host vehicle information. For example, an expected path 18002 for the host vehicle 18000, which may be identified based on vehicle transportation network route information, kinematic information, turn signal information, or a combination thereof, may include the road portion 19130 distal to the host vehicle 18000 and the road portion 19130 distal to the host vehicle 18000 may be identified with relatively high projected vehicle transportation network feature confidence, which may be lower than the projected vehicle transportation network feature confidence identified for the road portion 18210 proximate to the host vehicle 18000.

In some embodiments, as shown at 19200, the host vehicle 18000 may receive remote vehicle information for a remote vehicle 19210, which may indicate a current geospatial location for the remote vehicle 19210. In some embodiments, the remote vehicle information for the remote vehicle 19210 may indicate that the remote vehicle 19210 is stationary and the geospatial location and current trajectory (not separately shown) for the remote vehicle 19210 may be similar to the current geospatial location and trajectory 18002 for the host vehicle 18000, except that the current geospatial location for the remote vehicle 19210 may indicate a longitudinal difference and a latitudinal difference from the current geo spatial location of the host vehicle 18000.

In some embodiments, as shown at 18800, generating projected vehicle transportation network information representing a feature of the current portion of the vehicle transportation network may include determining one or more remote vehicle expected paths 19212/19214 for the remote vehicle 19210 and identifying one or more vehicle transportation network features based on the host vehicle information, the remote vehicle expected path 19212/19214, or both.

In some embodiments, the road portion 19310 proximate to the host vehicle 18000 may be identified with relatively high confidence based on the host vehicle information, the remote vehicle information, or both. In some embodiments, the lane 19312 proximate to the host vehicle 18000 may be identified with relatively high confidence based on the host vehicle information. In some embodiments, the lane 19314 proximate to the remote vehicle 19210 may be identified with relatively high confidence based on the remote vehicle information. In some embodiments, the road portion 19320 at the top may be identified with lower projected vehicle transportation network feature confidence, based on the host vehicle information, the remote vehicle information, or both. In some embodiments, the lane 19322 at the top-right, along the host vehicle expected path 18002, may be identified with relatively low confidence based on the host vehicle information. In some embodiments, the lane 19324 at the top-left, along the remote vehicle expected path 19214, may be identified with relatively low confidence based on the remote vehicle information.

In some embodiments, the projected vehicle transportation network feature confidence identified for the road portion 19320, and the corresponding lanes 19322/19324, at the top may depend on the host vehicle information. For example, an expected path 18002 for the host vehicle 18000, which may be identified based on vehicle transportation network route information, kinematic information, turn signal information, or a combination thereof, may include the road portion 19320, the corresponding lane 19322, or both, and the road portion 19320, the corresponding lane 19322, or both, may be identified with relatively low projected vehicle transportation network feature confidence.

In some embodiments, the intersecting road portion 19330 on the left side may be identified based on the remote vehicle expected path. For example, the left turn remote vehicle expected path 19212 may be identified and the intersecting road portion 19330 on the left side may be identified with relatively high projected vehicle transportation network feature confidence. In some embodiments, the intersecting road portion 18810 on the right side may be identified with lower projected vehicle transportation network feature confidence.

In another example, the straight remote vehicle expected path 19214 may be identified and the road portion 19320, the lane 19324, or both, at the top may be identified with relatively high projected vehicle transportation network feature confidence.

In some embodiments, as shown at 19400, the host vehicle 18000 may receive remote vehicle information for multiple remote vehicles 19410/19420/19430/19440. In some embodiments, the remote vehicle information for one or more of the remote vehicles 19410/19420/19430/19440 may indicate that the remote vehicles 19410/19420/19430/19440 are stationary, and may indicate active left turn information. In some embodiments, respective remote vehicle expected paths may be determined for each of the remote vehicles 19410/19420/19430/19440. For example, expected paths similar to the expected path 19412 shown at the left may be identified for each of the three remote vehicles 19410/19420/19430 shown at the lower left, and an expected path, such as the expected path 19442 shown at the top, may be identified for the remote vehicle shown at the top.

In some embodiments, as shown at 19500, the road portion 19510 proximate to the host vehicle 18000 may be identified with relatively high confidence based on the host vehicle information, the remote vehicle information, or both. In some embodiments, the lane 19512 proximate to the host vehicle 18000 may be identified with relatively high confidence based on the host vehicle information. In some embodiments, the lane 19514 proximate to the the three remote vehicles 19410/19420/19430 shown at the lower left may be identified with relatively high confidence based on the corresponding remote vehicle information.

In some embodiments, the intersecting road portion 19520 on the left side may be identified based on the remote vehicle expected paths for the three remote vehicles 19410/19420/19430 shown at the lower left. For example, the left turn remote vehicle expected path 19412 may be identified and the intersecting road portion 19520 on the left side may be identified with relatively high projected vehicle transportation feature confidence.

In some embodiments, the lane 19530 shown at the top left may be identified based on the remote vehicle information for the remote vehicle 19440 shown at the top left. In some embodiments, the intersecting road portion 19560 on the right may be identified based on the remote vehicle expected path 19442 for the remote vehicle 19440 shown at the top left. For example, the left turn remote vehicle expected path 19442 may be identified and the intersecting road portion 19560 on the right may be identified with relatively high projected vehicle transportation network feature confidence. In some embodiments, the lane 19530 at the top left may be identified based on the remote vehicle information for the remote vehicle 19440 shown at the top left.

In some embodiments, the lane 19514 at the bottom left may be identified as a dedicated turn lane based on the remote vehicle information for the three remote vehicles 19410/19420/19430 shown at the lower left. In some embodiments, the lane 19540 at the top right may be identified with lower projected vehicle transportation network feature confidence, based on the host vehicle information, the remote vehicle information, or both.

Figure 20:
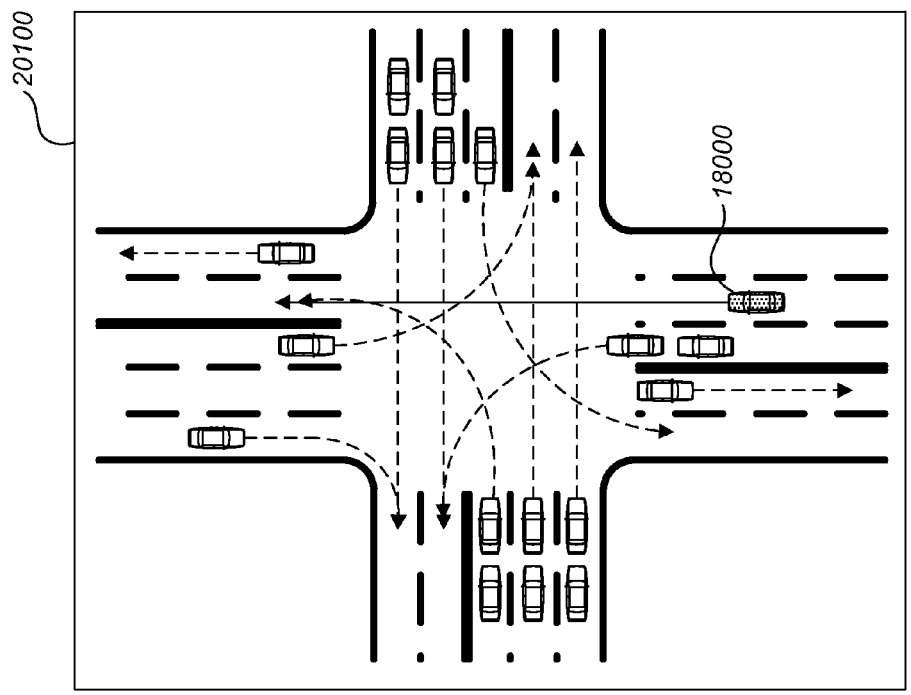
FIG. 20 is another diagram representing identifying projected vehicle transportation network information including vehicle transportation network features in accordance with this disclosure.
Figure 20:
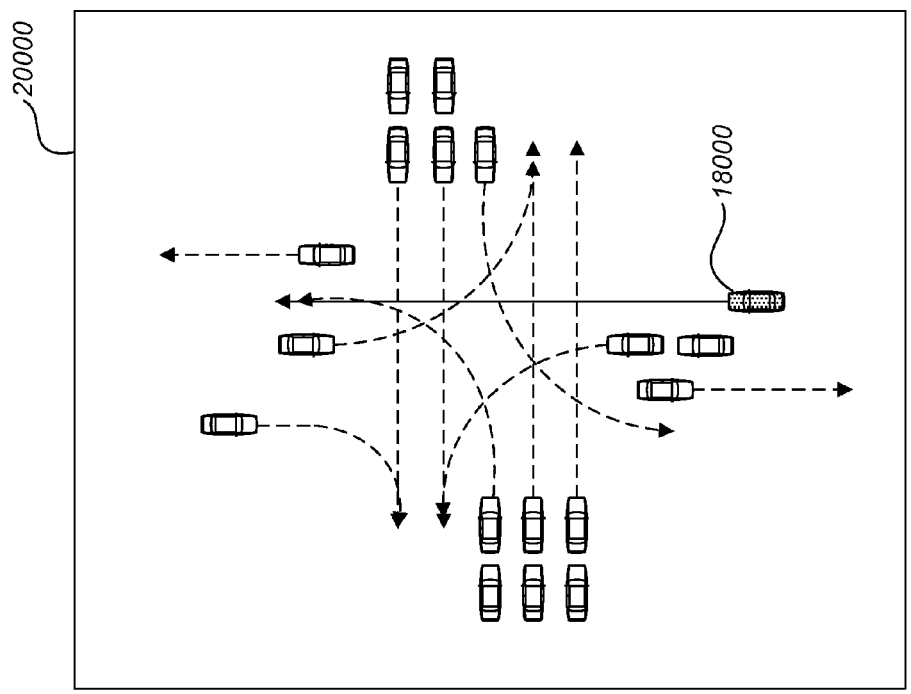

FIG. 20 is another diagram representing identifying projected vehicle transportation network information including vehicle transportation network features in accordance with this disclosure. The examples shown in FIG. 20 may be similar to the examples shown in FIGS. 18 and 19, except as described.

In some embodiments, as shown at 20000, the host vehicle 18000 may identify remote vehicle information for multiple remote vehicles traversing the vehicle transportation network via multiple roads and multiple lanes. In some embodiments, remote vehicle expected paths may be identified for one or more of the remote vehicles.

In some embodiments, as shown at 20100, multiple vehicle transportation network features, such as roads, lanes, dedicated turn lanes, intersections, or the like, may be identified based on host vehicle information, a host vehicle expected path, remote vehicle information, remote vehicle expected path information, or a combination thereof, as shown.

Figure 21:
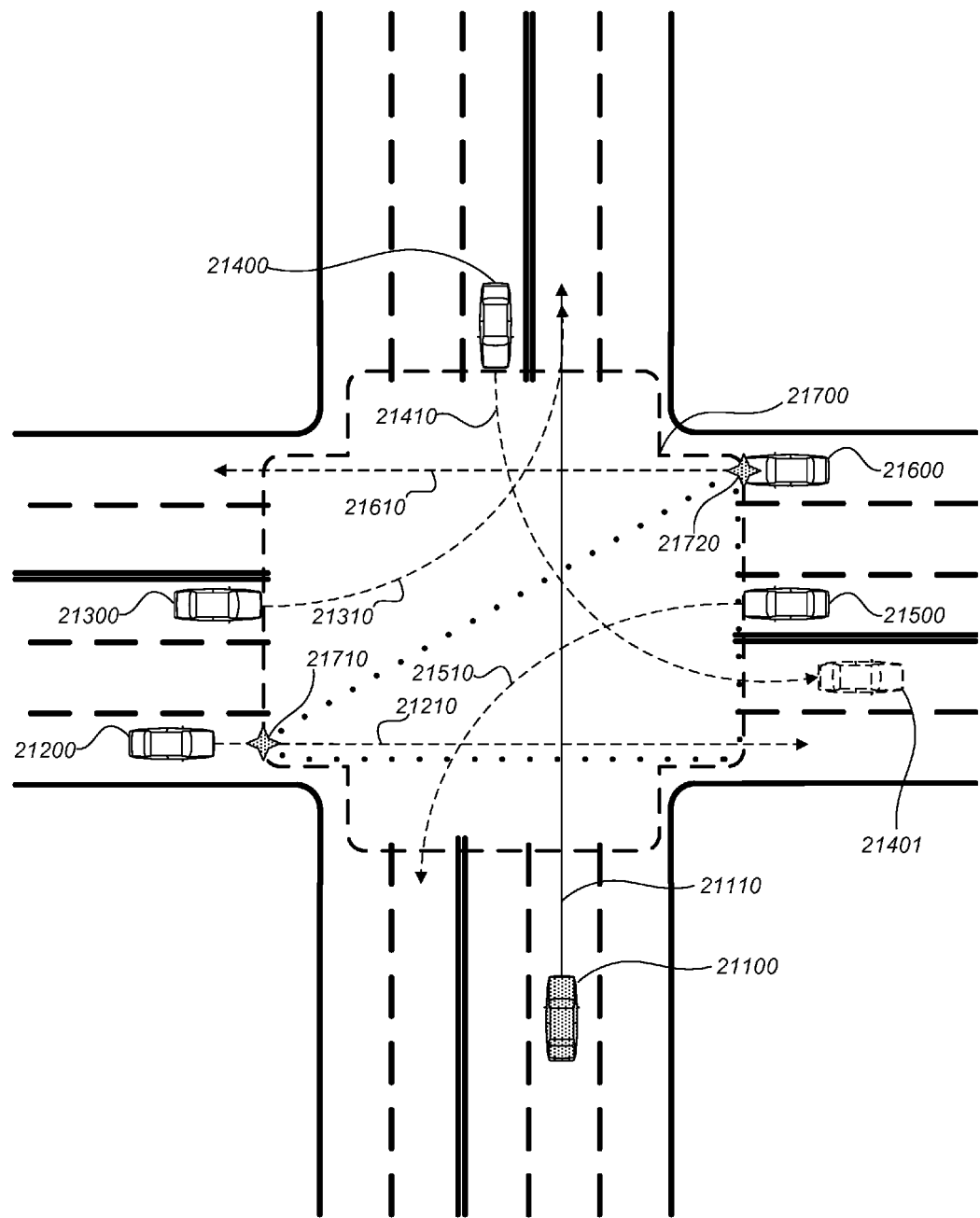
FIG. 21 is a diagram representing a portion of projected vehicle transportation network information including a vehicle transportation network intersection in accordance with this disclosure.

FIG. 21 is a diagram representing a portion of projected vehicle transportation network information including a vehicle transportation network intersection in accordance with this disclosure. In some embodiments, a portion of a vehicle transportation network, such as a vehicle transportation network intersection, may be traversed by a host vehicle 21100. The host vehicle may receive remote vehicle messages from remote vehicles 21200/21300/21400/21500/21600 within a defined reception range, such as 300 meters. Although five remote vehicles 21200/21300/21400/21500/21500 are shown in FIG. 21 for simplicity and clarity, remote vehicle information may be received for any number of remote vehicles.

In some embodiments, identifying a vehicle transportation network intersection may include identifying a host vehicle expected path 21110 for the host vehicle based on host vehicle information. In some embodiments, identifying a vehicle transportation network intersection may include identifying remote vehicle expected paths 21210/21310/21410/21510/21610 for the respective remote vehicles 21200/21300/21400/21500/21600. In some embodiments, identifying a vehicle transportation network intersection may include determining that one or more of the remote vehicle expected paths 21210/21310/21410/21510/21610 are convergent with the host vehicle expected path 21110. The remote vehicle 21400 shown at the top is shown using broken lines at the bottom right 21401 to indicate that a recently traversed path for the remote vehicle 21401 similar to the remote vehicle expected path 21410 for the remote vehicle 21400 may be identified based on the current remote vehicle information, previously received remote vehicle information, or a combination thereof.

Figure 22:
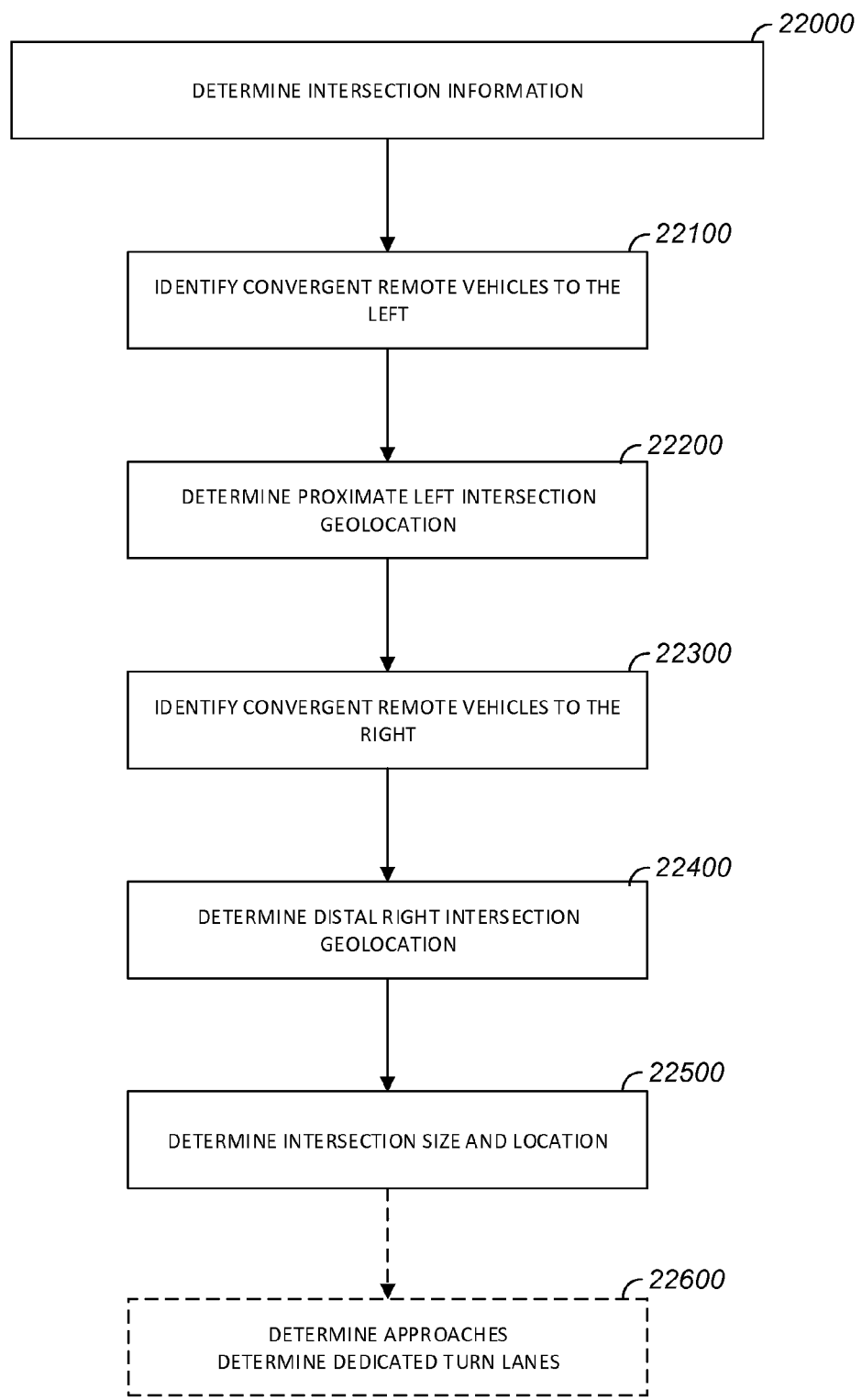
FIG. 22 is a diagram of generating projected vehicle transportation network information including a vehicle transportation network intersection in accordance with this disclosure.

In some embodiments, projected vehicle transportation network information representing a vehicle transportation network intersection 21700 may be generated in response to identifying the remote vehicle information, which may be similar to determining a projected vehicle transportation network feature as shown at 16500 in FIG. 16 or as shown in FIG. 22. In some embodiments, identifying the projected vehicle transportation network information representing a vehicle transportation network intersection 21700 may include identifying a proximal left intersection geospatial location indicated by a stippled star 21710 in the lower left, identifying a distal right intersection geospatial location indicated by a stippled star 21720 in the upper right, or both.

FIG. 22 is a diagram of generating projected vehicle transportation network information including a vehicle transportation network intersection in accordance with this disclosure. In some embodiments, generating projected vehicle transportation network information including a vehicle transportation network intersection may be implemented in a vehicle, such as the vehicle 1000 shown in FIG. 1 or the vehicles 2100/2110 shown in FIG. 2. In some embodiments, generating projected vehicle transportation network information including a vehicle transportation network intersection at 22000 may be similar to determining a projected vehicle transportation network feature as shown at 16500 in FIG. 16.

Although not shown separately in FIG. 22, in some embodiments, identifying a vehicle transportation network intersection may include identifying a number, quantity, count, or cardinality, of a group of intersection vehicles, which may include convergent remote vehicles within a defined intersection proximity. For example, identifying a vehicle transportation network intersection may include identifying convergent remote vehicles located within a defined vehicle transportation network intersection proximity as a group of intersection vehicles, determining that a cardinality of the group of intersection vehicles exceeds a minimum vehicle transportation network intersection remote vehicle grouping threshold, and determining that the group of intersection vehicles corresponds with a location of a vehicle transportation network intersection. In some embodiments, determining that the group of intersection vehicles corresponds with a location of a vehicle transportation network intersection may include determining whether a cardinality of a group of stationary remote vehicles from the group of intersection vehicles exceeds the minimum vehicle transportation network intersection remote vehicle grouping threshold.

In some embodiments, identifying a vehicle transportation network intersection, or any other vehicle transportation network feature, may include identifying one or more recently convergent remote vehicles. For example, a vehicle transportation network intersection may be identified based on a combination of convergent remote vehicle information and recently convergent remote vehicle information. A recently convergent remote vehicle may be identified as divergent based on the host vehicle expected path and the remote vehicle expected path, and may be identified as recently convergent based the host vehicle expected path and the remote vehicle recent path. For example, the remote vehicle 21401 shown using broken lines in FIG. 21 may be identified as a recently convergent remote vehicle based on a recently traversed remote vehicle path.

In some embodiments, generating projected vehicle transportation network information including a vehicle transportation network intersection at 22000 may include identifying convergent remote vehicles to the left of the host vehicle expected path at 22100, determining a proximate left intersection geospatial location at 22200, identifying convergent remote vehicles to the right of the host vehicle expected path at 22300, determining a distal right intersection geospatial location at 22400, determining an intersection size and location at 22500, determining intersection approach information at 22600, or a combination thereof.

In some embodiments, convergent remote vehicles to the left of the host vehicle expected path may be identified at 22100. In some embodiments, identifying convergent remote vehicles to the left of the host vehicle expected path at 22100 may include identifying one or more stationary convergent remote vehicles. For example, in FIG. 21 each remote vehicle 21200/21300/21400/21500/21600 may be identified as being stationary, which may be based on remote vehicle speed information for the respective remote vehicle, and a remote vehicle expected path 21210/21310/21410/21510/21610 for each respective remote vehicle 21200/21300/21400/21500/21600 may be identified as convergent as described herein. In some embodiments, a geospatial location corresponding to each of the stationary convergent remote vehicles may be identified. In some embodiments, referring to FIG. 22, identifying the stationary convergent remote vehicles to the left of the host vehicle expected path at 22100 may include identifying stationary convergent remote vehicles to the left of the host vehicle expected path. For example, the remote vehicles 21200/21300 shown on the left in FIG. 21 and the remote vehicle 21400 shown at the top in FIG. 21 may be identified as stationary convergent remote vehicles to the left of the host vehicle expected path 21110. In some embodiments, referring to FIG. 22, identifying the stationary convergent remote vehicles to the left of the host vehicle expected path at 22100 may include identifying respective geospatial locations of the stationary convergent remote vehicles to the left of the host vehicle expected path as left geospatial locations.

In some embodiments, referring to FIG. 22, a proximate left intersection geospatial location may be identified at 22200. In some embodiments, identifying the proximate left intersection geospatial location at 22200 may include identifying a longitudinally proximal left geospatial location from the left geospatial locations. In some embodiments, the longitudinally proximal left geospatial location may have the minimal longitudinal distance from the geospatial location of the host vehicle among the left geospatial locations. For example, the geospatial location of the remote vehicles 21200/213000 shown on the left in FIG. 21 and the geospatial location of the remote vehicle 21400 shown at the top in FIG. 21 may be identified as left geospatial locations and the geospatial location of the remote vehicle 21200 shown on the lower left in FIG. 21 may be identified as having the minimal longitudinal distance from the geospatial location of the host vehicle among the left geospatial locations.

In some embodiments, referring to FIG. 22, identifying the proximate left intersection geospatial location at 22200 may include omitting, removing, or ignoring, left geospatial locations based on their respective longitudinal distance from the longitudinally proximal left geospatial location. For example, the longitudinal distance between a left geospatial location and the longitudinally proximal left geospatial location may exceed a defined geospatial threshold, such as a maximum road width threshold, and the corresponding left geospatial location may be omitted from the left geospatial locations. In an example, referring to FIG. 21, the geospatial location of the remote vehicle 21200 shown on the lower left in FIG. 21 may be identified as the longitudinally proximal left geospatial location, the longitudinal distance between the geospatial location of the remote vehicle 21200 shown on the lower left in FIG. 21 and the geospatial location of the remote vehicle 21400 shown at the top in FIG. 21 may exceed a defined geospatial threshold, and the geospatial location of the remote vehicle 21400 shown at the top in FIG. 21 may be omitted from the left geospatial locations.

In some embodiments, referring to FIG. 22, identifying the proximate left intersection geospatial location at 22200 may include identifying a laterally proximal left geospatial location from the left geospatial locations. In some embodiments, the laterally proximal left geospatial location may have a minimal lateral, or latitudinal, distance from the geospatial location of the host vehicle among the left geospatial locations. For example, referring to FIG. 21, the lateral distance between the geospatial location of the host vehicle and the geospatial location of the remote vehicle 21200 shown in the lower left in FIG. 21 may exceed the lateral distance between the geospatial location of the host vehicle and the geospatial location of the remote vehicle 21300 shown in the upper left in FIG. 21, and the geospatial location of the remote vehicle 21300 shown in the upper left in FIG. 21 may be identified as the laterally proximal left geospatial location.

In some embodiments, referring to FIG. 22, identifying the proximate left intersection geospatial location at 22200 may include identifying a geospatial location corresponding laterally with the laterally proximal left geospatial location and corresponding longitudinally with the longitudinally proximal left geospatial location. For example, referring to FIG. 21, the proximate left intersection geospatial location, corresponding laterally with the laterally proximal left geospatial location and corresponding longitudinally with the longitudinally proximal left geospatial location is indicated by a stippled star 21710 in the lower left.

In some embodiments, identifying the proximate left intersection geospatial location at 22200 may include using a defined longitudinal offset, a defined lateral offset, or both. For example, the geospatial location corresponding laterally with the laterally proximal left geospatial location and corresponding longitudinally with the longitudinally proximal left geospatial location may be offset a defined lateral offset, such as half a vehicle length, more laterally proximate to the geospatial location of the host vehicle and may be offset a defined longitudinal offset, such as half a vehicle width, more longitudinally distal from the geospatial location of the host vehicle.

In some embodiments, convergent remote vehicles to the right of the host vehicle expected path may be identified at 22300. In some embodiments, identifying convergent remote vehicles to the right of the host vehicle expected path at 22300 may include identifying one or more stationary convergent remote vehicles, such as the stationary convergent remote vehicles identified at 22100. In some embodiments, identifying the stationary convergent remote vehicles to the right of the host vehicle expected path at 22300 may include identifying stationary convergent remote vehicles to the right of the host vehicle expected path. For example, the remote vehicles 21500/21600 shown on the right in FIG. 21 may be identified as stationary convergent remote vehicles to the right of the host vehicle expected path 21110. In some embodiments, referring to FIG. 22, identifying the stationary convergent remote vehicles to the right of the host vehicle expected path at 22300 may include identifying respective geospatial locations of the stationary convergent remote vehicles to the right of the host vehicle expected path as right geospatial locations.

In some embodiments, referring to FIG. 22, a distal right intersection geospatial location may be identified at 22400. In some embodiments, identifying the distal right intersection geospatial location at 22400 may include identifying a longitudinally distal right geospatial location from the right geospatial locations. In some embodiments, the longitudinally distal right geospatial location may have the maximal longitudinal distance from the geospatial location of the host vehicle among the right geospatial locations. For example, the geospatial location of the remote vehicles 21500/216000 shown on the right in FIG. 21 may be identified as right geospatial locations and the geospatial location of the remote vehicle 21600 shown on the upper right in FIG. 21 may be identified as having the maximal longitudinal distance from the geospatial location of the host vehicle among the right geospatial locations.

In some embodiments, referring to FIG. 22, identifying the distal right intersection geospatial location at 22400 may include identifying a laterally proximal right geospatial location from the right geospatial locations. In some embodiments, the laterally proximal right geospatial location may have a minimal lateral, or latitudinal, distance from the geospatial location of the host vehicle among the right geospatial locations. For example, referring to FIG. 21, the lateral distance between the geospatial location of the host vehicle and the geospatial location of the remote vehicle 21600 shown in the upper right in FIG. 21 may match the lateral distance between the geospatial location of the host vehicle and the geospatial location of the remote vehicle 21500 shown in the lower right in FIG. 21, and the geospatial location of the remote vehicle 21600 shown in the upper right in FIG. 21 may be identified as the laterally proximal right geospatial location.

In some embodiments, referring to FIG. 22, identifying the distal right intersection geospatial location at 22200 may include identifying a geospatial location corresponding laterally with the laterally proximal right geospatial location and corresponding longitudinally with the longitudinally distal right geospatial location. For example, referring to FIG. 21, the distal right intersection geospatial location, corresponding laterally with the laterally proximal right geospatial location and corresponding longitudinally with the longitudinally distal right geospatial location is indicated by a stippled star 21720 in the upper right.

In some embodiments, an intersection size, an intersection location, or both may be identified at 22500. In some embodiments, identifying a vehicle transportation network intersection may include identifying a geospatial location for the vehicle transportation network intersection. In some embodiments, the geospatial location of the vehicle transportation network intersection may indicate a geospatial center of the vehicle transportation network intersection. In some embodiments, the projected geospatial location, or center, for the vehicle transportation network intersection may be identified as corresponding to a midpoint along a geospatial path between the proximate left intersection geospatial location identified at 22200 and the distal right intersection geospatial location identified at 22400. For example, a right triangle may be identified based on the proximate left intersection geospatial location identified at 22200 and the distal right intersection geospatial location identified at 22400 as indicated by the dotted line triangle shown in FIG. 21, and the geospatial location of the vehicle transportation network intersection may be identified as corresponding to a midpoint along the hypotenuse of the right triangle.

In some embodiments, identifying the vehicle transportation network intersection may include identifying a size, such as a width, a depth, or both, of the vehicle transportation network intersection. In some embodiments, the width of the vehicle transportation network intersection may be identified based on a lateral, or latitudinal, distance between the proximate left intersection geospatial location identified at 22200 and the distal right intersection geospatial location identified at 22400. In some embodiments, the depth of the vehicle transportation network intersection may be identified based on a longitudinal distance between the proximate left intersection geospatial location identified at 22200 and the distal right intersection geospatial location identified at 22400.

In some embodiments, the vehicle transportation network intersection may be identified as having a rectangular shape centered on the geospatial location identified at 22500 and having a width and depth, or height, as identified at 22500. In some embodiments, the vehicle transportation network intersection may be identified as having an irregular shape, such as the shape indicated by the broken, dashed, line indicated at 21700 in FIG. 21, which may include a combination of a laterally oriented rectangle centered on the geospatial location identified at 22500 and having a width and depth, or height, as identified at 22500 and longitudinally oriented rectangle centered on the geospatial location identified at 22500 and having a width corresponding to the depth identified at 22500 and a depth, or height, corresponding to the width identified at 22500.

In some embodiments, referring to FIG. 22, intersection approach information may be determined at 22600. In some embodiments, intersection approach information may be determined at 22600 based on the group of intersection vehicles, which may include stationary and non-stationary remote vehicles, for which the remote vehicle information includes active turn signal information. For example, determining intersection approach information at 22600 may include determining a number of approaches to the vehicle transportation network intersection. In another example, determining intersection approach information at 22600 may include determining a lane is a dedicated turn lane based on the respective turn signal information.

In some embodiments, certain elements of generating projected vehicle transportation network information may be omitted or combined. For example, as indicated by the broken line box in FIG. 22, in some embodiments, determining intersection approach information at 22600 may be omitted.

Figure 23:
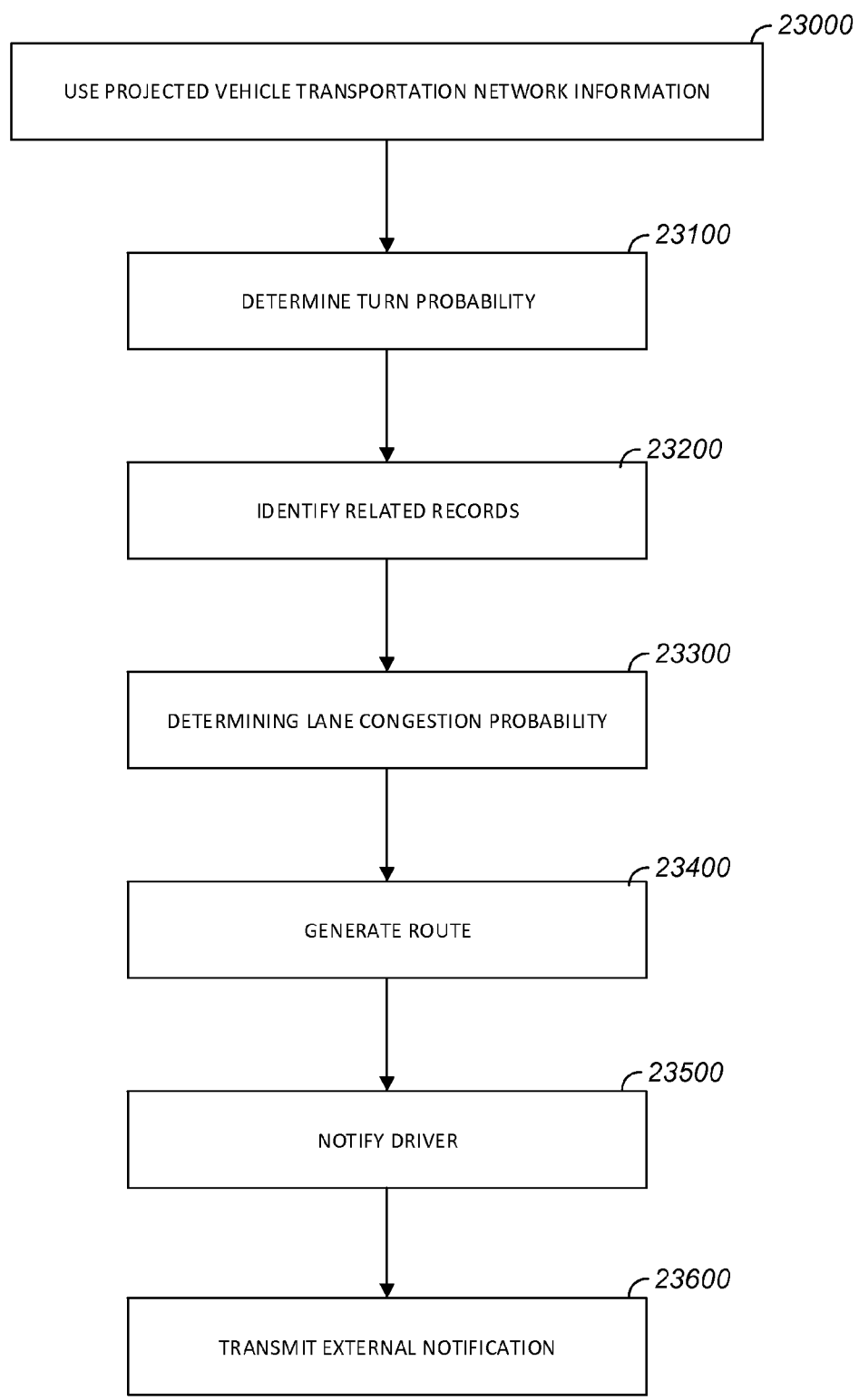
FIG. 23 is a diagram of generating projected vehicle transportation network information including using projected vehicle transportation network information in accordance with this disclosure.

FIG. 23 is a diagram of generating projected vehicle transportation network information including using projected vehicle transportation network information in accordance with this disclosure. In some embodiments, using projected vehicle transportation network information at 23000 may be implemented in a vehicle, such as the vehicle 1000 shown in FIG. 1 or the vehicles 2100/2110 shown in FIG. 2. In some embodiments, using the projected vehicle transportation network information at 23000 may be similar to using projected vehicle transportation network information as shown at 15400 and continuing travel as shown at 15500 in FIG. 15. For example, continuing travel as shown at 15500 in FIG. 15 may include using projected vehicle transportation network information as shown at 15400 in FIG. 15, which may be similar to using the projected vehicle transportation network information at 23000.

In some embodiments, using projected vehicle transportation network information at 23000 may include determining a turn probability at 23100, identifying related records at 23200, determining lane congestion probability at 23300, generating a route at 23400, notifying a driver of the host vehicle at 23500, transmitting an external notification at 23600, or a combination thereof. Although not shown separately in FIG. 23, in some embodiments, using the projected vehicle transportation network information may include storing the projected vehicle transportation network information as a projected vehicle transportation network information record. For example, the projected vehicle transportation network information record may be stored in association with concurrent temporal information.

In some embodiments, a turn probability may be determined at 23100. For example, a probability that the host vehicle will turn in the vehicle transportation network intersection may be determined based on the projected vehicle transportation network information. In some embodiments, the host vehicle information may not include information indicating an active turn signal for the host vehicle, and the probability that the host vehicle will turn in the vehicle transportation network intersection may be determined based on the projected vehicle transportation network information. For example, the predicted vehicle transportation network information may indicate a dedicated turn lane for the vehicle transportation network intersection, the host vehicle information may indicate a geographic location for the host vehicle that corresponds with the dedicated turn lane, and the probability that the host vehicle will turn in the vehicle transportation network intersection may be determined to be high. In another example, the geographic location for the host vehicle may correspond with a lane other than the dedicated turn lane, and the probability that the host vehicle will turn in the vehicle transportation network intersection may be determined to be low. In another example, identifying the turn probability may include using host vehicle kinematic information. For example, the host vehicle kinematic information may indicate a reduction in speed approaching the projected vehicle transportation network, and the turn probability may be adjusted based on the reduction in speed, such as proportionally.

In some embodiments, related records may be identified at 23200. For example, one or more projected vehicle transportation network information records spatially corresponding with, and temporally preceding, the current vehicle transportation network information may be identified, such as from a database or other information storage unit.

In some embodiments, lane congestion probabilities may be determined at 23300. In some embodiments, determining lane congestion probabilities at 23300 may include identifying a group of remote vehicles corresponding to each respective lane approaching the intersection, and determining a cardinality of each respective group as a congestion measure for the respective lane. In some embodiments, the congestion measure for each respective lane may be stored with the current projected vehicle transportation network information record. In some embodiments, one or more of the related projected vehicle transportation network information records identified at 23200 may include corresponding congestion information. In some embodiments, a lane congestion probability may be determined at 23300 based on the current lane congestion measure, the lane congestion information from the related records identified at 23200, or a combination of both, may be used to identify a lane congestion probability of one or more lanes approaching the intersection.

For example, referring to FIG. 13, 14, or 18, the lane congestion information may indicate an average cardinality of vehicles in the leftmost northbound lane approaching the intersection, and the lane congestion probability for the leftmost northbound lane approaching the intersection may be identified based on the average cardinality of vehicles in the leftmost northbound lane approaching the intersection. In some embodiments, determining the lane congestion probability at 23300 may include using temporal information. For example, congestion probabilities may be identified based on one or more defined time periods, such as during morning or evening rush hour.

In some embodiments, an expected host vehicle route for the host vehicle may be generated at 23400. In some embodiments, the expected host vehicle route may be determined in response to generating the projected vehicle transportation network information representing the vehicle transportation network intersection.

In some embodiments, determining the expected host vehicle route may include determining a turn probability indicating a probability that the host vehicle will turn at the vehicle transportation network intersection. For example, the host vehicle information may not include host vehicle turn signal information indicating an active turn signal, such as when the driver neglects to actuate the turn signal, identifying the projected vehicle transportation network information representing the vehicle transportation network intersection may include identifying a dedicated turn lane, determining that the host vehicle is in the dedicated turn lane, and determining a high probability that the expected host vehicle route includes a turn at the vehicle transportation network intersection identified in the projected vehicle transportation network information.

In some embodiments, a driver of the host vehicle may be notified at 23500. In some embodiments, notifying the driver at 23500 may include generating a congestion notification message indicating the probability of lane congestion identified at 23300 and presenting the congestion notification message to the driver of the host vehicle. For example, a high probability of congestion for a lane may be identified at 23300, an expected host vehicle route using the congested lane may be identified at 23400, and a congestion notification message indicating a high probability of congestion of the lane may be presented to the driver at 23500. Although not shown separately in FIG. 23, in some embodiments, presenting the congestion notification message at 23500 may include generating an alternative host vehicle route and presenting the alternative host vehicle route to the driver.

In some embodiments, an external notification may be transmitted at 23600. In some embodiments, transmitting the external notification at 23600 may include generating and transmitting one or more messages indicating the projected vehicle transportation network information. For example, the projected vehicle transportation network information may include lane congestion information determined at 23300, and one or more messages indicating the lane congestion information determined at 23300 may be transmitted to an external device. In some embodiments, the messages indicating the projected vehicle transportation network information may be transmitted to one or more remote vehicles in the proximity of the portion of the vehicle transportation network represented by the projected vehicle transportation network information, such that the other vehicles may avoid congested lanes based on the projected vehicle transportation network information. For example, the host vehicle may transmit the projected vehicle transportation network information directly to the remote vehicles, or the host vehicle may transmit the projected vehicle transportation network information to a remote traffic management device, or other infrastructure device, such that the remote traffic management device may transmit, or broadcast, the congestion information to the remote vehicles.

In some embodiments, one or more of determining a turn probability at 23100, identifying related records at 23200, determining lane congestion probability at 23300, generating a route at 23400, notifying a driver of the host vehicle at 23500, or transmitting an external notification at 23600 may be omitted or combined. For example, transmitting an external notification at 23600 may be omitted.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method of generating projected vehicle transportation network information for use in traversing a vehicle transportation network, the method comprising:
   traversing, by a host vehicle, a vehicle transportation network, wherein traversing the vehicle transportation network includes:
   receiving, at a host vehicle, from a remote vehicle, via a wireless electronic communication link, a remote vehicle message, the remote vehicle message including remote vehicle information, the remote vehicle information indicating remote vehicle geospatial state information for the remote vehicle and remote vehicle kinematic state information for the remote vehicle,
   identifying host vehicle information for the host vehicle, the host vehicle information including one or more of host vehicle geospatial state information for the host vehicle, or host vehicle kinematic state information for the host vehicle,
   generating, by a processor in response to instructions stored on a non-transitory computer readable medium, projected vehicle transportation network information representing a portion of the vehicle transportation network based on the remote vehicle information and the host vehicle information, and
   traversing a part of the portion of the vehicle transportation network represented by the projected vehicle transportation network information using the projected vehicle transportation network information.

2. The method of claim 1, wherein receiving the remote vehicle message includes receiving a plurality of remote vehicle messages from a plurality of remote vehicles.

3. The method of claim 1, wherein the remote vehicle geospatial state information includes geo spatial coordinates for the remote vehicle, and the remote vehicle kinematic state information includes one or more of a remote vehicle velocity for the remote vehicle, a remote vehicle heading for the remote vehicle, a remote vehicle acceleration for the remote vehicle, or a remote vehicle yaw rate for the remote vehicle.

4. The method of claim 1, wherein generating the projected vehicle transportation network information includes:
   identifying a remote vehicle expected path for the remote vehicle based on the remote vehicle information;
   identifying a host vehicle expected path for the host vehicle based on the host vehicle information; and
   determining whether the remote vehicle expected path and the host vehicle expected path are convergent.

5. The method of claim 1, wherein generating the projected vehicle transportation network information includes:
   determining a convergence angle for a geodesic between the host vehicle and the remote vehicle.

6. The method of claim 5, wherein the convergence angle indicates an angle between the geodesic and a reference direction relative to the host vehicle in the geospatial domain.

7. The method of claim 5, wherein the host vehicle information indicates a host vehicle heading for the host vehicle, the remote vehicle information indicates a remote vehicle heading for the remote vehicle, and generating the projected vehicle transportation network information includes:
   determining an orientation sector from a defined plurality of orientation sectors for the geodesic;

determining a host vehicle region for the host vehicle based on the orientation sector, the convergence angle, and the host vehicle heading; and determining a remote vehicle region for the remote vehicle based on the orientation sector, the convergence angle, and the remote vehicle heading.

8. The method of claim 7, wherein the orientation sector indicates a quantized location of the remote vehicle relative to a location of the host vehicle in the geospatial domain, the host vehicle region indicates a quantization of the host vehicle heading relative to the host vehicle and the geodesic in the geospatial domain, and the remote vehicle region indicates a quantization of the remote vehicle heading relative to the remote vehicle and the geodesic in the geospatial domain.

9. The method of claim 7, wherein generating the projected vehicle transportation network information includes:

determining a host vehicle approach angle for the host vehicle based on the host vehicle region, the remote vehicle region, the host vehicle heading, and the convergence angle;

determining a remote vehicle approach angle for the remote vehicle based on the host vehicle region, the remote vehicle region, the remote vehicle heading, and the convergence angle; and determining an intersection angle based on the host vehicle region, the remote vehicle region, the host vehicle heading, and the remote vehicle heading.

10. The method of claim 9, wherein generating the projected vehicle transportation network information includes:

determining an instantaneous distance of the geodesic;

determining a host vehicle intersection distance for the host vehicle based on the instantaneous distance, the remote vehicle approach angle, and the intersection angle; and determining a remote vehicle intersection distance for the remote vehicle based on the instantaneous distance, the host vehicle approach angle, and the intersection angle.

11. The method of claim 10, wherein the instantaneous distance indicates a distance between a location of the host vehicle and a location of the remote vehicle in the geospatial domain.

12. The method of claim 1, wherein generating the projected vehicle transportation network information includes:

on a condition that defined vehicle transportation network information representing the vehicle transportation network is available, generating the projected vehicle transportation network information based on the defined vehicle transportation network information, the remote vehicle information, and the host vehicle information; and on a condition that the defined vehicle transportation network information is unavailable, generating the projected vehicle transportation network information based on the remote vehicle information and the host vehicle information.

13. The method of claim 1, wherein receiving the remote vehicle message includes receiving a plurality of remote vehicle messages from a plurality of remote vehicles, and wherein generating the projected vehicle transportation network information includes:

generating the projected vehicle transportation network information based on first remote vehicle information from a first remote vehicle from the plurality of remote vehicles, wherein the first remote vehicle information indicates that a velocity for the first remote vehicle is within a stationary threshold; and updating the projected vehicle transportation network information based on second remote vehicle information from a second remote vehicle from the plurality of remote vehicles, wherein the second remote vehicle information indicates that a velocity for the second remote vehicle exceeds the stationary threshold, and wherein the second remote vehicle information includes turn signal information.

14. The method of claim 1, wherein generating the projected vehicle transportation network information includes:

generating a portion of the projected vehicle transportation network information representing a first road based on the host vehicle information.

15. The method of claim 14, wherein the host vehicle information includes a host vehicle current geospatial location for the host vehicle, the first road corresponding geospatially with the host vehicle current geospatial location, wherein the remote vehicle information indicates that the remote vehicle is stationary and indicates a remote vehicle current geospatial location for the remote vehicle, the remote vehicle current geospatial location corresponding geospatially with the first road, and wherein generating the projected vehicle transportation network information includes:

identifying a second road intersecting with the first road proximate to the remote vehicle current location, on a condition that a remote vehicle expected path for the remote vehicle indicates a turn corresponding to the second road.

16. The method of claim 14, wherein the host vehicle information includes a host vehicle current geospatial location for the host vehicle, the remote vehicle information includes a remote vehicle current geospatial location for the remote vehicle, and wherein generating the projected vehicle transportation network information includes:

generating a portion of the projected vehicle transportation network information representing a first lane of the first road, the first lane corresponding geospatially with the host vehicle current geospatial location; and generating a portion of the projected vehicle transportation network information representing a second lane of the first road, the second lane corresponding to the remote vehicle current geospatial location, on a condition that a remote vehicle trajectory for the remote vehicle is substantially similar to a host vehicle trajectory for the host vehicle, wherein the remote vehicle trajectory is substantially similar to the host vehicle trajectory on a condition that the remote vehicle trajectory is substantially parallel to the host vehicle trajectory and a lateral difference between the host vehicle current geospatial location and the remote vehicle current geospatial location exceeds a defined lane size.

17. The method of claim 16, wherein the first lane has a first direction of travel corresponding to a direction of the host vehicle trajectory, and wherein generating the portion of the projected vehicle transportation network information representing the second lane includes:

identifying the second lane as having the first direction of travel on a condition that the a direction of the remote vehicle trajectory is substantially similar to the direction of the host vehicle trajectory; and identifying the second lane as having the a second direction of travel, opposite the first direction of travel, on a condition that the a direction of the remote vehicle trajectory is substantially opposite the direction of the host vehicle trajectory.

18. The method of claim 17, wherein the remote vehicle information indicates that the remote vehicle is stationary, and wherein generating the projected vehicle transportation network information includes:
identifying a second road intersecting with the first road proximate to the remote vehicle current location, on a condition that a remote vehicle expected path for the remote vehicle indicates a turn corresponding to the second road.

19. A host vehicle comprising:
a processor configured to execute instructions stored on a non-transitory computer readable medium to:
receive, from a remote vehicle, via a wireless electronic communication link, a remote vehicle message, the remote vehicle message including remote vehicle information, the remote vehicle information indicating remote vehicle geospatial state information for the remote vehicle and remote vehicle kinematic state information for the remote vehicle;
identify host vehicle information for the host vehicle, the host vehicle information including one or more of host vehicle geospatial state information for the host vehicle, or host vehicle kinematic state information for the host vehicle;
generate projected vehicle transportation network information representing a portion of a vehicle transportation network based on the remote vehicle information and the host vehicle information; and
control the host vehicle to traverse a part of the portion of the vehicle transportation network represented by the projected vehicle transportation network information using the projected vehicle transportation network information.

20. A non-transitory computer-readable storage medium, comprising executable instructions that, when executed by a processor, facilitate performance of operations, comprising:
traversing, by a host vehicle, a vehicle transportation network, wherein traversing the vehicle transportation network includes:
receiving, at a host vehicle, from a remote vehicle, via a wireless electronic communication link, a remote vehicle message, the remote vehicle message including remote vehicle information, the remote vehicle information indicating remote vehicle geospatial state information for the remote vehicle and remote vehicle kinematic state information for the remote vehicle;
identifying host vehicle information for the host vehicle, the host vehicle information including one or more of host vehicle geospatial state information for the host vehicle, or host vehicle kinematic state information for the host vehicle;
generating, by a processor in response to instructions stored on a non-transitory computer readable medium, projected vehicle transportation network information representing a portion of the vehicle transportation network based on the remote vehicle information and the host vehicle information; and
traversing a part of the portion of the vehicle transportation network represented by the projected vehicle transportation network information using the projected vehicle transportation network information.

* * * * *